United States Patent [19]

Sato

[11] Patent Number: 5,525,885
[45] Date of Patent: Jun. 11, 1996

[54] POSITION DETECTING APPARATUS AND POSITION COMPENSATING METHOD THEREFOR

[75] Inventor: Yoshimitsu Sato, Aichi, Japan

[73] Assignee: Mitsubishi Denki Kabushiki Kaisha, Tokyo, Japan

[21] Appl. No.: 390,557

[22] Filed: Feb. 17, 1995

[30] Foreign Application Priority Data

Feb. 25, 1994 [JP] Japan ..................................... 6-028175

[51] Int. Cl.⁶ ................................................. G05D 23/275
[52] U.S. Cl. .......................... 318/632; 318/560; 318/634
[58] Field of Search ..................................... 318/632, 560, 318/567, 569, 634, 568.22

[56] References Cited

U.S. PATENT DOCUMENTS 4,853,604  8/1989  McMullin et al. ....................... 318/632
5,032,936  7/1991  Fujioka et al. ........................... 318/632

Primary Examiner—William M. Shoop, Jr.
Assistant Examiner—Karen Masih
Attorney, Agent, or Firm—Sughrue, Mion, Zinn, Macpeak & Seas

[57] ABSTRACT

A revolution detecting apparatus which detects and outputs a compensated revolution position adjusted according to compensation values, stored according to the ranges of a rotation position indicated on the basis of the number of revolutions of a motor for driving a table. Compensation values for a plurality of revolving angle ranges within one revolution of a revolving shaft are stored beforehand, and are read out on the basis of detected rotation position ranges of the revolving shaft determined from the output of a revolution counter and a rotation angle detector. A compensated rotation position is calculated according to the read-out compensation values, the detected rotation angle and the detected revolution count. The apparatus also can store backlash and temperature compensation data and can judge when such data is to be applied so that the speed and accuracy of a servo control apparatus is improved.

17 Claims, 38 Drawing Sheets

POSITION DETECTING APPARATUS AND POSITION COMPENSATING METHOD THEREFOR

BACKGROUND OF THE INVENTION

The present invention relates to a position detecting apparatus which detects and outputs a compensated revolution position adjusted according to compensation values, stored according to the ranges of a rotation position indicated on the basis of the number of revolutions of a motor for driving a table, and to a compensation value writing method for the revolution detecting apparatus.

To obtain a compensated rotation position adjusted according to the ranges of the rotation position of a revolving shaft in a conventional servo control apparatus which detects the position of a table using a rotation detecting apparatus for detecting the rotation position of a motor which drives the table, compensation values stored beforehand in a compensation value storage section within a numerical control apparatus (hereinafter referred to as the "NC apparatus") were used to calculate the compensated rotation position. It is to be understood that this compensated rotation position indicates an accurate table position.

FIG. 32 is an arrangement diagram of a servo apparatus wherein a conventional revolution detecting apparatus is employed to write to the compensation value storage section in an NC apparatus the compensation values compensated for by the ranges of the rotation position of the revolving shaft for detecting the table position.

FIG. 33 is an arrangement diagram showing the conventional servo apparatus in a state wherein a measuring instrument has been removed after the compensation values had been written to the compensation value storage section of the NC apparatus, i.e., in an ordinary operation state.

FIG. 34 is an arrangement diagram of the revolution detector in FIGS. 32 and 33.

In FIG. 32, the numeral 101 indicates the NC apparatus, 101a designates a control section, 101b denotes an operation section, 101c represents a difference operation circuit, and 101d indicates a compensation value storage section. 101e represents a feedback input section which is made up of input sections 101f and 101g. 102 denotes a servo amplifier and 3 designates a motor, e.g., a servo motor. 4 indicates a ballscrew of a predetermined pitch coupled with the servo motor 3 by a coupling 4a. 5 denotes a table, e.g., a moving table. It is to be understood that the ballscrew 4 is screwed to a leg 5a of the moving table 5. 5b designates a traveling origin of the moving table 5. 610 represents a revolution detector installed to the servo motor 3, and 7 indicates table position e.g., a measuring instrument, which detects the current position of the moving table 5.

The measuring instrument 7 is a precisely divided linear scale. This measuring instrument 7 consists of a scale 7a similar in length to and disposed in parallel with the ballscrew 4, a detection device 7c, a signal processing circuit 7d and other parts. It is to be understood that the scale 7a is provided with graduations 7b so that phases A and B 90° out of phase with each other are output as electrical signals from the signal output circuit 7d with the travel of the moving table 5.

FIG. 33 shows the arrangement identical to that in FIG. 32 with the exception that the measuring instrument 7 has been removed. A dotted arrow indicates an unused instruction or data flow.

In FIG. 34, 610A denotes a revolution detector which is generally referred to as an optical incremental encoder. It is to be noted that a revolving shaft 10 of this incremental encoder 610A is coupled to a revolving shaft 3a of the servo motor 3 via a coupling 9. 11 represents a code disk provided with slits (not shown) to electrically provide A- and B-phase outputs 90° out of phase with each other. A light-emitting device 12 and a plurality of light-receiving devices 13 are disposed opposite to each other. 14 designates a signal processing circuit which processes a rotation position signal detected by the light-receiving devices 13 as required.

It is to be noted that an apparatus similar to said conventional example is disclosed in Japanese Laid-Open Patent Publication No. SHO62-39159.

Operation will now be described. To compensate for the pitch error of the ballscrew 4, a machine operation panel (not shown) is operated to move the moving table 5 in an overall stroke, with the measuring instrument 7 fitted to the moving table 5 as shown in FIG. 32.

First, when the power is switched on, the NC apparatus 101, the servo amplifier 102 and the servo motor 3 are ready to be driven, the light-emitting device 12 of the revolution detector 6 is lit, and further the measuring instrument 7 is ready for measurement.

Next, under an NC command, a drive instruction is given to the servo amplifier 102. When the revolving shaft 3a of the servo motor 3 rotates, the revolving shaft 10 of the revolution detector 6 rotates, and further the code disk 11 rotates to pass/intercept the light of the light-emitting device 12 through the slits of the code disk 11.

The lights received by the light-receiving devices 13 are converted into currents to electrically provide simulative sine-wave, A- and B-phase rotation position signals 90° out of phase with each other. The signal processing circuit 14 converts the A- and B-phase rotation position signals into a rectangular-wave voltage and outputs it as rotation position data. This rotation position data is entered into the input section 101f of the feedback input section 101e.

Since the ballscrew 4 is rotated by the rotation of the servo motor 3 via the coupling 4a to move the moving table 5, the measuring instrument 7 causes the detection device 7c to detect the graduation 7b of the scale 7a, which is converted into A- and B-phase rectangular-wave signals by the signal processing circuit 7d, and the result of this conversion is output as current position data. This current position data is entered into the input section 101g of the feedback input section 101e.

After receiving the rotation position data and the current position data, the feedback input section 101e transmits a request signal to the control section 101a to command the control section 101a to send a sampling instruction to the difference operation circuit 101c.

At the same time, the input section 101f judges the rotation direction of the revolution detector 610 according to the leading direction of phases A and B, differentiates the leading and trailing edges of phases A and B, creates a pulse on the basis of this differential output, and outputs to the difference operation circuit 1c the rotation position data which has been found by multiplying a division amount four times.

Also, the input section 101g judges the moving direction of the measuring instrument 7 according to the leading direction of phases A and B, differentiates the leading and trailing edges of phases A and B, creates a pulse on the basis of this differential output, and outputs to the difference operation circuit 1c the current position data which has been found by multiplying a division amount four times.

In the meantime, it is needless to say that the travel amount of the moving table 5 does not match the travel amount converted from the revolution amount of the servo motor 3 because of the pitch error of the ballscrew 4.

Then, under the sampling instruction from the control section 101a, the difference operation circuit 101c calculates a difference between the rotation position data and current position data entered, and stores the result of this calculation into the compensation value storage section 101d as a ballscrew pitch error compensation value in the current position. It is needless to say that the pitch error compensation value includes the compensation values of a revolving system torsion error and others, in addition to the compensation value of the ballscrew pitch error.

The command position of the NC command is changed sequentially by a predetermined amount. After the operation is complete in the overall travel range of the moving table 5, the measuring instrument 7 is removed from the moving table 5 and an ordinary operation is started.

In FIG. 33, the operation section 101b calculates the travel data of the moving table 5 under the control of the control section 101a on the basis of the ballscrew pitch error compensation values stored in the compensation value storage section 101d and the rotation position data of the revolution detector 6 entered via the input section 101f.

The control section 101a outputs to the servo amplifier 102 the drive instruction based on a difference between the travel data calculated and the NC command and exercises closed-loop control of the servo motor 3 via the servo amplifier 102. It is to be understood that the travel speed of the moving table 5 is found by calculating the variation of the travel data per unit time.

As an upgraded version of the optical incremental encoder 610A, an optical absolute-value encoder has been used. The absolute value encoder has memory stored with angle detection errors for a plurality of rotational angle ranges into which a single revolution has been divided. This encoder can compensate for the within-one-revolution angle detection errors of the encoder itself by discussing of the storage content of the memory, and outputting the result for compensation.

FIG. 35 is an arrangement diagram of a revolution detector 610 which is an optical absolute-value encoder 611.

In this drawing, 11 indicates a code disk provided with predetermined slits (not shown) to provide signals which indicate an absolute-value rotation position within one revolution and a multi-revolution amount, 15 represents a first light-emitting device, 16 designates a second light-emitting device, and 17 denotes a plurality of first light-receiving devices. 18 indicates a plurality of second light-receiving devices, 19 designates a within-one-revolution signal processing circuit, 20 denotes a multi-revolution amount signal processing circuit, and 21 represents a counter circuit. Also, 122 indicates a central processing circuit having a control section 122a and an operation section 122b. 23 denotes compensating ROM storing division angle error compensation values.

It is to be noted that this division angle error compensation value is an error compensation value set for each of the plurality of rotation angle ranges into which one revolution has been divided.

This division angle error compensation value allows the within-one-revolution detection error of the code disk 11 caused by the pitch error of the code disk 11 slits and the deflection or the like of the code disk 11 due to the misalignment of the code disk 11 and the revolving shaft 10 at the time of installation to be compensated for by the rotation angle ranges.

FIG. 36 illustrates a within-one-revolution accumulative division angle error of the absolute value encoder 611.

The operation of the absolute value encoder 611 shown in FIG. 35 will now be described. When the revolving shaft 3a of the servo motor 3 rotates, the revolving shaft 10 rotates, and further the code disk 11 rotates to pass/intercept the lights of the first light-emitting device 15 and the second light-emitting device 16 through the slits of the code disk 11.

The light-receiving devices 17 convert the light they receive into currents and output a current signal which indicates the within-one-revolution absolute-value rotation position. The within-one-revolution signal processing circuit 19 converts this output into a rectangular-wave voltage and outputs the result into the central processing circuit 122.

The light-receiving devices 18 convert the light they receive into currents and output a multi-revolution amount signal which indicates the number of revolutions. The multi-revolution amount signal processing circuit 20 converts this output into a rectangular-wave voltage.

The counter circuit 21 counts the multi-revolution amount signal and outputs the result of counting into the central processing circuit 122.

Subsequently, the operation section 122b calculates an absolute-value rotation position signal under the control of the control section 122a from the output signal (current value data) from the within-one-revolution signal processing circuit 7d entered via the input section 101g and the compensation value of the compensating ROM 23 (division angle error compensation value within one revolution). Then, the operation section 122b converts the rotation position data, which has been found as a result of the calculation and the contents of the counter circuit 21, into a serial signal and outputs the serial signal to the outside every time a request instruction is received from the outside.

When the power of the revolution detector 6 is switched off, the second light-emitting device 16 and the second light-receiving devices 18, the multi-revolution amount signal processing circuit 20 and the counter circuit 21 are battery (not shown) backed-up, whereby when the power is switched on again, the apparatus can be restarted from where its power had been switched off.

It is to be understood that the within-one-revolution division angle error compensation values stored in the compensating ROM 23 were found by a compensation value operator (not shown) at the time of manufacturing the absolute value encoder 611 and were written to the compensating ROM 23 under the control of the control section 122a.

The compensation value operator calculates the maximum and minimum values of the division angle error for each of the "n" division angle ranges into which one revolution of the absolute encoder 611 has been divided (where "n" is a given integer), finds the typical value of the division angle error from said maximum and minimum values, and outputs the typical value as rotation position data.

For example, FIG. 36 shows the typical values of the division angle ranges when one revolution has been divided into eight ranges (n=8). In this drawing, the horizontal axis represents a rotation position within one revolution and the vertical axis represents an accumulative division angle error within one revolution. Typical values $\epsilon 1$ to $\epsilon 8$ found as the half values of the maximum values and the minimum values of the accumulative division angle error in the respective division angle ranges are stored in the compensating ROM 23. It is to be understood that the number of divisions "n" is set according to the capacity of the compensating ROM 23.

An operation using the revolution detector 610 in the system of FIGS. 32 and 33, operating as an absolute encoder 611, will now be described with reference to this operation flowcharts shown in FIGS. 37 and 38.

To compensate for the pitch error of the ballscrew 4, a machine operation panel (not shown) is operated to move the moving table 5 in an overall stroke as described below, with the measuring instrument 7 fitted to the moving table 5 (step S101) in FIGS. 32 and 35.

First, when the power is switched on, the NC apparatus 101, the servo amplifier 102 and the servo motor 3 are ready to be driven, the first light-emitting device 15 and the second light-emitting device 16 of the revolution detector 611 are lit, and further the measuring instrument 7 is ready for measurement.

Next, under an NC command (step S102), the control section 101a gives the servo amplifier 102 a drive instruction based on travel data operated on by the operation section 101b (step S103) to drive the servo motor 3 relative to the origin 5b (step S104).

When the servo motor 3 rotates, the revolving shaft 10 of the absolute encoder 611 rotates, and further the code disk 11 rotates to pass/intercept the light from the first light-emitting device 15 and the second light-emitting device 16 through the slits of the code disk 11.

The light-receiving devices 17 convert the light received into currents and output a current signal which indicates the within-one-revolution absolute-value rotation position. The within-one-revolution signal processing circuit 19 converts this output into a rectangular-wave voltage and outputs the result into the central processing circuit 122.

The light-receiving devices 18 convert the light received into currents and output a multi-revolution amount signal which indicates the number of revolutions. The multi-revolution amount signal processing circuit 20 converts this output into a rectangular-wave voltage. The counter circuit 21 counts the multi-revolution amount signal and outputs the result of counting into the central processing circuit 122.

Subsequently, the operation section 122b calculates a within-one-revolution absolute-value rotation position signal under the control of the control section 122a from the output of the within-one-revolution signal processing circuit 19 and the compensation value (division angle error compensation value within one revolution) already stored in the compensating ROM 23 (step S105).

Then, the operation section 122b composes rotation position data from the result of that calculation and the contents of the counter circuit 21, converts the rotation position data into a serial signal, and outputs the serial signal to the feedback input section 101e every time a request instruction is entered from the servo amplifier 102 (step S106).

Next, the control section 101a judges on the basis of the rotation position data from the absolute encoder 611 whether or not the required rotation position has been reached (step S107). If it has been judged that the required rotation position has not been reached, a drive instruction for that difference is given to the servo amplifier 102 (step S108).

The ballscrew 4 is rotated by the rotation of the servo motor 3 via the coupling 4a to move the moving table 5. The measuring instrument 7 then detects the graduation 7b of the scale 7a using the detection device 7c, converts it into A- and B-phase rectangular-wave signals by means of the signal processing circuit 7d, and outputs the result into the feedback input section 101e as current position data (step S109).

Receiving the rotation position data and the current position data, the feedback input section 101e transmits a request signal to the control section 101a to command the control section 101a to send a sampling instruction to the difference operation circuit 101c.

Simultaneously, the input section 101f outputs a rotation position data direction from the absolute encoder 611 to the difference operation circuit 101c, and the input section 101g judges the rotation direction of the measuring instrument 7 according to the leading direction of phases A and B, differentiates the leading and trailing edges of phases A and B, creates a pulse on the basis of this differential output, and outputs to the difference operation circuit 101c the rotation position data which has been found by multiplying a division amount four times.

In the meantime, it is needless to say that the travel amount of the moving table 5 does not match the travel amount converted from the revolution amount of the servo motor 3 because of the pitch error of the ballscrew 4.

Under the sampling instruction from the control section 101a, the difference operation circuit 101c calculates a difference between the rotation position data and current position data entered (step S110), and stores the result of this calculation into the compensation value storage section 101d as a ballscrew pitch error compensation value in the current position (step S111). It is to be noted that the pitch error compensation value includes the compensation values for at least the revolving system's torsion error, in addition to the compensation value of the ballscrew pitch error.

The command position of the NC command is changed sequentially by a predetermined amount. After the operation is complete in the overall stroke of the ballscrew 4 (step S112), the measuring instrument 7 is removed from the moving table 5 to set up the arrangement for an ordinary operation shown in FIG. 33 (step S113).

When an NC command is given to the control section 101a (step S114), the control section 101a grasps the current position on the basis of the rotation position data from the absolute encoder 611 (step S115) and reads the ballscrew pitch error compensation value corresponding to the current position from the compensation value storage section 101d, and the operation section 101b calculates the travel data of the moving table 5 (step S116).

The control section 101a uses this calculated travel data as a drive instruction (step S117) to drive the servo motor 3 via the servo amplifier 102 (step S118).

When the absolute encoder 611 is rotated by the rotation of the servo motor 3, the revolving shaft 10 rotates inside the absolute encoder 611, and further the code disk 11 rotates to pass/intercept the light from the first light-emitting device 15 and the second light-emitting device 16 through the slits of the code disk 11.

The light-receiving devices 17 convert the light received into currents and output a within-one-revolution absolute-value rotation position signal. The within-one-revolution signal processing circuit 19 converts this output into a rectangular-wave voltage and outputs the result to the central processing circuit 122.

The light-receiving devices 18 convert the light received into currents and output a multi-revolution amount signal which indicates the number of revolutions. The multi-revolution amount signal processing circuit converts this output into a rectangular-wave voltage.

The counter circuit 21 counts the multi-revolution amount signal and outputs the result of counting into the central processing circuit 122.

Subsequently, the operation section 122b compensates for the within-one-revolution absolute-value rotation position signal output from the within-one-revolution signal processing circuit 19 under the control of the control section 122a according to the compensation value in the compensating ROM 23 (division angle error compensation value within one revolution) and composes rotation position data from said compensation value and the contents of the counter circuit 21 (step S119), and converts the composed rotation position data into a serial signal and outputs the serial signal to the feedback input section 101e every time a request instruction is entered from the servo amplifier 102 (step S120).

Also, the control section 101a judges on the basis of the rotation position data from the absolute encoder 611 whether or not the required rotation position has been reached (step S121). If it has been judged that the required rotation position has not been reached, a drive instruction for that difference is given to the servo amplifier 102 (step S122).

As described above, the moving table 5 is moved under the closed-loop control fed back to the NC apparatus 101.

It is to be noted that as described above, the input section 101g where the feedback signal from the measuring instrument 7 is entered at the time of compensation value write and the difference operation circuit 101c which calculates the difference between the detection output of the absolute encoder 611 and the measurement output of the measuring instrument 7 are not required for ordinary operation in the conventional NC apparatus 101, but it is difficult to remove the parts other than the measuring instrument 7, whereby the servo control apparatus in ordinary operation was high in cost.

SUMMARY OF THE INVENTION

When the conventional rotation position detecting apparatus arranged as described above is employed to make within-one-revolution division angle error compensation and ballscrew pitch error compensation, the operation processing of the within-one-revolution division angle error compensation is made in the rotation position detecting apparatus and compensation operation is further performed for the ballscrew pitch error compensation by the rotation position ranges of the revolving shaft. Namely, an operation processing divided into two parts as described above requires a long operation time, thereby reducing the tracking performance of the equipment using this detecting apparatus and lowering both machining speed and accuracy.

It is accordingly an object of the present invention to solve the difficulties by providing a rotation position detecting apparatus and a compensation value writing method for this rotation position detecting apparatus which allow an input section for a measuring instrument and a difference operation section in a servo control apparatus using this detecting apparatus to be removed at the time of ordinary operation and which allow a detection output for which a division angle error has been compensated by table position ranges to be provided by one arithmetic operation to increase the speed and accuracy of the servo control apparatus using this detecting apparatus.

DESCRIPTION OF THE PREFERRED EMBODIMENTS

Embodiment 1

Figure 1:
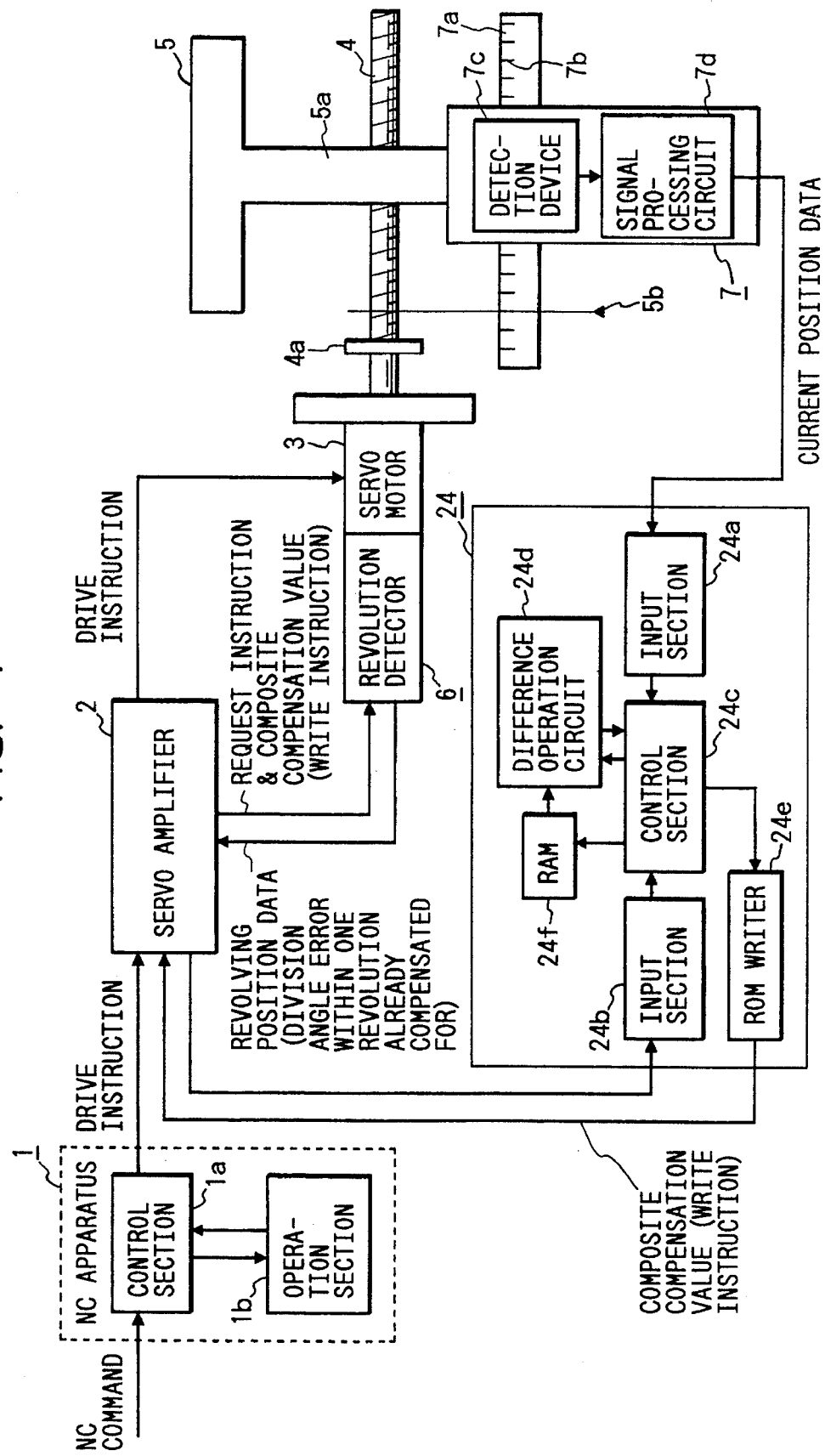
FIG. 1 is a block arrangement diagram of a machining apparatus having a rotation detection device and being arranged at the time of writing compensation values to a compensating ROM, according to Embodiment 1 of the present invention.

An embodiment of the present invention will now be described in accordance with FIGS. 1, 2, 3, 4, 5 and 6. FIG. 1 corresponds to FIG. 32 showing the conventional example, FIG. 2 to FIG. 33 showing the conventional example, and FIGS. 3 and 4 to FIG. 35 showing the conventional example, respectively.

Figure 2:
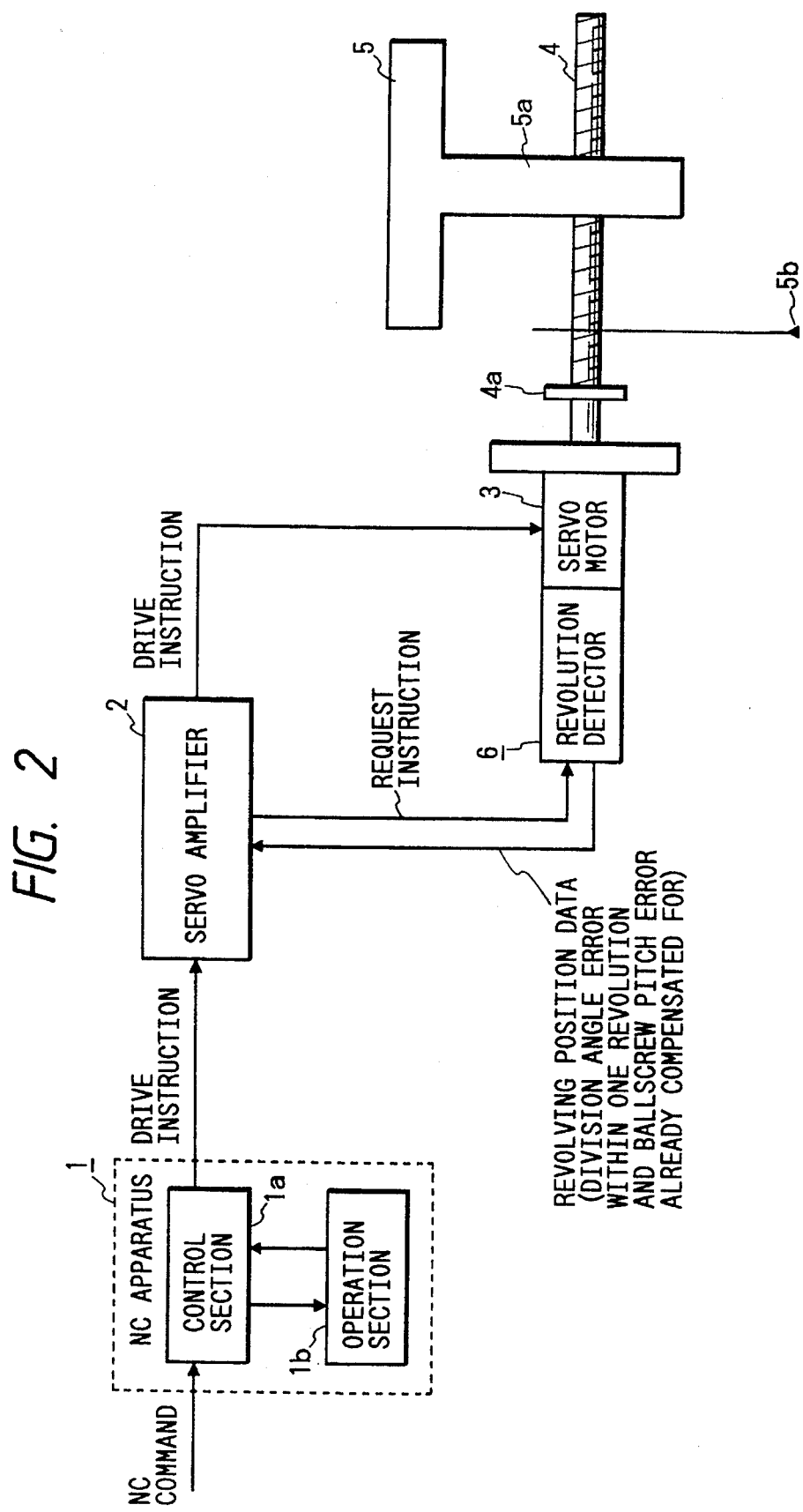
FIG. 2 is a block arrangement diagram of a machining apparatus having a rotation detection device as arranged at the time of ordinary operation, according to Embodiment 1 of the present invention.
Figure 3:
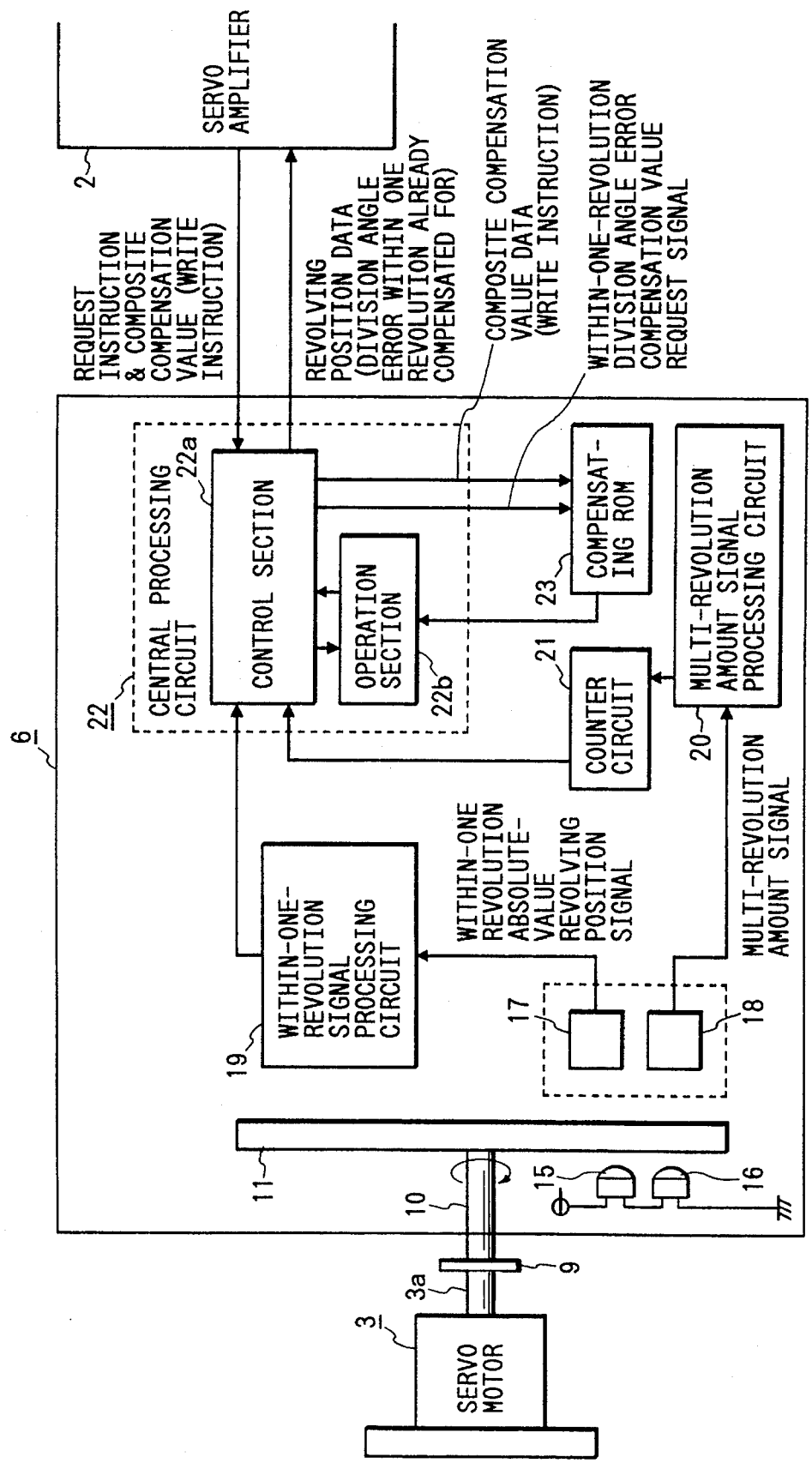
FIG. 3 is a block arrangement diagram showing the operation of a revolution detector at the time of writing compensation values to the compensating ROM, according to Embodiment 1 of the present invention.
Figure 4:
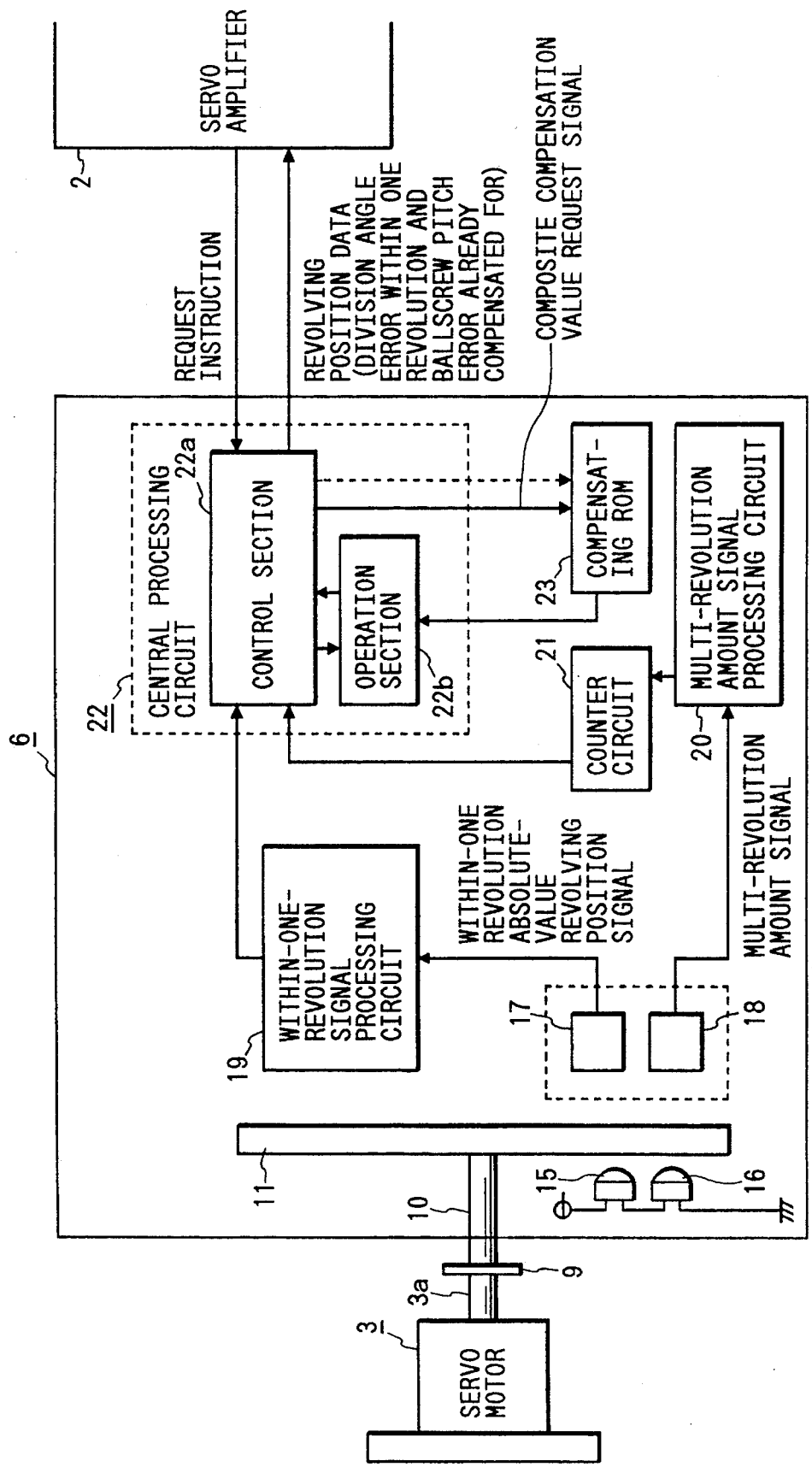
FIG. 4 is a block arrangement diagram showing the operation of the revolution detector at the time of ordinary operation, according to Embodiment 1 of the present invention.

FIGS. 1 and 2 are arrangement diagrams of entire machining system. FIG. 3 is an arrangement diagram of a revolution detector in FIG. 1, and FIG. 4 is an arrangement diagram of the revolution detector in FIG. 2. It is to be understood that FIGS. 1 and 3 are arrangement diagrams at the time of compensation operation and FIGS. 2 and 4 are arrangement diagrams at the time of ordinary operation, after a compensation operation.

Figure 5:
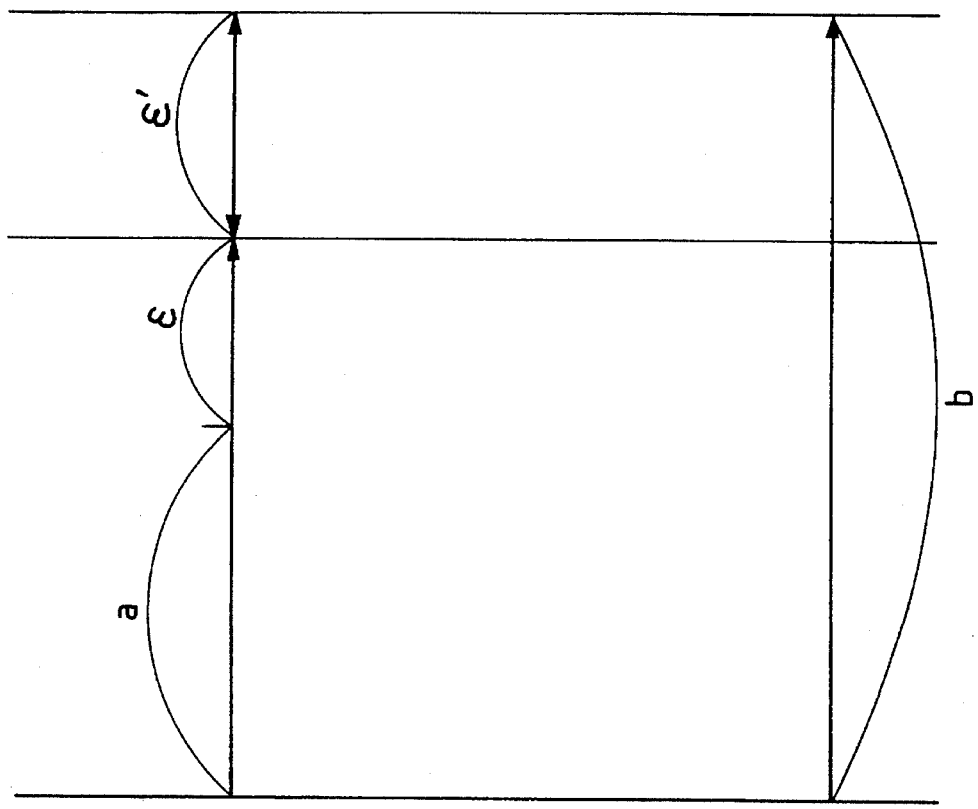
FIG. 5 is a diagram illustrating the concept of ballscrew pitch error compensation values, etc. in Embodiment 1 of the present invention.
Figure 6:
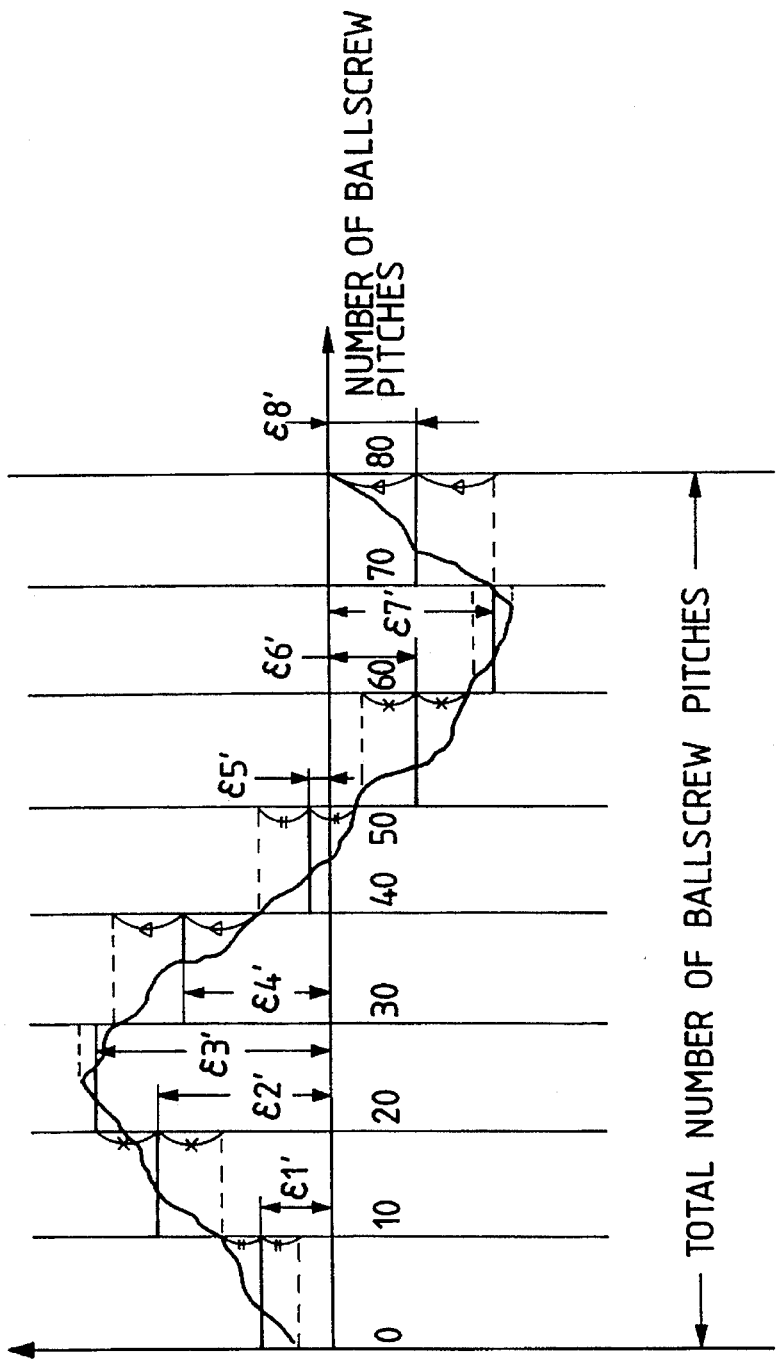
FIG. 6 is a diagram illustrating an accumulative ballscrew pitch error according to Embodiment 1 of the present invention.

FIG. 5 is a conception diagram of a ballscrew pitch error compensation value, etc., and FIG. 6 shows an accumulative ballscrew pitch error.

In FIG. 1, the numeral 1 indicates an NC apparatus, 1a designates a control section, 1b denotes an operation section, 2 represents a servo amplifier, and 3 indicates a servo motor. 4 represents a ballscrew of a predetermined pitch coupled with the servo motor 3 by a coupling 4a and screwed to a leg 5a of a moving table 5. 5b designates a traveling origin of the moving table 5.

Also, 6 denotes a revolution detecting apparatus, e.g., a revolution detector, installed on to the servo motor 3, and 7 indicates table position detecting means, e.g., a measuring instrument, fitted removably to the moving table 5 to detect the current position of the moving table 5. This measuring instrument 7 comprises an accurately divided linear scale device, specifically, a scale 7a similar in length to and disposed in parallel with the ballscrew 4, a detection device 7c and a signal processing circuit 7d. It is to be understood that the scale 7a is provided with graduations 7b so that phases A and B 90° out of phase with each other are output electrically.

24 indicates a control apparatus, e.g., a controller, which receives the output values of the revolving detector 6 and the measuring instrument 7. This controller 24 comprises an input section 24a, an input section 24b, a control section 24c, a difference operation circuit 24d, a ROM writer 24e, and RAM 24f.

Figure 35:
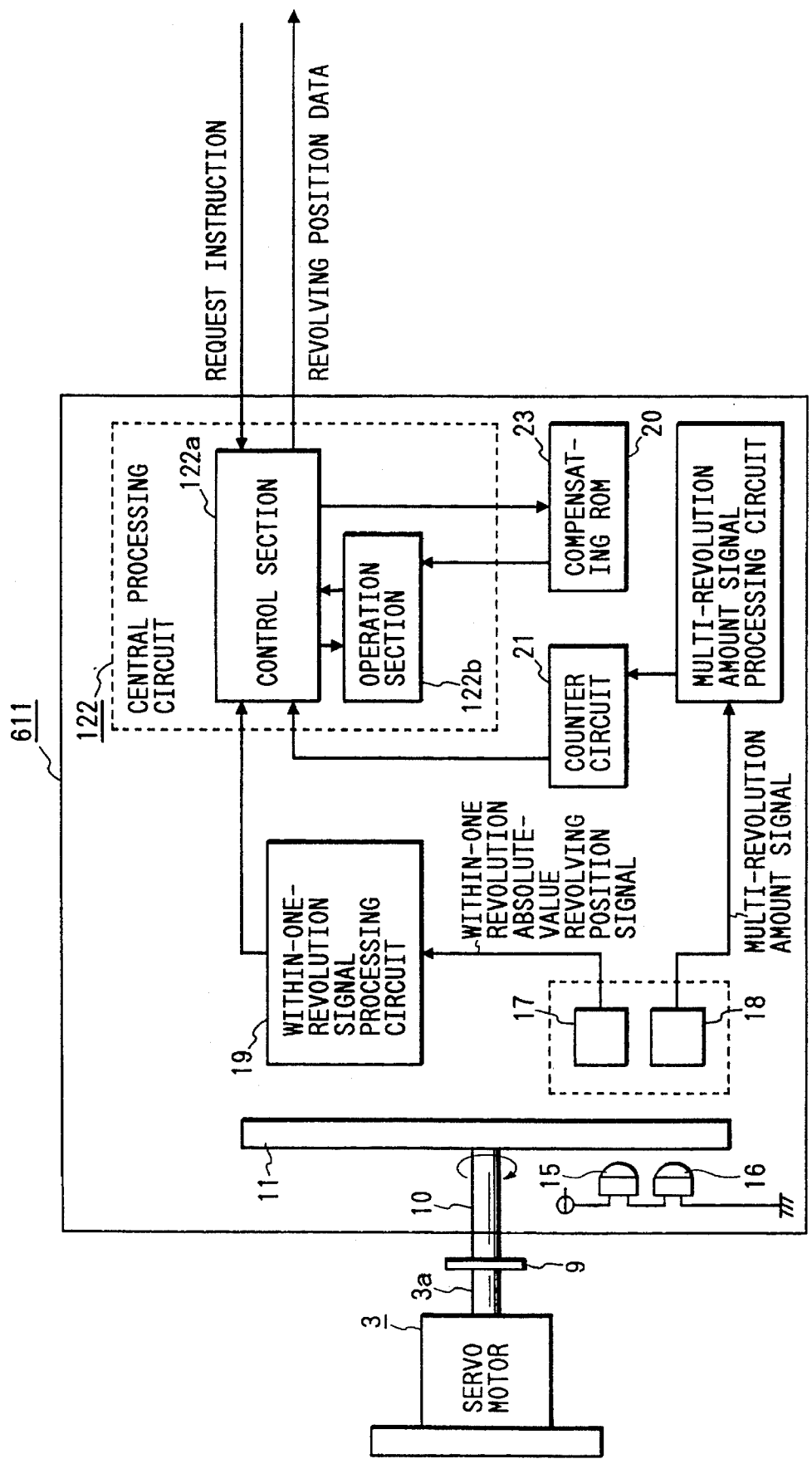
FIG. 35 is a block arrangement diagram of a conventional absolute-value detection type revolution detector.

Referring to FIG. 3, the revolution detector 6 will be described. The optical absolute-value encoder given in FIG. 35 showing the conventional example has been improved to provide the revolution detector 6. A revolving shaft 10 of the revolution detector 6 is coupled to the revolving shaft 3a of the servo motor 3 via a coupling 9.

In this drawing, 11 represents a code disk provided with predetermined slits (not shown) so that a within-one-revolution, absolute-value rotation position and a multi-revolution amount signal may be detected.

15 represents a first light-emitting device, 16 designates a second light-emitting device, 17 denotes a plurality of first light-receiving devices, 18 indicates a plurality of second light-receiving devices, 19 designates a within-one-revolution signal processing circuit, 20 denotes a multi-revolution amount signal processing circuit, 21 represents a counter circuit, 22 indicates a central processing circuit, 22a represents a control section, and 22b designates an operation section.

It is to be understood that the plurality of first light-receiving devices 17, the within-one-revolution signal processing circuit 19 and the central processing circuit 22 comprise rotation angle detecting means, and the plurality of second light-receiving devices 18, the multi-revolution amount signal processing circuit 20 and the counter circuit 21 cooperate to generate a revolution count.

23 denotes storage means, e.g., compensating ROM, to which within-one-revolution division angle error compensation values, i.e., the division angle error compensation values of the revolution detector 6 itself, have already been written, and further to which compensation values including the pitch errors of the ballscrew 4 will be written, as will be described below.

FIG. 2 is the arrangement diagram identical to FIG. 1 with the exception that the measuring instrument 7 and the controller 24 have been removed. FIG. 4 is identical to FIG. 2 with the exception of differences in signals transferred between the servo amplifier 2 and the revolution detector 6 and signal flow, etc., in the revolution detector 6. It is to be understood that a dotted arrow represents an unused instruction of data flow.

Figure 7:
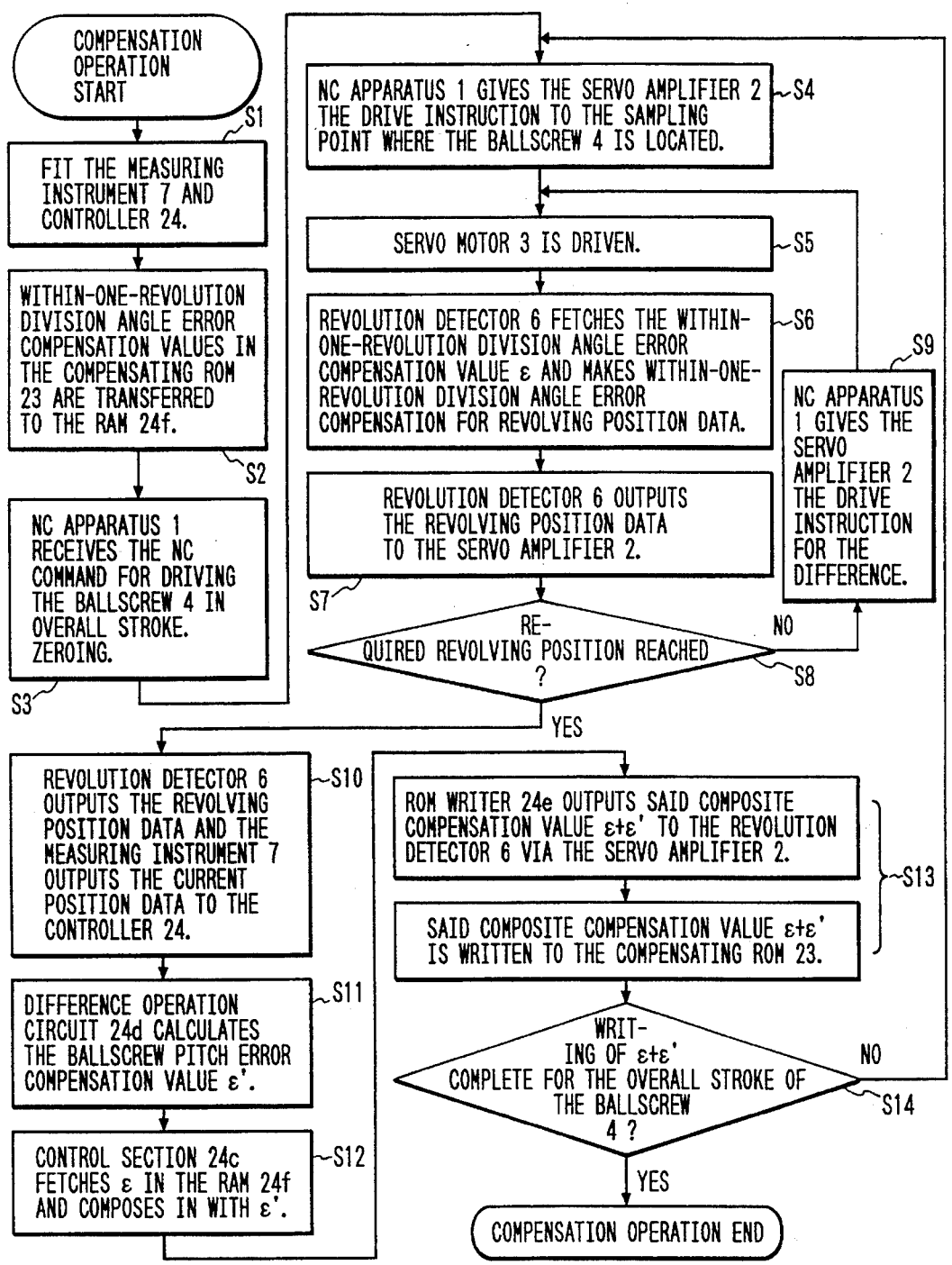
FIG. 7 is a flowchart showing operation at the time of writing compensation values to the compensating ROM according to Embodiment 1 of the present invention.
Figure 8:
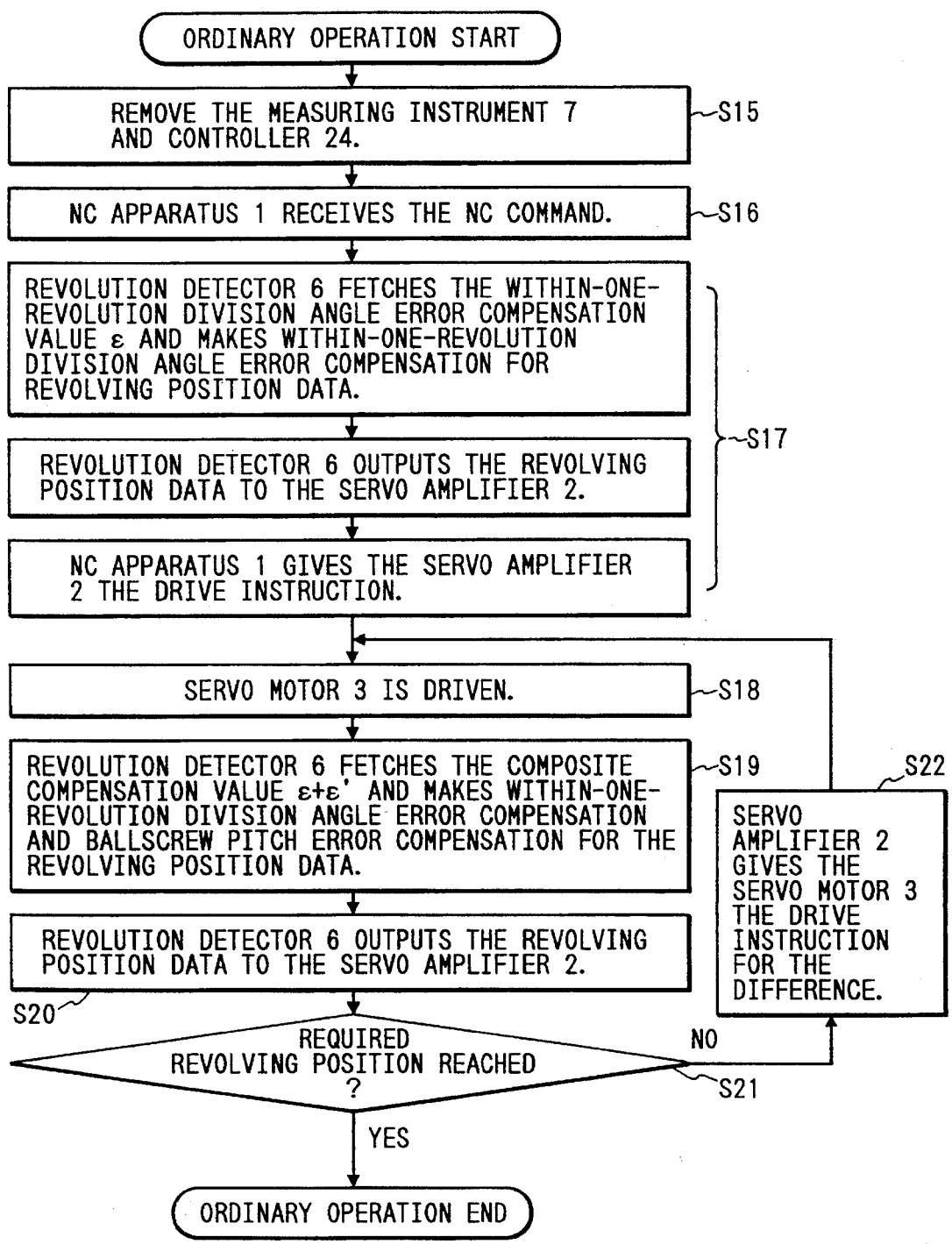
FIG. 8 is a flowchart showing operation at the time of writing compensation values to the compensating ROM according to Embodiment 1 of the present invention.

Operation will now be described with reference to operation flowcharts in FIGS. 7 and 8. To identify an appropriate compensation value including ballscrew 4 pitch error compensation, a machine operation panel (not shown) is operated to move the moving table 5 in an overall stroke as described below, with the measuring instrument 7 fitted to the moving table 5 (step S1) in FIGS. 1 and 3.

First, when the power is switched on, the NC apparatus 1, the servo amplifier 2 and the servo motor 3 are ready to be driven, the first light-emitting device 15 and the second light-emitting device 16 of the revolution detector 6 are lit, and further the measuring instrument 7 and the controller 24 are ready for measurement and operation.

Next, the within-one-revolution division angle error compensation values already stored in the compensating ROM 23 are all transferred to the RAM 24f by the control section 22a and the control section 24c (step S2).

It is to be understood that, as already described in FIG. 35 showing the conventional example, the within-one-revolution division angle error compensation values are used to compensate for the division angle error within one revolution caused by the deflection or the like of the code disk 11 due to the pitch errors of the code disk 11 slits and the misalignment of the code disk 11 and the revolving shaft 10 at the time of installation.

Under an NC command (step S3), the control section 1a gives the servo amplifier 2 a drive instruction based on travel data operated on by the operation section 1b (step S4) to drive the servo motor 3 relative to the origin 5b (step S5).

When the revolving shaft 3a of the servo motor 3 rotates, the revolving shaft 10 of the revolution detector 6 rotates, and further the code disk 11 rotates to pass/intercept the light from the first light-emitting device 15 and the second light-emitting device 16 through the slits of the code disk 11.

The light-receiving devices 17 convert the light received into currents and output a within-one-revolution absolute-value rotation position signal. The within-one-revolution signal processing circuit 19 converts this output into a rectangular-wave voltage and outputs the result to the central processing circuit 122.

The light-receiving devices 18 convert the light received into currents and output a multi-revolution amount signal which indicates the number of revolutions. The multi-revolution amount signal processing circuit 20 converts this output into a rectangular-wave voltage and outputs the result of conversion to the counter circuit 21. The counter circuit 21 counts this output and outputs the result of counting into the central processing circuit 122.

Subsequently, the operation section 22b calculates a compensated within-one-revolution absolute-value rotation position signal under the control of the control section 22a from the output of the within-one-revolution signal processing circuit 19 and the compensation value (division angle error compensation value within one revolution) already written to the compensating ROM 23 and outputs the result of that calculation.

Then, the operation section 22b composes rotation position data resulting from the calculation and the contents of the counter circuit 21, converts the rotation position data into a serial signal and outputs the serial signal to the servo amplifier 2 every time a request instruction is entered from the servo amplifier 2 (step S7).

The control section 1a judges on the basis of the rotation position data from the revolution detector 6 whether or not the required rotation position has been reached (step S8). If it has been judged that the required rotation position has not been reached, a drive instruction is given to the servo amplifier 2 (step S9).

When the required rotation position is reached, the rotation position data is entered via the input section 24b and is output to the difference operation circuit 24d under the control of the control section 24c.

The ballscrew 4 is rotated by the rotation of the servo motor 3 via the coupling 4a to move the moving table 5, and the measuring instrument 7 detects the graduation 7b of the scale 7a by means of the detection device 7c and outputs it to the signal processing circuit 7d, which then converts this output into A- and B-phase rectangular-wave signals and outputs them to the controller 24 as current position data (step S10).

Meanwhile, it is needless to mention that the travel amount of the moving table 5 that should primarily move according to the required revolution amount of the servo motor 3 does not match the actual travel amount measured by the measuring instrument 7 because of the ballscrew 4 pitch error.

Then, under the sampling instruction of the control section 24c, the difference operation circuit 24d calculates the ballscrew pitch error compensation value in $\epsilon'$ at the current position from the rotation position data and current position data (step S11).

The control section 24c reads the within-one-revolution division angle error compensation value corresponding to the then rotation position data from the RAM 24f, adds this read data to the calculated ballscrew pitch error compensation value to create a composite compensation value (step S12), and outputs this composite compensation value to the ROM writer 24e.

The ROM writer 24e writes this composite compensation value to the compensating ROM 23 via the servo amplifier 2 and the control section 22a (step S13).

It is to be noted that the pitch error compensation value includes the compensation values of at least a rotation system's rotation angle error (torsion error), in addition to the compensation value of the pitch error.

The command position of the NC command is changed sequentially by a predetermined amount to perform this operation for the overall stroke of the ballscrew 4 (step S14). Subsequently the measuring instrument 7 and the controller 24 are removed to permit a set up for ordinary operation (step S15).

Referring to FIGS. 2 and 4, under an NC command (step S16), the control section 1 a gives the servo amplifier 2 the drive instruction based on the travel data calculated by the operation section 1b and determines the current position on the basis of the rotation position data from the revolution detector 6 (step S17), and drives the servo motor 3 (step S18).

When the revolution detector 6 is then rotated by the rotation of the revolving shaft 3a of the servo motor 3, the revolving shaft 10 rotates inside the revolution detector 6, and further the code disk 11 rotates to pass/intercept the lights of the first light-emitting device 15 and the second light-emitting device 16 through the slits of the code disk 11.

The light-receiving devices 17 convert the light received into currents and output the within-one-revolution absolute-value rotation position signal. The within-one-revolution signal processing circuit 19 converts this output into a rectangular-wave voltage and outputs the result to the central processing circuit 22.

The light-receiving devices 18 convert the light received into currents and output a multi-revolution amount signal which indicates the number of revolutions. The multi-revolution amount signal processing circuit 20 converts this output into a rectangular-wave voltage. The counter circuit 21 counts the output of this conversion and outputs the result of counting to the central processing circuit 22.

Subsequently, under the control of the control section 22a, the operation section 22b selects the corresponding composite compensation value from among the composite compensation values (composite compensation values consisting of the within-one-revolution division angle error compensation values and the ballscrew pitch error compensation values) inside the compensating ROM 23 according to the contents of the counter circuit 21 and reads this selected composite compensation value from the compensating ROM 23. Also, the operation section 22b compensates for the output of the within-one-revolution signal processing circuit 19 according to the contents read and calculates compensated rotation position data according to the result of that compensation and the contents of the counter circuit 21 (step S19).

Every time the request instruction is entered from the servo amplifier 2, the compensated rotation position data in the form of a serial signal is output to the servo amplifier 2 (step S20).

The servo amplifier 2 judges on the basis of the rotation position data from the revolution detector 6 whether or not the required rotation position has been reached (step S21). If it is judged that the required rotation position has not been reached, a drive instruction based on a position difference is given to the servo motor 3 (step S22).

As described above, the moving table 5 is moved under the closed-loop control fed back to the servo amplifier 2.

It is to be noted that as described above, the composite compensation value (composite compensation value of the within-one-revolution division angle error compensation value and the ballscrew pitch error compensation value) is selected on the basis of the multi-revolution amount signal to enable the ballscrew pitch error compensation to be made according to the position of the moving table 5. Namely, the within-one-revolution division angle error and ballscrew pitch error are compensated for simultaneously by the compensation value reading and the read-data-based compensation operation, which has only been performed once.

It is to be understood that rotation position calculation is performed by the central processing circuit 22.

Also, when the system power is restored after it was switched off due to a power failure or the like, the revolution detector 6 is the absolute-value encoder, and if the system power is switched off, the counter circuit 21 and other parts in the revolution detector 6 are battery-backed, whereby the apparatus can be restarted from where it had stopped at the occurrence of the power failure.

The process of calculating the ballscrew pitch error compensation value in the controller 24 will now be described with reference to FIG. 5.

In this drawing, a+$\epsilon$ indicates rotation position data from the revolution detector 6 which is the sum of an absolute-value rotation position signal a, or the output value of the within-one-revolution signal processing circuit 19, and the within-one-revolution division angle error compensation value $\epsilon$ written to the compensating ROM 23. $\epsilon$ is equivalent to $\epsilon1$ to $\epsilon8$ described in the conventional example shown in FIG. 36.

b indicates current position data based on the output value of the measuring instrument 7. It is to be understood that this current position data has been converted into the scale of the rotation position data from the revolution detector 6.

It is to be understood that $\epsilon'$ indicated by b-(a+$\epsilon$) in the figure is the ballscrew pitch error.

According to the embodiment of the present invention, $\epsilon+\epsilon'$ is written to the compensating ROM 23 as the composite compensation value. It is to be understood that $\epsilon$ and $\epsilon'$ are both positive values in the drawing.

$\epsilon+\epsilon'$ is written to the compensating ROM 23 as the composite compensation value, whereby the number of access times to the compensating ROM 23 for reading the compensation value does not increase (remains one time as indicated in the conventional example), and the ballscrew pitch error compensation value $\epsilon'$ as well as the within-one-revolution division angle error compensation value $\epsilon$ can be compensated for at the same time.

Storing in the compensating ROM 23 the composite compensation value per pitch of the ballscrew 4, for example, is not only difficult because of the limitation on the storage capacity of the compensating ROM 23, but is also often useless.

FIG. 6 shows an example of the accumulative ballscrew pitch error of the ballscrew 4 and a case where the accumulative ballscrew pitch error is compensated for by a typical value set for each division region. It is to be understood that in this drawing, the horizontal axis represents the number of ballscrew pitches and the vertical axis represents the accumulative ballscrew pitch error.

In this example, while the total number of ballscrew pitches is 80, n=8, i.e., compensation is made per 10 pitches. Namely, the half value of the maximum value and minimum value of the accumulative ballscrew pitch error is found at intervals of 10 pitches and $\epsilon1'$ to $\epsilon8'$ thus found are used as the typical values of the ballscrew pitch error in respective division regions and as the ballscrew pitch error compensation values in the corresponding division regions.

By setting the number of division regions "n" according to the capacity of the compensating ROM 23 as described above, the compensating ROM 23 need not always have a large storage capacity.

Embodiment 2

An alternative embodiment of the present invention will now be described in accordance with FIGS. 3, 9, 10, 11, 12, 13, 14 and 15.

Figure 9:
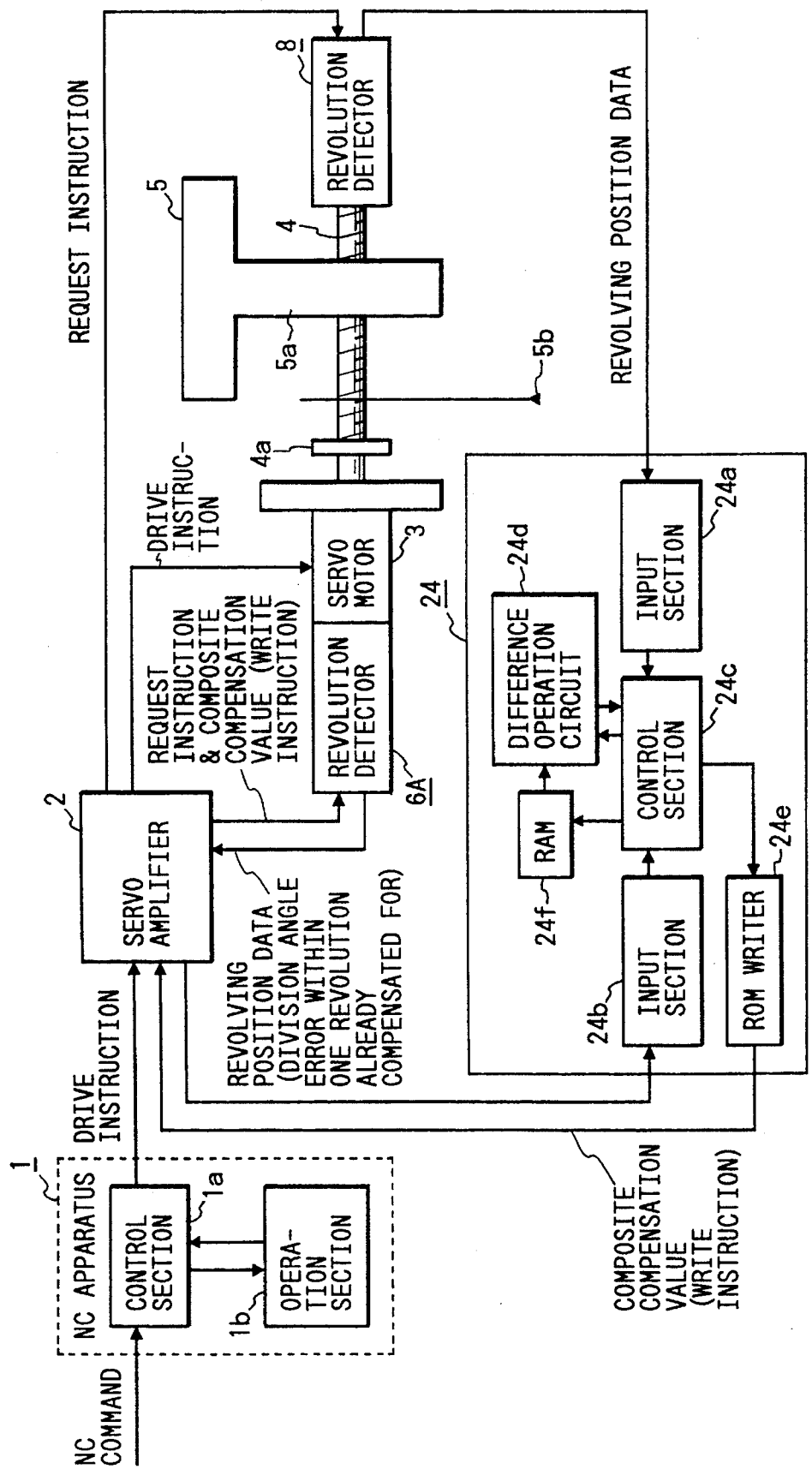
FIG. 9 is a block arrangement diagram of a machining apparatus having a rotation detection device and being arranged at the time of writing compensation values to a compensating ROM, according to Embodiment 2 of the present invention.

FIG. 9 corresponds to FIG. 1, FIG. 10 to FIG. 2, FIG. 11 to FIG. 4, FIG. 12 to FIG. 35, and FIG. 14 to FIG. 5, respectively.

Figure 12:
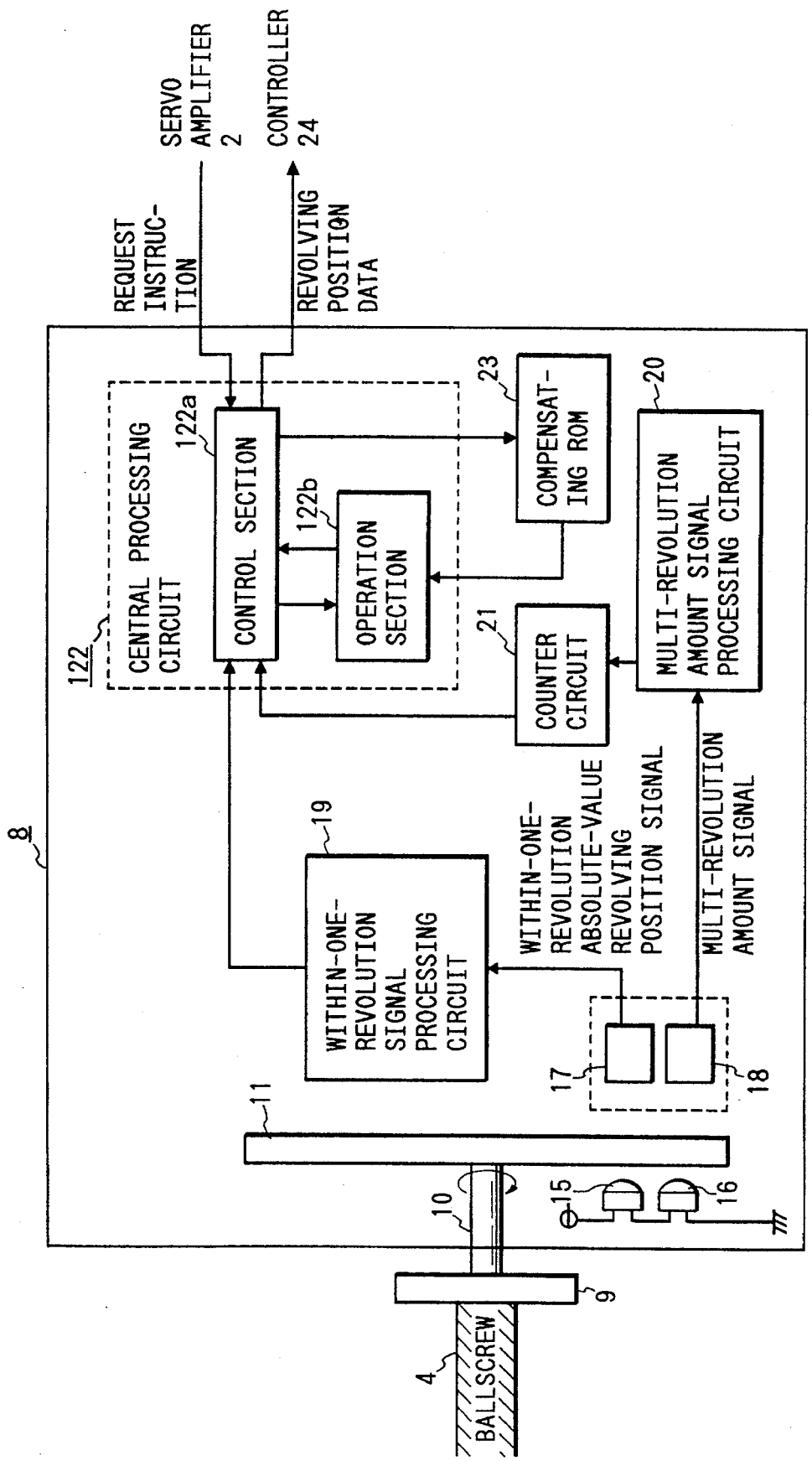
FIG. 12 is a block arrangement diagram showing the operation of a measuring instrument (revolution detector), according to Embodiment 2 of the present invention.

In FIG. 12, 8 indicates table position detecting means, e.g., a revolution detector. It is to be understood that this revolution detector 8 is identical to the revolution detector 6 shown in FIG. 3. Also, the revolution detector 8 may be identical to the optical absolute-value encoder employed in the conventional example shown in FIG. 35.

Figure 10:
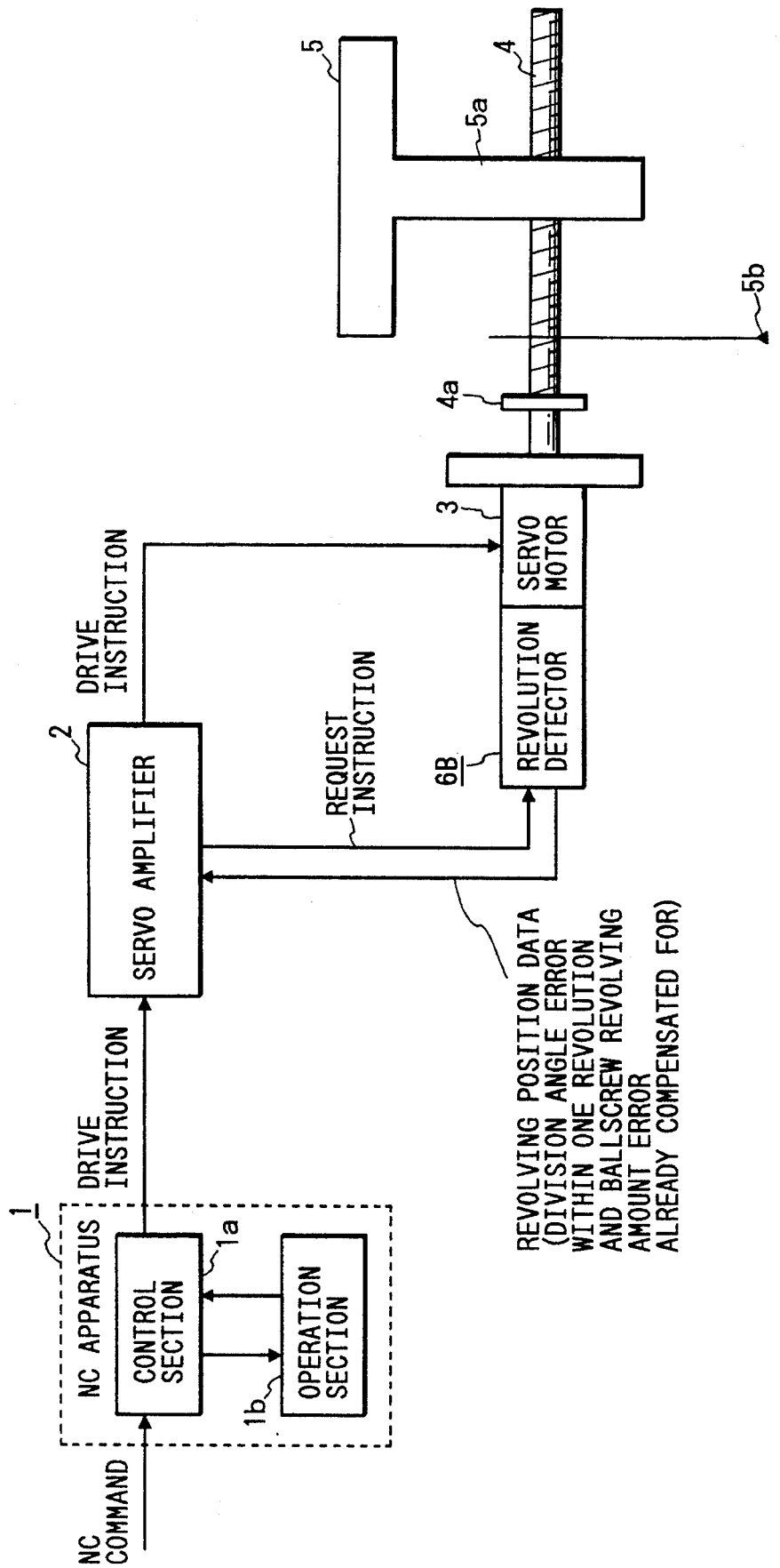
FIG. 10 is a block arrangement diagram of a machining apparatus having a rotation detection device as arranged at the time of ordinary operation, according to Embodiment 2 of the present invention.
Figure 11:
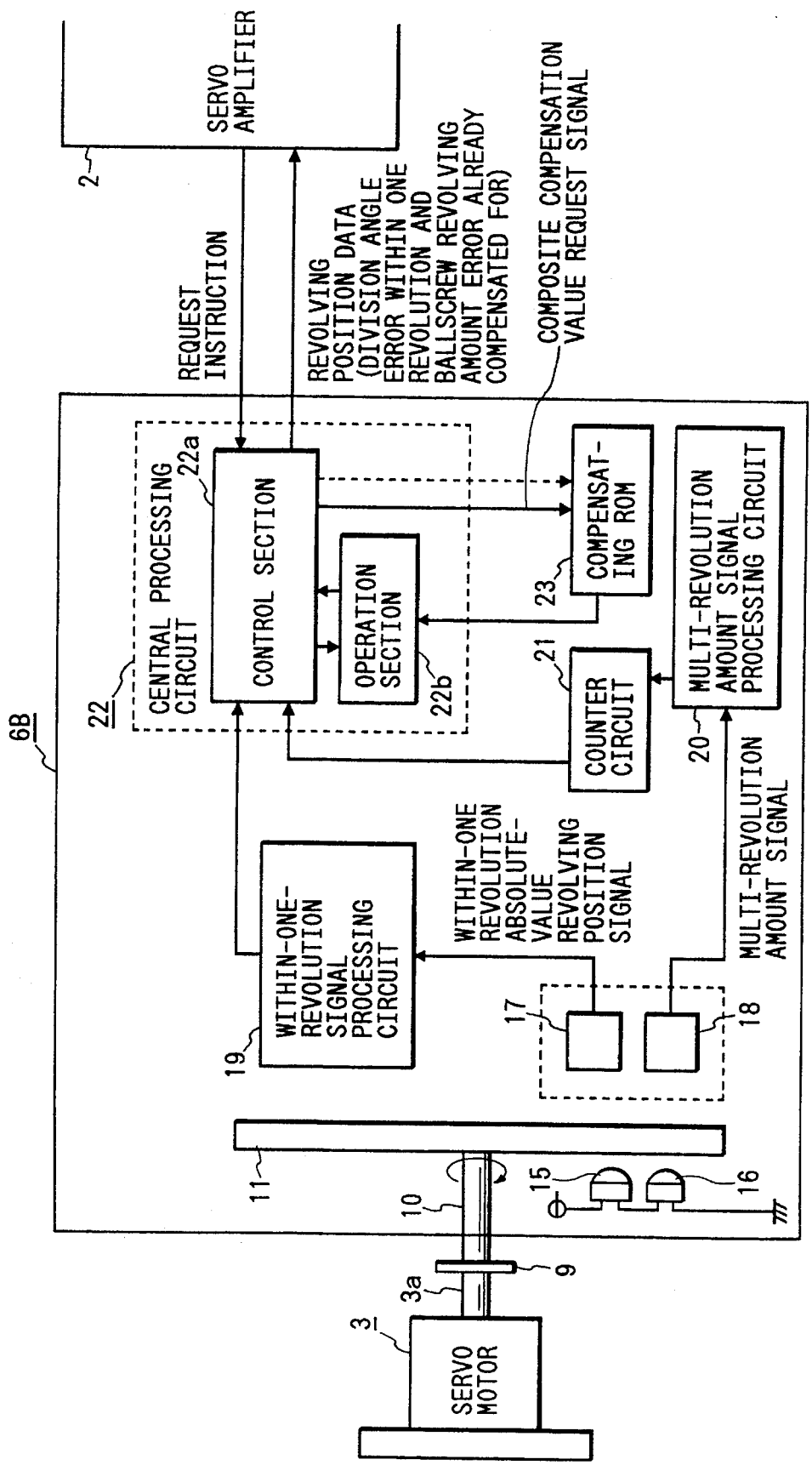
FIG. 11 is a block arrangement diagram showing the operation of a revolution detector at the time of ordinary operation, according to Embodiment 2 of the present invention.

FIGS. 9 and 10 are entire arrangement diagrams of the entire system. FIG. 3 is an arrangement diagram of the revolution detector 6A in FIG. 9, and FIG. 11 is an arrangement diagram of the revolution detector 6B in FIG. 10. It is to be understood that FIGS. 9 and 3 are arrangement diagrams at the time of a compensation operation and FIGS. 10 and 11 are arrangement diagrams at the time of a ordinary operation after a compensation operation.

Figure 13:
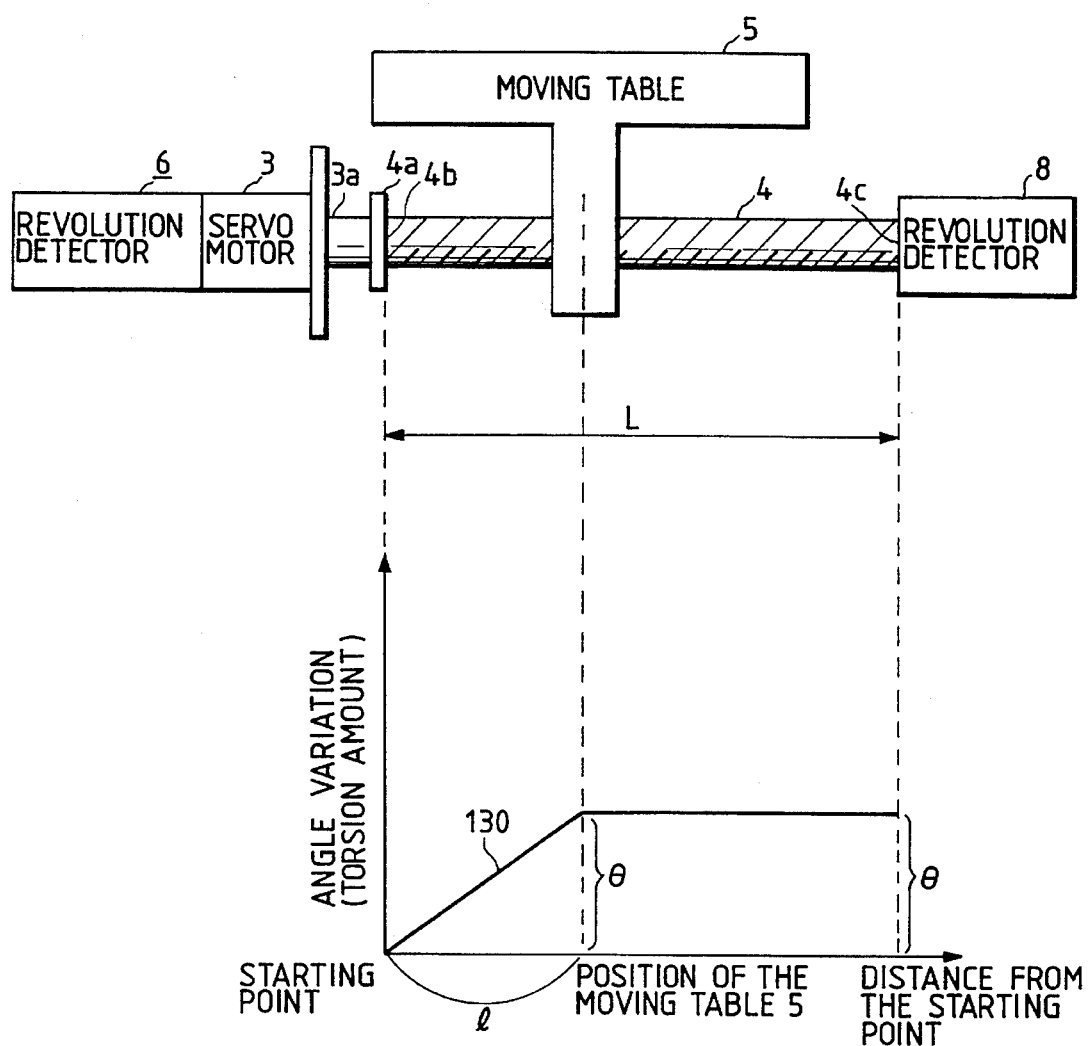
FIG. 13 is a diagram illustrating an angle variation (torsion), according to Embodiment 2 of the present invention.
Figure 15:
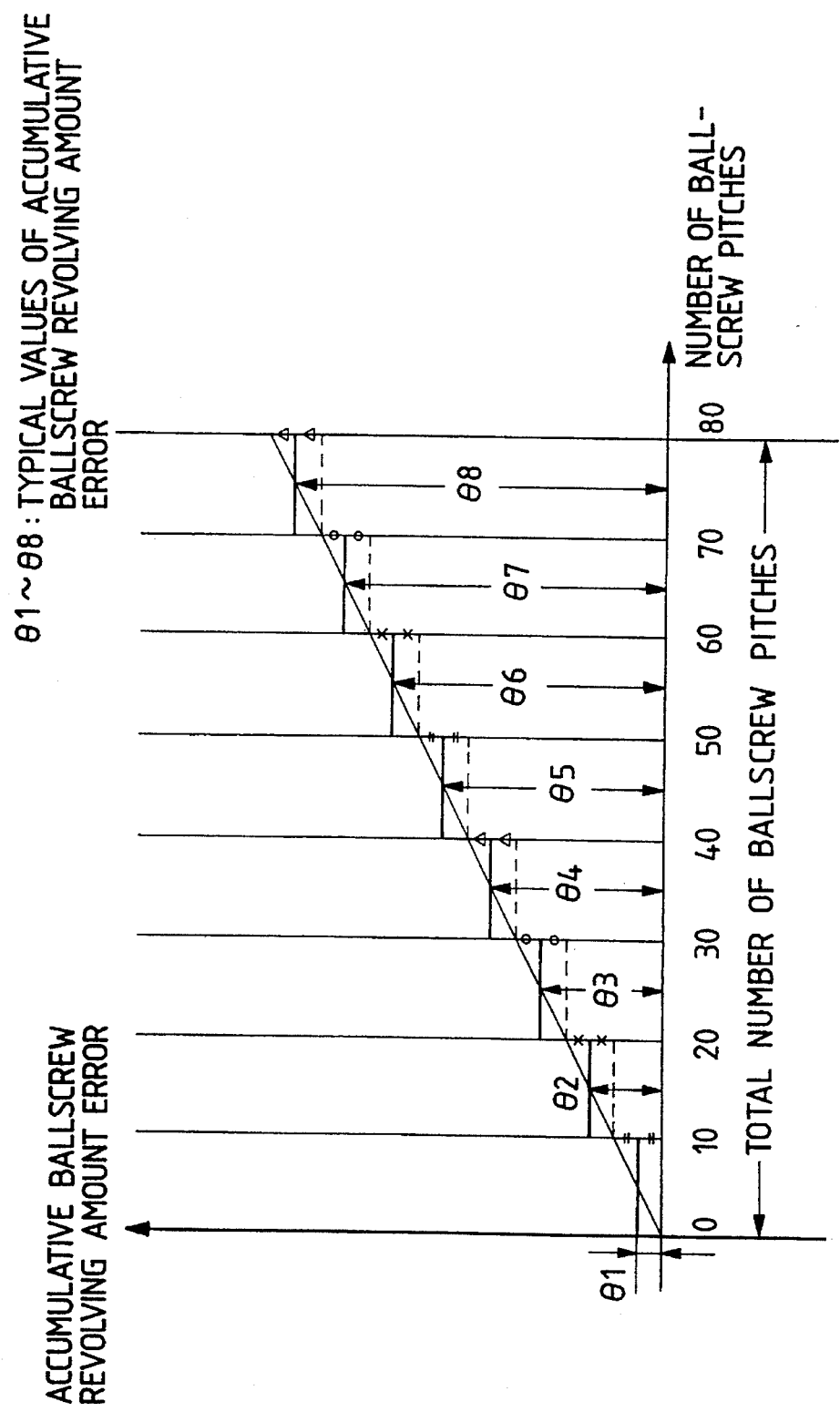
FIG. 15 is a diagram illustrating an accumulative ballscrew revolving amount error, according to Embodiment 2 of the present invention.

FIG. 12 is an arrangement diagram of the revolution detector 8, FIG. 13 shows an angle variation (torsion), FIG. 15 is a conception diagram of a ballscrew revolution amount error compensation value, and FIG. 15 is an accumulative ballscrew revolution amount error diagram.

A machine operation panel (not shown) is operated to move the moving table 5 in an overall stroke as described below, with the revolution detector 8 identical to the revolution detector 6 fitted to the other end of the ballscrew 4 as shown in FIG. 9.

First, when the power is switched on, the NC apparatus 1, the servo amplifier 2 and the servo motor 3 are ready to be driven, the first light-emitting device 15 and the second light-emitting device 16 of the revolution detector 6A are lit, the first light-emitting device 15 and the second light-emitting device 16 of the revolution detector 8 are also lit, and further the controller 24 is ready for operation.

Next, the within-one-revolution division angle error compensation values already stored in the compensating ROM 23 are all transferred to the RAM 24f under the control of the control section 22a and the control section 24c.

Then, under an NC command, the control section 1a gives the servo amplifier 2 a drive instruction based on travel data operated on by the operation section 1b to drive the servo motor 3 relative to the origin 5b.

Every time a request instruction is entered from the servo amplifier 2, the revolution detector 6A outputs the rotation position data to the controller 24 via the servo amplifier 2. This rotation position data is entered into the input section 24b of the controller 24 and is output to the difference operation circuit 24d under the control of the controller 24c. It is needless to mention that the within-one-revolution division angle error compensation has already been made for the rotation position data.

Also, since the ballscrew 4 is rotated by the rotation of the servo motor 3 via the coupling 4a, the rotation position data of the revolution detector 8 is also output to the difference operation circuit 24d as in the revolution detector 6A.

Meanwhile, it is needless to mention that the revolution amount of the servo motor 3 does not match the revolution amount of the ballscrew 4 because of the revolution amount error due to the torsion, etc., of the ballscrew 4 itself.

Next, under a sampling instruction from the control section 24c, the difference operation circuit 24d operates on the ballscrew revolution amount error compensation value in the current position from the rotation position data given by the revolution detector 6A and the rotation position data provided by the revolution detector 8. Simultaneously, the control section 24d reads from the RAM 24f the within-one-revolution division angle error compensation value corresponding to the within-one-revolution current rotation position based on the rotation position data given by the revolution detector 6, adds this read data to the calculated ballscrew revolution amount error compensation value to create a composite compensation value, and outputs this composite compensation value to the ROM writer 24e. The ROM writer 24e writes this composite compensation value to the compensating ROM 23 via the servo amplifier 2 and the control section 22a.

The command position of the NC command is changed sequentially by a predetermined amount to perform the operation in the overall stroke of the ballscrew 4. Subsequently the revolution detector 8 and the controller 24 are removed to set up the apparatus for ordinary operation. Referring to FIGS. 10 and 11, under the NC command, the control section 1a gives the servo amplifier 2 a drive instruction based on the travel data operated on by the operation section 1b to drive the servo motor 3.

It is to be understood that in FIG. 11, the signal path indicated by a dotted line represents a data flow which is not used for the ordinary operation.

Inside the revolution detector 6B, the control section 22a of the central processing circuit 22 reads the corresponding composite compensation value (composite compensation value of the within-one-revolution division angle error compensation value and the ballscrew revolution amount error compensation value) from the compensating ROM 23 according to the contents of the counter circuit 21, and compensates for the output of the within-one-revolution signal processing circuit 19 according to the contents read. It then creates compensated rotation position data according to the result of the compensation and the contents of the counter circuit 21. Thereafter, every time the request instruction is entered from the servo amplifier 2, the compensated rotation position data is converted into a serial signal and the result of conversion is output to the servo amplifier 2.

As described above, the moving table 5 is moved under the closed-loop control fed back to the servo amplifier 2.

It is to be noted that as described above, the composite compensation value (composite compensation value of the within-one-revolution division angle error compensation value and the ballscrew revolution amount error compensation value) is selected on the basis of the multi-revolution amount signal to enable the compensation to be made according to the number of ballscrew pitches. It is to be noted that the within-one-revolution division angle error and ballscrew revolution amount error are compensated for simultaneously by this compensation.

Also, when the system power is restored after it was switched off due to a power failure or the like, the revolution detector 6B is the absolute-value encoder, and if the system power is switched off, the counter circuit 21 and other parts are battery-backed, whereby the apparatus can be restarted from where it had stopped at the occurrence of the system power off.

The ballscrew revolving amount error compensation value written to the compensating ROM 23 will now be described. As described above, it has been confirmed that the torsion of the ballscrew 4 itself is the major factor of the ballscrew revolving amount error and cannot be ignored in accurate positioning of the moving table 5.

As shown in FIG. 13, it is assumed that the length of the ballscrew 4 is L, the servo motor 3 side end of the ballscrew 4 is a starting end 4b, the opposite end is a terminal end 4c, a distance from the starting end 4b to the leg 5a of the moving table 5 is 1, and an angle variation relative to a starting point generated by torsion at the position of distance 1 is θ.

When a driving force is provided by the servo motor 3, the ballscrew 4 rotates, and the moving table 5 is at the position of distance 1, the angle variation at any position on the ballscrew 4 is as indicated by the line 130 in FIG. 13. It is to be understood that the horizontal axis represents a distance from the starting end 4b and the vertical axis represents the angle variation.

Also, the angle variation up to position 1 of the moving table 5 is proportional to the distance from the starting point and hardly changes from position 1 to the terminal end 4c of the ballscrew 4. Accordingly, the angle variation θ at position 1 of the moving table 5 appears at the terminal end 4c of the ballscrew 4.

The revolution detector 8 fitted to the terminal end 4c of the ballscrew 4 allows the measurement of rotation position data including the angle variation θ due to torsion at position 1 of the moving table 5.

In the present embodiment, this angle variation 8 is calculated by the difference operation circuit 24d, the within-one-revolution division angle error compensation value ε is added to the angle variation, and ε+θ is used as the composite compensation value and written to the compensating ROM 23.

Figure 14:
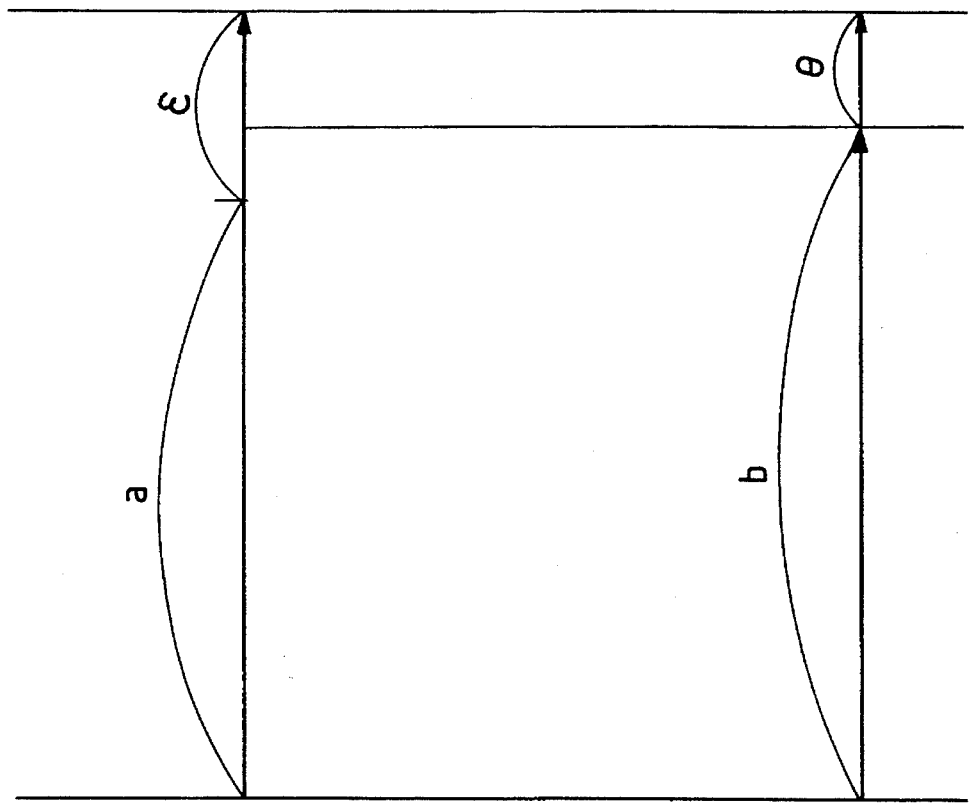
FIG. 14 is a diagram illustrating the concept of ballscrew revolving amount error compensation values, etc. in Embodiment 2 of the present invention.

The process of calculating the ballscrew revolving amount error compensation value in the controller 24 will now be described with reference to FIG. 14.

Figure 36:
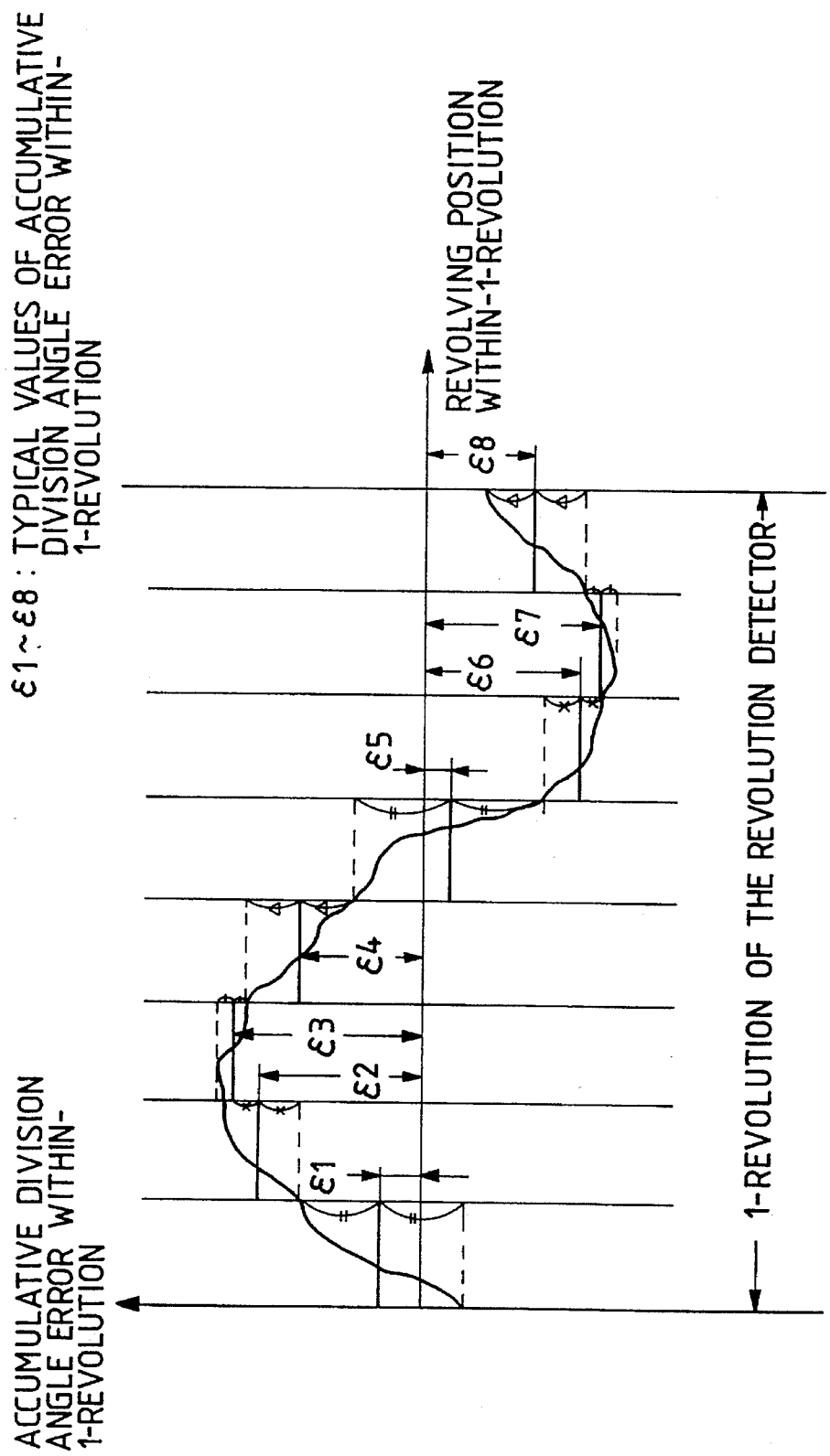
FIG. 36 is a diagram illustrating a within-one-revolution accumulative division angle error in the conventional absolute-value detection type revolution detector.
Figure 37:
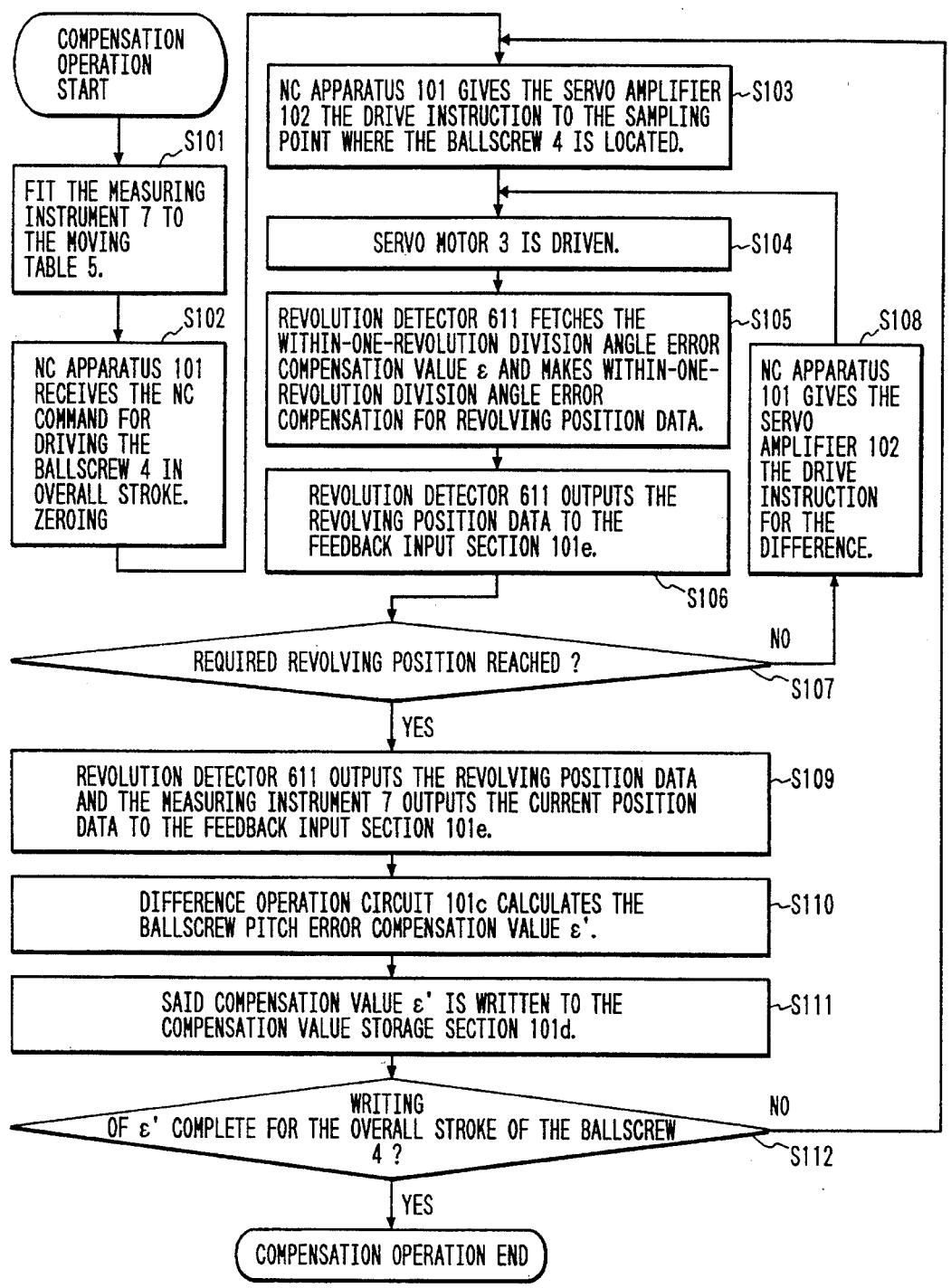
FIG. 37 is a flowchart showing operation at the time of writing compensation values to the compensation value storage section in the conventional apparatus.
Figure 38:
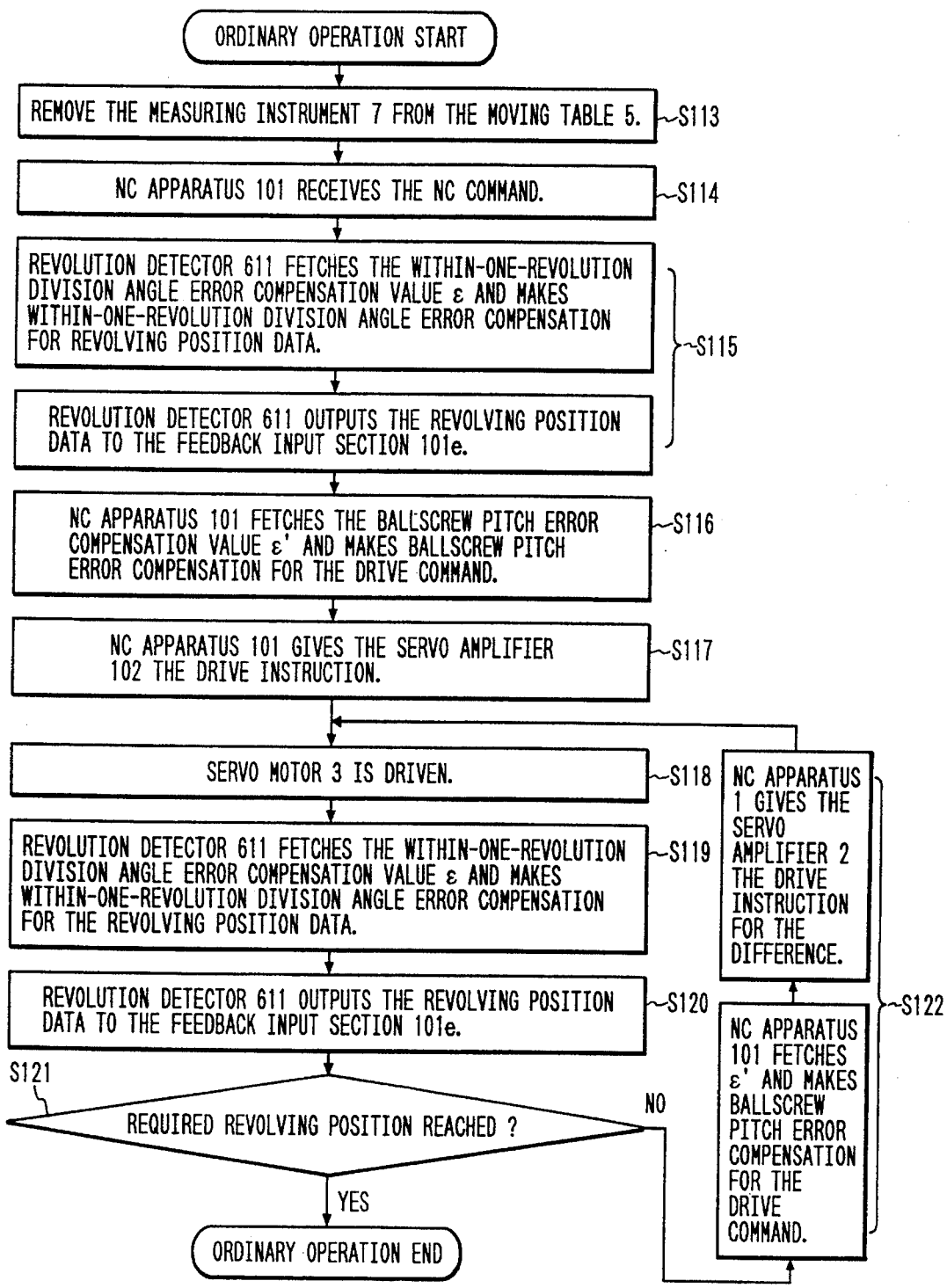
FIG. 38 is a flowchart showing operation at the time of writing compensation values to the compensation value storage section in the conventional apparatus.

In this drawing, a+ε indicates rotation position data output by the revolution detector 6, which is the sum of an absolute-value rotation position signal a, or the output value of the within-one-revolution signal processing circuit 19, and the within-one-revolution division angle error compensation value ε written to the compensating ROM 23. ε is equivalent to ε1 to ε8 described in the conventional example shown in FIG. 36.

b indicates rotation position data indicated by the output value of the revolution detector 8 at a time when the ballscrew 5 is actually rotated. In the drawing, θ indicated by |determinant of (a+ε)−b| is the ballscrew revolving amount error, and ε+θ is written to the compensating ROM 23 as the composite compensation value. It is to be understood that ε is a positive value and θ is a negative value in the figure.

By writing s+θ to the compensating ROM 23 as the composite compensation value, the number of access times to the compensating ROM 23 for reading the compensation value does not increase (remains one time as indicated in the conventional example), and the within-one-revolution division angle error compensation value ε and the ballscrew revolving amount error compensation value θ can be compensated for at the same time.

As in Embodiment 1, storing the compensating ROM 23 with the composite compensation value per pitch of the ballscrew 4 in the overall stroke of the moving table 5, for example, is not only difficult due to the limitation on the storage capacity of the compensating ROM 23, but is also often useless.

FIG. 15 shows an example of the accumulative ballscrew revolving amount error of the ballscrew 4 and a case where the accumulative ballscrew revolving amount error is compensated for by a typical value set for each division region. It is to be understood that in this drawing, the horizontal axis represents the number of ballscrew pitches and the vertical axis represents the accumulative ballscrew revolving amount error.

In this example, while the total number of ballscrew pitches is 80, n=8, i.e., compensation is made per 10 pitches. Namely, the half value of the maximum value and minimum value of the accumulative ballscrew revolving amount error is found at intervals of 10 pitches and θ1 to θ8 thus found are used as the typical values of the ballscrew revolving error in respective division regions, and as the ballscrew revolving amount error compensation values in the corresponding division regions.

Also, while the division angle compensation values of the revolution detector 6 itself are read from the revolving detector 6 and stored in the RAM 24f beforehand and the write signal is output to the compensating ROM 23 according to the storage contents of said RAM 24f, the detection output of the revolution detector 6 itself for which the division angle has been compensated, and the output of the measuring instrument 7 or the revolution detector 8 in Embodiment 1 or 2, the write signal may also be output to the compensating ROM 23 according to the detection output of the revolution detector 6 itself for which the division angle has not been compensated and the output of the measuring instrument 7 or the revolution detector 8.

Embodiment 3

A further alternative embodiment of the present invention will now be described in accordance with FIGS. 16, 17, 18, 19, 20, 21 and 22.

FIGS. 16, 17, 18, 19, 20, 21 and 22 correspond to FIGS. 9, 10, 3, 11, 12, 14 and 15 in Embodiment 2, respectively.

Figure 20:
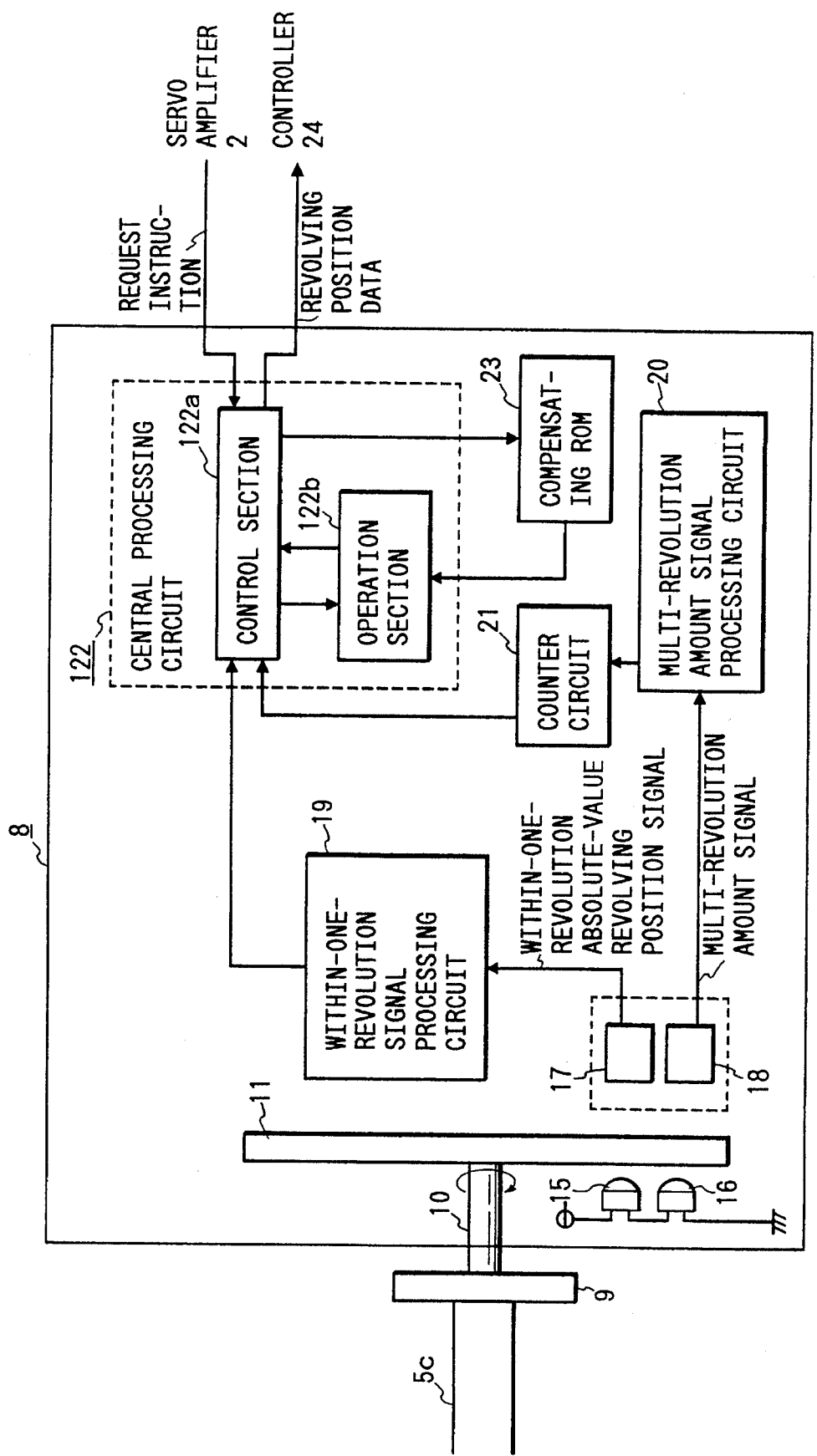
FIG. 20 is a block arrangement diagram showing the operation of a measuring instrument (revolution detector) according to Embodiment 3 of the present invention.

The revolution detector 8 shown in FIG. 20 is identical to the revolution detector 6 shown in FIG. 3. It is to be understood that the revolution detector 8 may be identical to the optical absolute-value encoder employed in the conventional example shown in FIG. 35.

Figure 16:
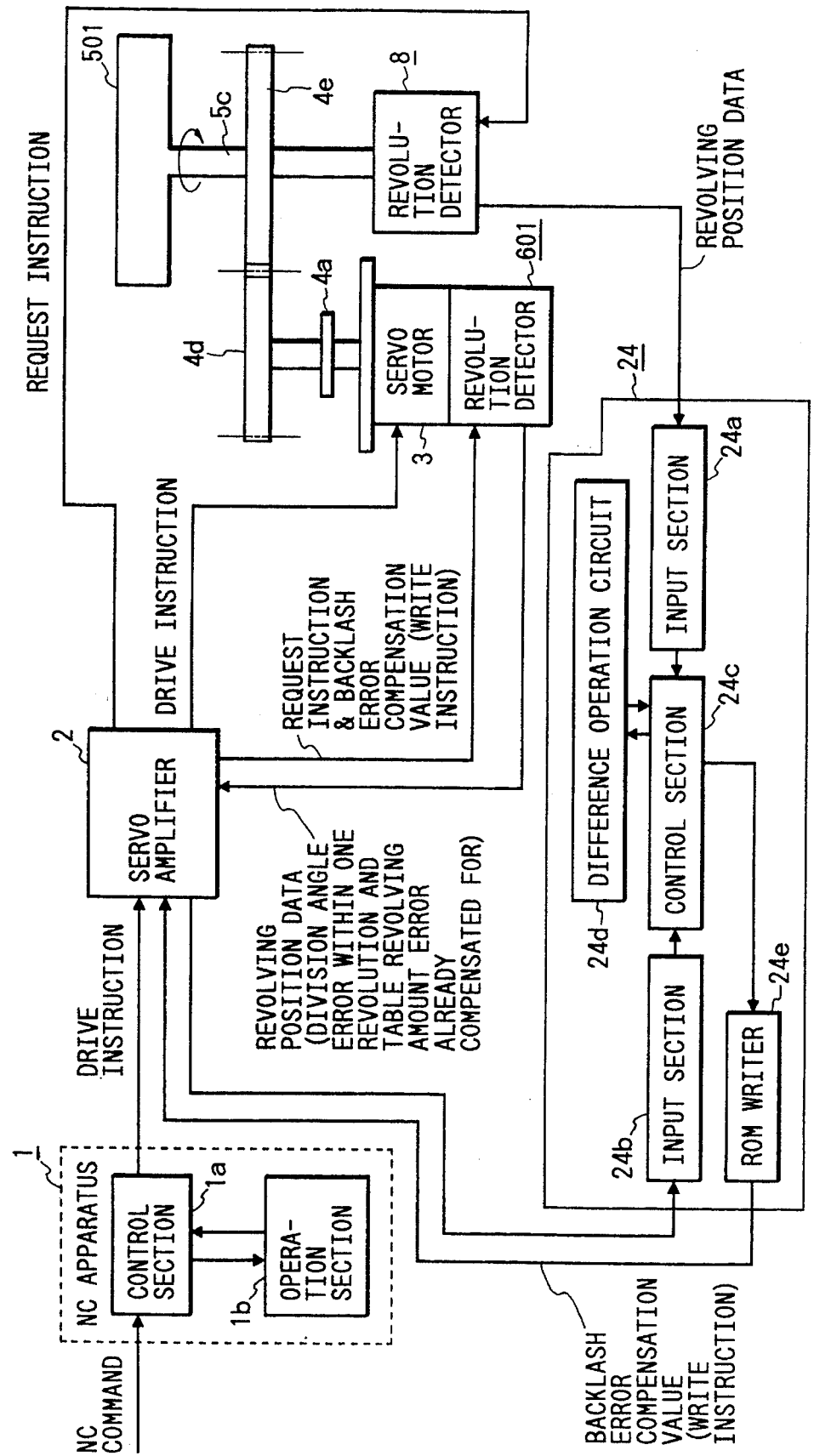
FIG. 16 is a block arrangement diagram of a machining apparatus having a rotation detection device and being arranged at the time of writing compensation values to a compensating ROM, according to Embodiment 3 of the present invention.
Figure 17:
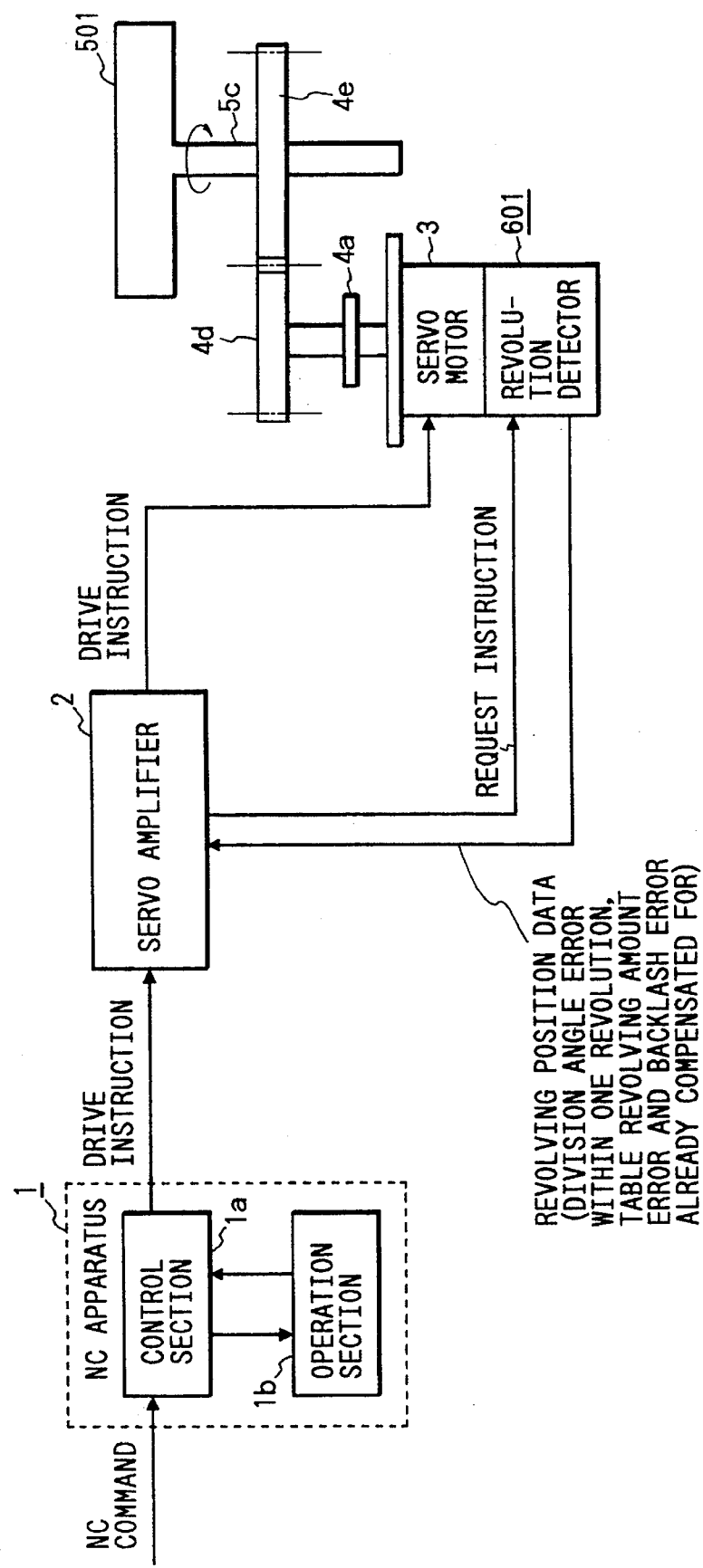
FIG. 17 is a block arrangement diagram of the machining apparatus having a rotation detection device as arranged at the time of ordinary operation, according to Embodiment 3 of the present invention.
Figure 18:
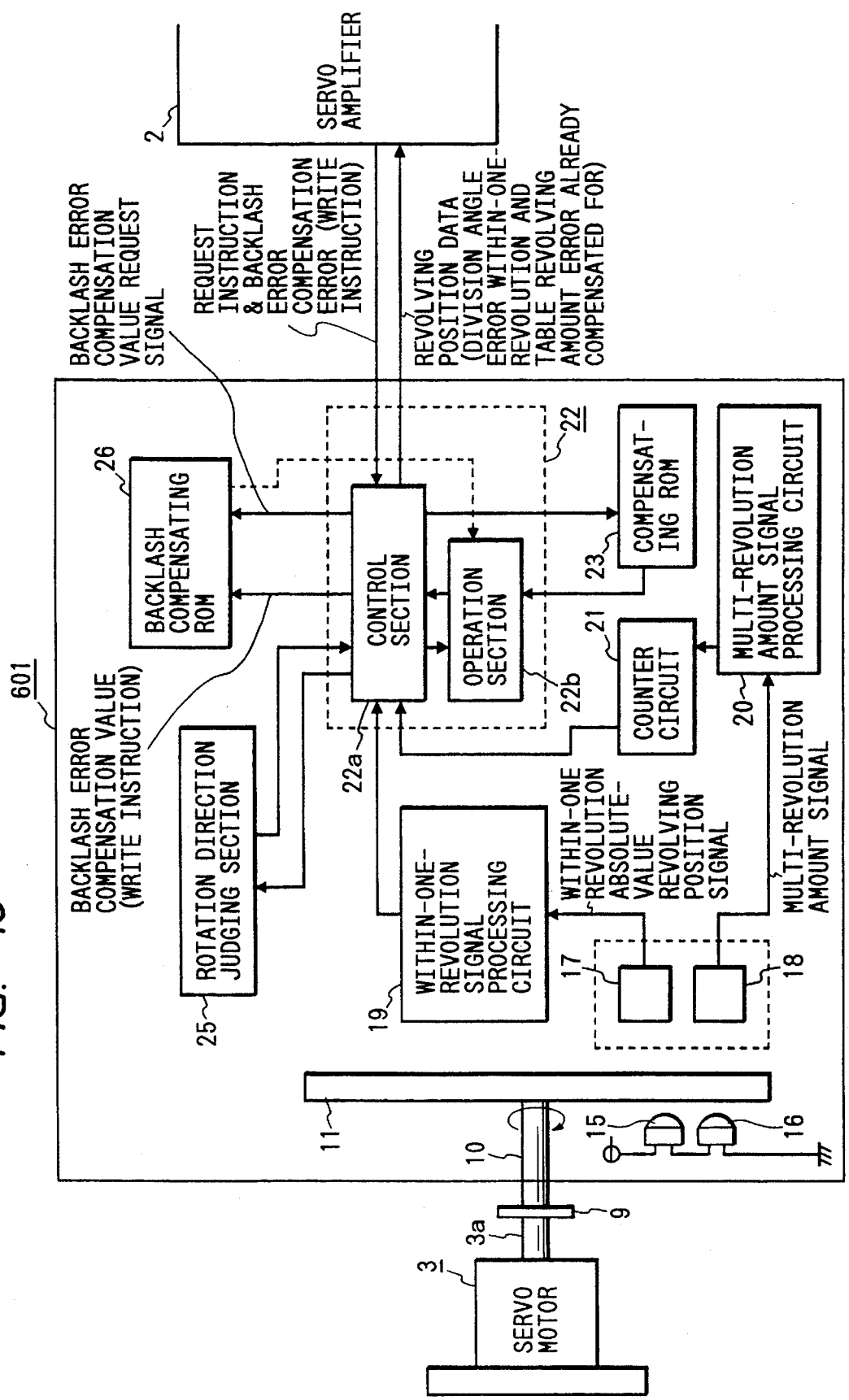
FIG. 18 is a block arrangement diagram showing the operation of a revolution detector at the time of writing compensation values to the compensating ROM according to Embodiment 3 of the present invention.
Figure 19:
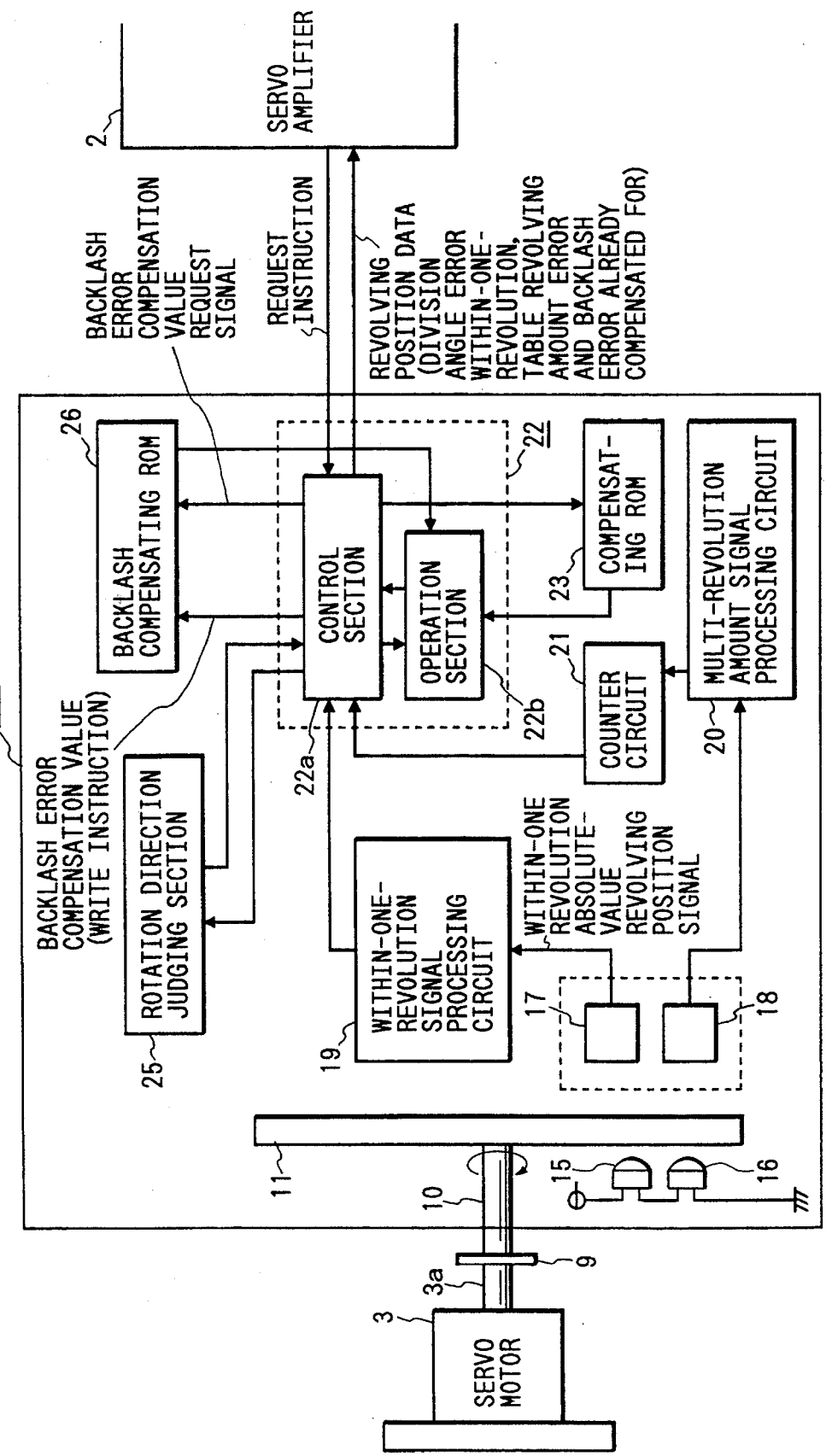
FIG. 19 is a block arrangement diagram showing the operation of the revolution detector at the time of ordinary operation according to Embodiment 3 of the present invention.

FIGS. 16 and 17 are arrangement diagrams for the entire system. FIG. 18 is an arrangement diagram of a revolution detector 601 in FIG. 16, and FIG. 19 is an arrangement diagram of the revolution detector 601 in FIG. 17. It is to be understood that FIGS. 16 and 18 are arrangement diagrams at the time of a compensation operation and FIGS. 17 and 19 are arrangement diagrams at the time of ordinary operation after a compensation operation.

Figure 21:
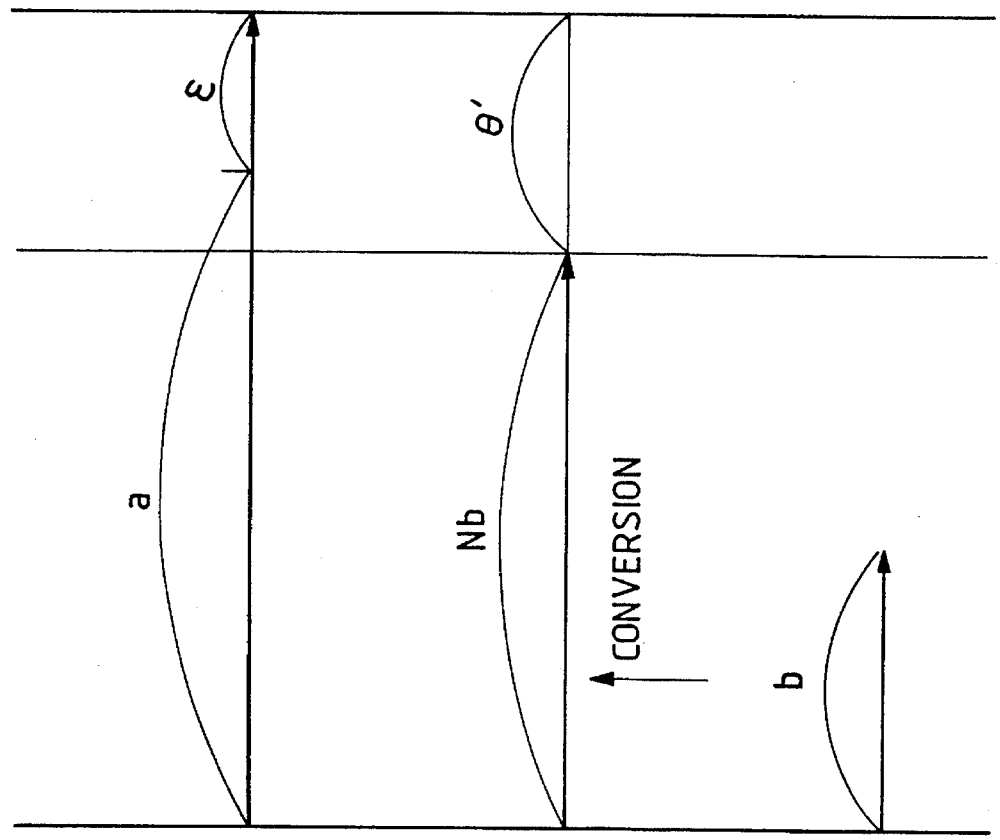
FIG. 21 is a diagram illustrating the concept of a table having revolving amount error compensation values, etc. in Embodiment 3 of the present invention.
Figure 22:
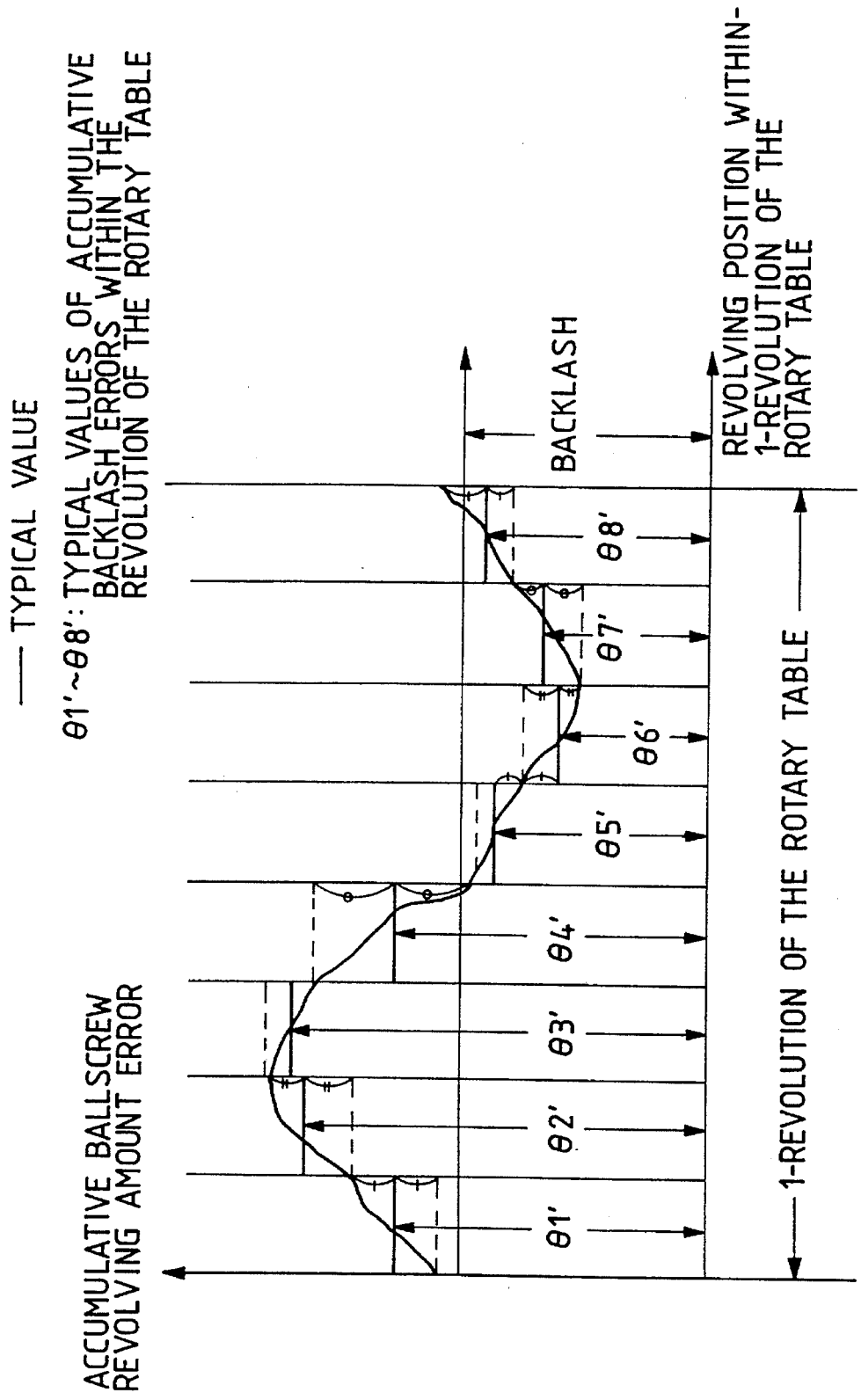
FIG. 22 is a diagram illustrating an accumulative table having revolving amount error according to Embodiment 3 of the present invention.

FIG. 20 is an arrangement diagram of the revolution detector 8, FIG. 21 is a conception diagram for calculating a backlash error compensation value, and FIG. 22 is an accumulative backlash error diagram.

In FIG. 16, 4d indicates a gear coupled with the servo motor 3 via the coupling 4a. 501 denotes a table, e.g., a rotary table. 4e designates a gear which is meshed with the gear 4d and uses the revolving shaft 5c of the rotary table 501 as a revolving shaft. Namely, the rotary table 501 is rotated by the rotation of the servo motor 3 via the gears 4d and 4e.

Also, the revolution detector 8 identical to the revolution detector 6 is fitted to one end of the revolving shaft 5c of the rotary table 501.

In FIG. 18, 25 represents a rotation direction judging section and 26 indicates a backlash compensating ROM.

In FIGS. 18 and 19, an unused signal path is indicated by a dotted line.

It is assumed that the composite compensation values (composite compensation values of the within-one-revolution division angle error compensation values and the table revolving amount error compensation values) have already been written to the compensating ROM 23.

It is to be understood that the table revolving amount error compensation value is a compensation value for compensating for the error of the revolving amount of the rotary table 501 due to the revolving system such as a speed reducer, consisting of the coupling 4a and gears 4d and 4e, and the revolving shaft 5c, and is equivalent to the ballscrew revolving amount error compensation value in Embodiment 2.

In this Embodiment 3, an operation identical to the ballscrew revolving amount error compensation in Embodiment 2 is performed to generate the table revolving amount error Compensation, and further the backlash error produced at the time of changing the rotation direction of the rotary table 501 is compensated for.

The calculation of the backlash error compensation values required to compensate for this backlash error will now be described.

For this calculation, a machine operation panel (not shown) is operated to stop the rotary table 501 at respective predetermined rotation positions, which are a plurality of positions within one revolution of the rotary table 501, and then rotate it reversely as described below.

First, when the power is switched on, the NC apparatus 1, the servo amplifier 2 and the servo motor 3 are ready to be driven, the first light-emitting device 15 and the second light-emitting device 16 of the revolution detector 601 are lit, the first light-emitting device 15 and the second light-emitting device 16 of the revolution detector 8 are also lit, and further the controller 24 is ready for operation.

Then, under an NC command, the control section 1a gives the servo amplifier 2 a drive instruction based on the travel data operated on by the operation section 1b to drive the servo motor 3 relative to the rotation position origin of the rotary table 501 and stop it at the predetermined rotation position.

Every time a request instruction is entered from the servo amplifier 2, the revolution detector 601 outputs the rotation position data to the controller 24 via the servo amplifier 2. Inside the controller 24, this rotation position data is output to the difference operation circuit 24d via the input section 24b under the control of the controller 24c. It is to be understood that the within-one-revolution division angle error compensation and table revolving amount error compensation have already been made for the rotation position data.

The gear 4d is rotated by the rotation of the servo motor 3 via the coupling 4a to rotate the gear 4e meshing with the gear 4d, and the rotation position data of the revolution detector 8 is output to the difference operation circuit 24d.

Since the table revolving amount error compensation has already been made for the rotation position data of the revolution detector 601, it is assumed that the rotation position data from the revolution detector 601 matches that from the revolution detector 8 in the current position where the rotary table 501 is at a stop.

Here, when the servo motor 3 is driven in the reverse direction under an NC command, a given offset is produced between the rotation position data of the revolution detector 601 and that of the revolution detector 8. This offset is generated by backlash due to the looseness of the coupling 4a and looseness in the engagement of the gears 4d and 4e.

Under the instruction from the control section 24c, the difference operation circuit 24d outputs to the ROM writer 24e the backlash error compensation value found on the basis of a difference between the rotation position data given by the revolution detector 601 and the rotation position data provided by the revolution detector 8. The ROM writer 24e writes this backlash error compensation value to the backlash compensating ROM 26 via the servo amplifier 2 and the control section 22a.

The above operation is performed at each of the rotation positions which are a plurality of positions into which one revolution of the rotary table 501 has been divided.

After the above-mentioned operation is complete, the revolution detector 8 and the controller 24 are removed to start ordinary operation.

Referring to FIGS. 17 and 19, under an NC command, the control section la gives the servo amplifier 2 the drive instruction based on the travel data operated on by the operation section 1b to drive the servo motor 3.

The revolving shaft 3a of the servo motor 3 is rotated to rotate the revolution detector 601. Inside the revolution detector 601, the control section 22a of the central processing circuit 22 reads the corresponding composite compensation value (composite compensation value of the within-one-revolution division angle error compensation value and the table revolving amount error compensation value) in the compensating ROM 23 according to the contents of the counter circuit 21, and composes this read data and the output of the within-one-revolution signal processing circuit 19 to calculate a compensated rotation position signal (backlash is uncompensated for).

Detecting a change in the rotation direction of the rotary table 501, the rotation direction judging section 25 transmits a rotation direction change detection signal to the control section 22a. It is to be noted that the rotation direction judging section 25 judges the rotation direction from the increase/decrease of the rotation position data.

Receiving this rotation direction change detection signal, the control section 22a reads the backlash error compensation value corresponding to the current multi-revolution amount signal from the backlash compensating ROM 26 and creates a composite signal according to said read data and said compensated rotation position signal.

Every time a request instruction is entered from the servo amplifier 2, the control section 22a converts the composite signal into a serial signal and outputs the result of conversion to the servo amplifier 2 as rotation position data.

As described above, the rotary table 501 is rotated under the closed-loop control fed back to the servo amplifier 2.

It is to be noted that since the backlash error compensation value read is selected on the basis of the multi-revolution amount signal as described above, the compensation can be made according to the rotation position of the rotary table 501.

Also, when the system power is restored after it was switched off due to a power failure or the like, the revolution detector 601 is the absolute-value encoder, and if the system power is switched off, the counter circuit 21 and other parts are battery-backed, whereby the apparatus can be restarted from where it had stopped at the occurrence of the system power off.

The process of calculating the backlash error compensation value in the controller 24 will now be described with reference to FIG. 21.

$a+\epsilon$ indicates rotation position data from the revolution detector 601, which is the sum of an absolute-value rotation position signal a, or the output value of the within-one-revolution signal processing circuit 19, after the servo motor 3 has been rotated reversely and the within-one-revolution division angle error compensation value $\epsilon$ written to the compensating ROM 23. $\epsilon$ is equivalent to $\epsilon 1$ to $\epsilon 8$ described in the conventional example shown in FIG. 36.

b indicates rotation position data as the output value of the revolution detector 8. It is to be understood that this rotation position data indicates the rotation position of the rotary table 501.

Nb is the rotation position data value of the revolution detector 601 which has been converted from the rotation position data b. It is to be understood that 1/N is a reduction ratio represented by Z1/Z2 when it is supposed that the numbers of teeth of the gears 4d and 4e are Z1 and Z2, respectively.

In the figure, offset $\theta'$ indicated by the |determinant of $(a+\epsilon)$-Nb| is a backlash error. This $\theta'$ is written to the backlash compensating ROM 26 as the backlash error compensation value.

As described above, when the rotation direction changes, the control section 22a reads the backlash error compensation value $\theta'$ from the backlash compensating ROM 26 and composes it with $a+\epsilon$ to make the composite rotation position data a+ε+θ'. It is to be understood that ε is a positive value and θ' is a negative value in the figure.

As in Embodiment 2, storing the compensating ROM 23 with the composite compensation value for each of the division ranges, which are the ranges within one revolution of the rotary table 501, for example, is not only difficult due to the limitation on the storage capacity of the compensating ROM 23 but is also often useless.

FIG. 22 shows an example of the accumulative backlash error and a case where said accumulative backlash error is compensated for by typical values set for the division angle ranges which are "n" regions within one revolution of the rotary table 501. It is to be understood that in this drawing, the horizontal axis represents the rotation position within one revolution and the vertical axis represents the accumulative backlash error.

In this example, n=8, i.e., compensation is made every 45 degrees of rotation of the table 501. Namely, the half value of the maximum value and minimum value of the accumulative backlash error is found at intervals of 45-degree rotations of the rotary table 501 and θ1 to θ8 thus found are used as the typical values of the accumulative backlash error in respective division regions and as the accumulative backlash error compensation values in the corresponding division regions.

It is to be noted that the accumulative backlash error mainly consists of a backlash error, which is always constant, and the single pitch errors of the reduction gears 4d and 4e. It is to be understood that the single pitch error means a difference between an actual pitch on the pitch circle of tooth surfaces adjacent to each other on the same side in a gear and a correct pitch thereon.

Namely, θ1' to θ8' are written to the backlash compensating ROM 26 as the backlash error compensation values. By setting the number of divisions "n" according to the remaining capacity of the backlash compensating ROM 26, the backlash compensating ROM 26 having a large capacity may not be needed.

Also, deceleration, which is made using ordinary gears, may be performed in other deceleration methods, such as worm gear deceleration and harmonic drive deceleration.

Embodiment 4

A further alternative embodiment of the present invention will now be described in accordance with FIGS. 23, 24, 25, 26, 27 and 28.

Figure 23:
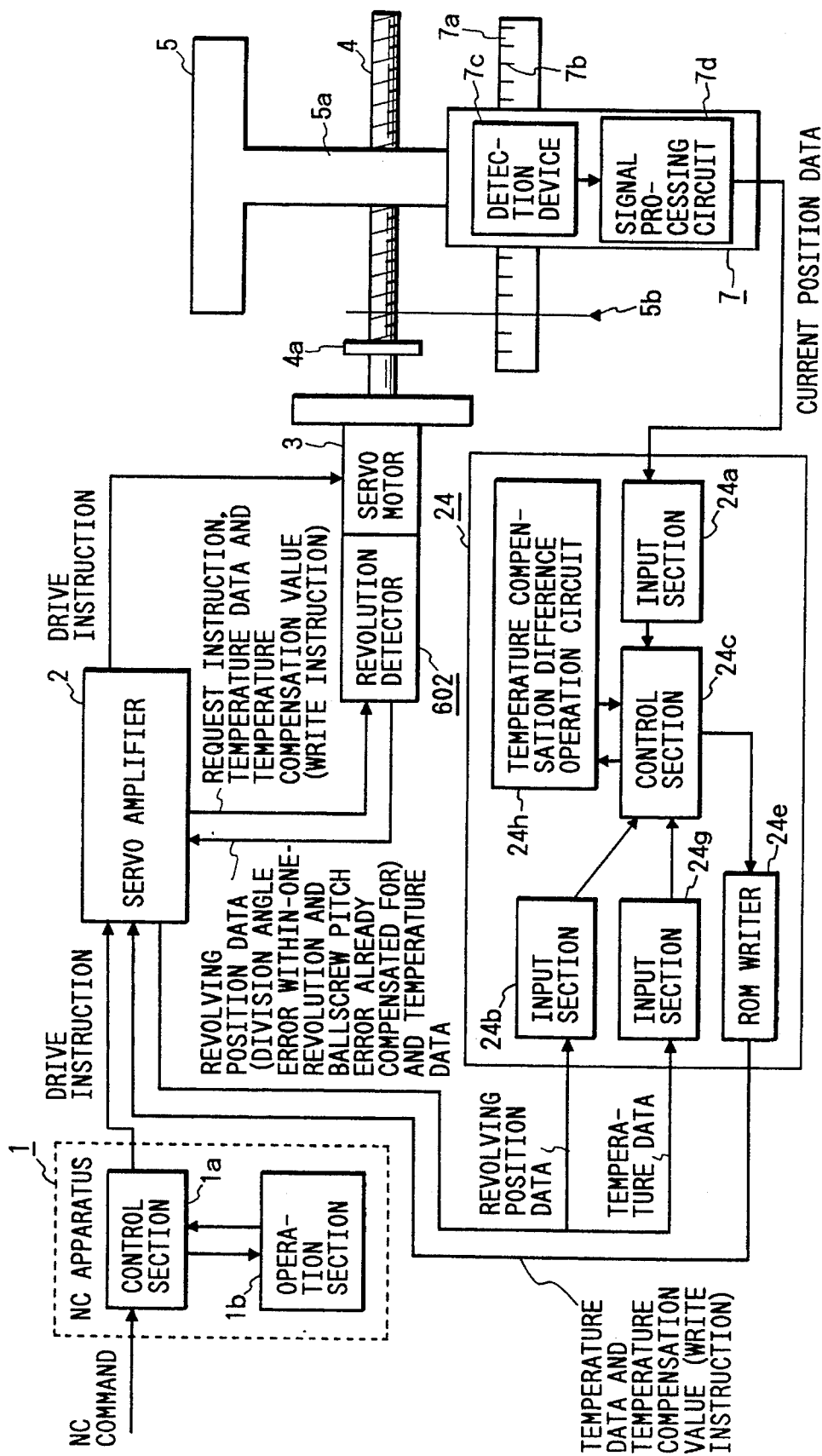
FIG. 23 is a block arrangement diagram of a machine apparatus having a rotation detection device and being arranged at the time of writing compensation values to a compensating ROM according to Embodiment 4 of the present invention.
Figure 24:
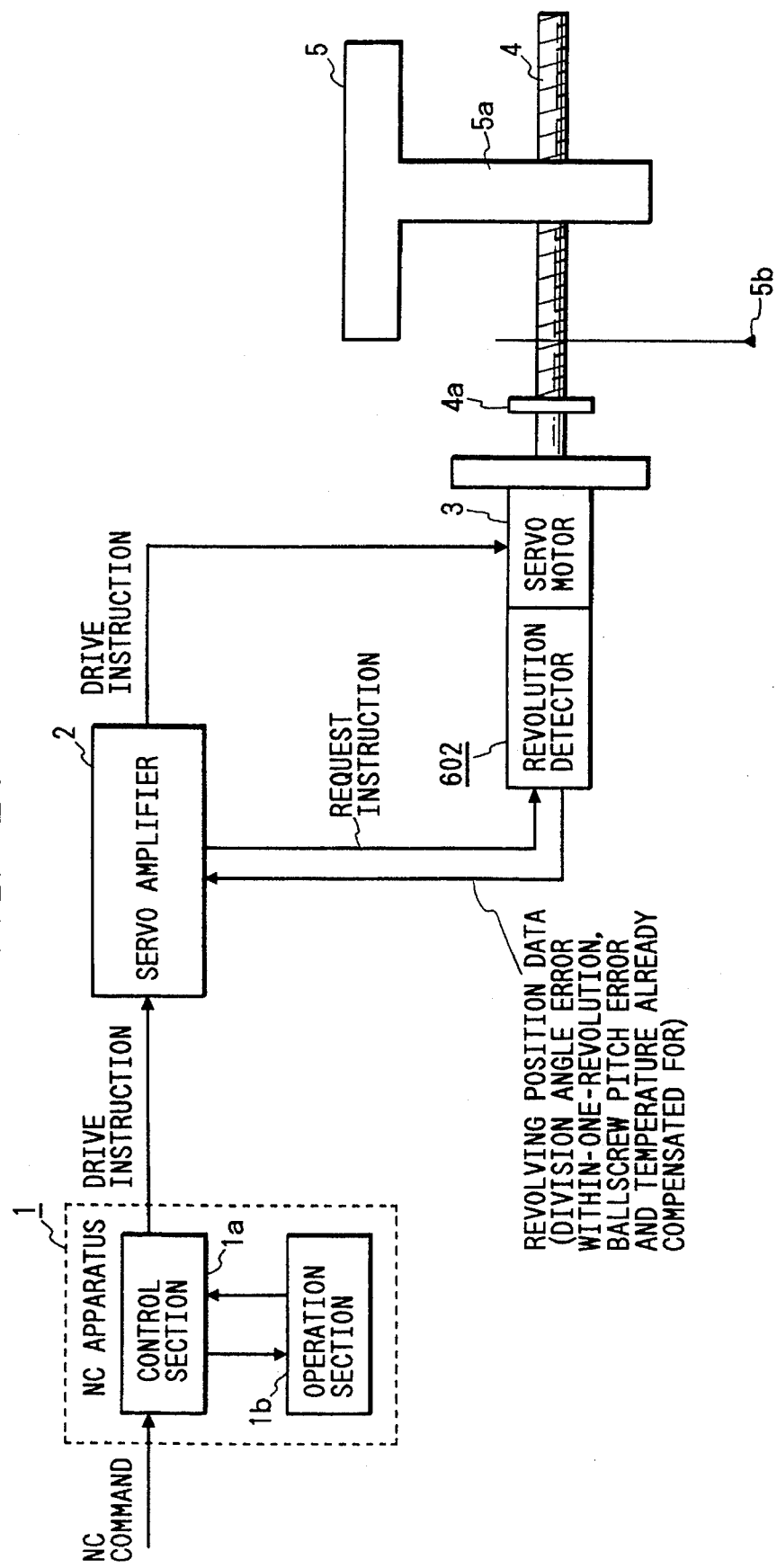
FIG. 24 is a block arrangement diagram of the machining apparatus at the time or ordinary operation according to Embodiment 4 of the present invention.
Figure 25:
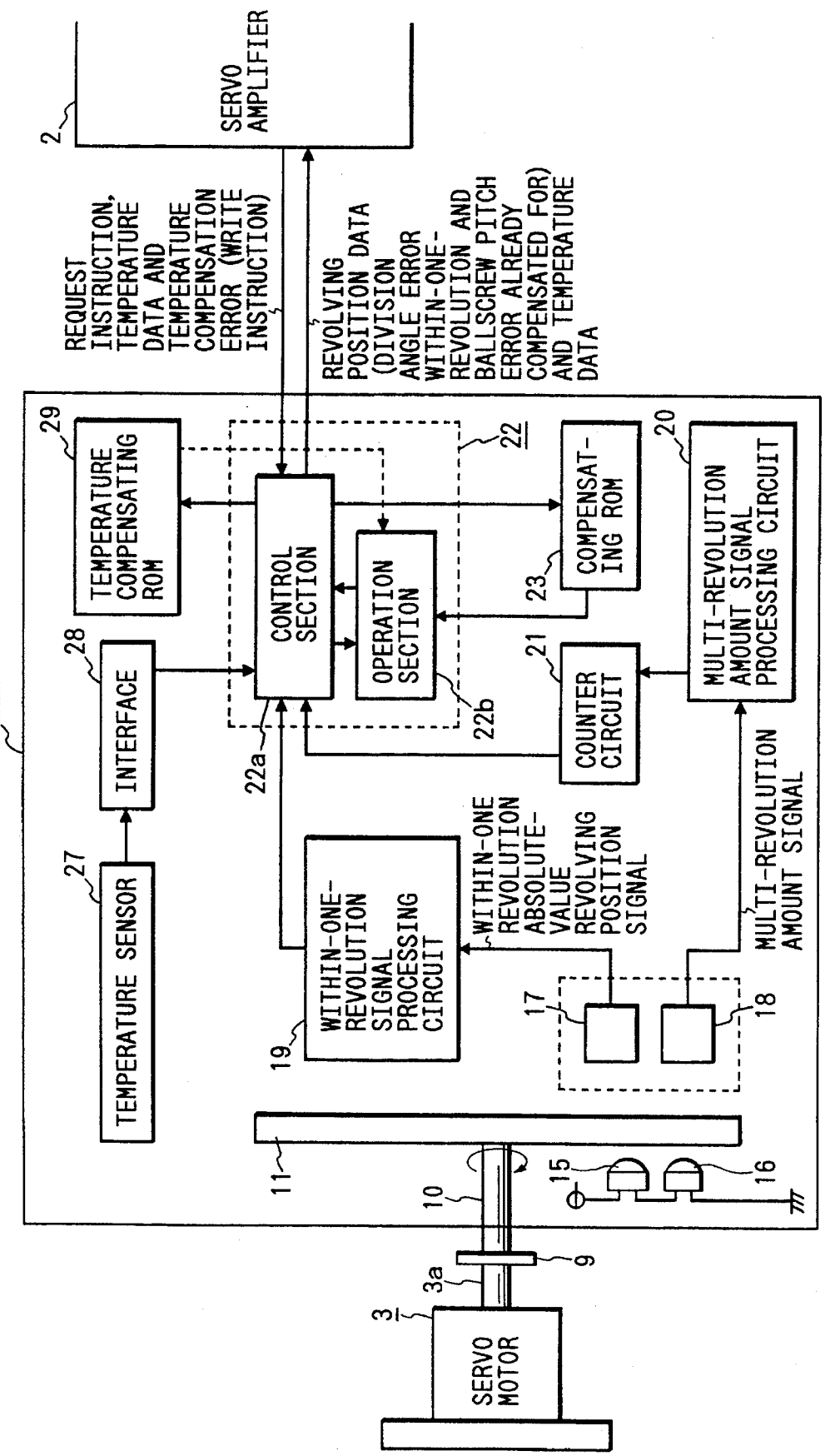
FIG. 25 is a block arrangement diagram showing the operation of a revolution detector at the time of writing compensation values to the compensating ROM according to Embodiment 4 of the present invention.
Figure 26:
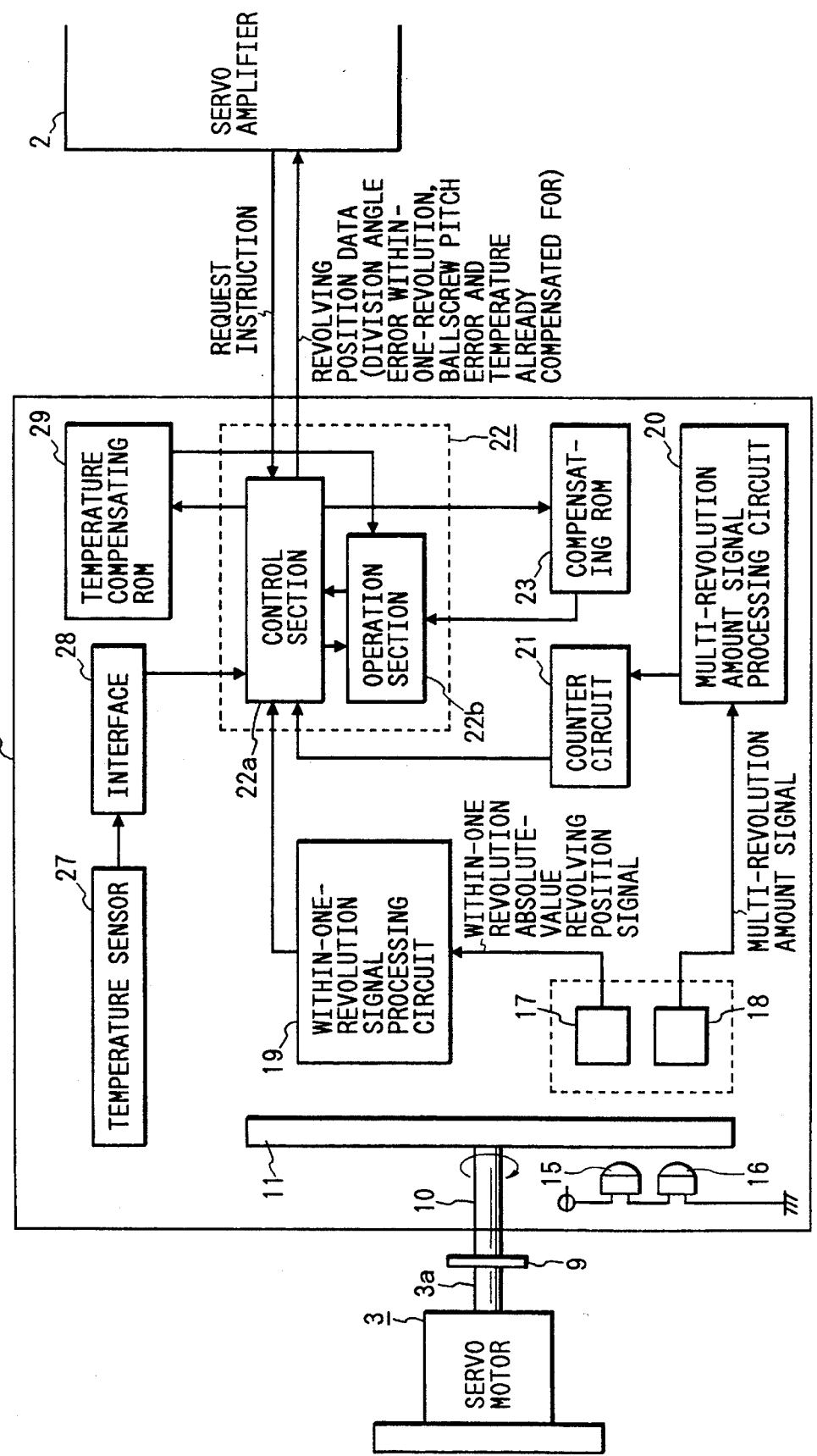
FIG. 26 is a block arrangement diagram showing the operation of the revolution detector at the time of ordinary operation according to Embodiment 4 of the present invention.

FIGS. 23, 24, 25, 26 and 27 correspond to FIGS. 1, 2, 3, 4 and 5 in Embodiment 1, respectively. FIGS. 23 and 24 are arrangement diagrams of the entire system. FIG. 25 is an arrangement diagram of a revolution detector 602 in FIG. 23, and FIG. 26 is an arrangement diagram of the revolution detector 602 in FIG. 24.

Also, FIGS. 23 and 25 are diagrams at the time of compensation operation and FIGS. 24 and 26 are diagrams at the time of ordinary operation after compensation operation.

Figure 27:
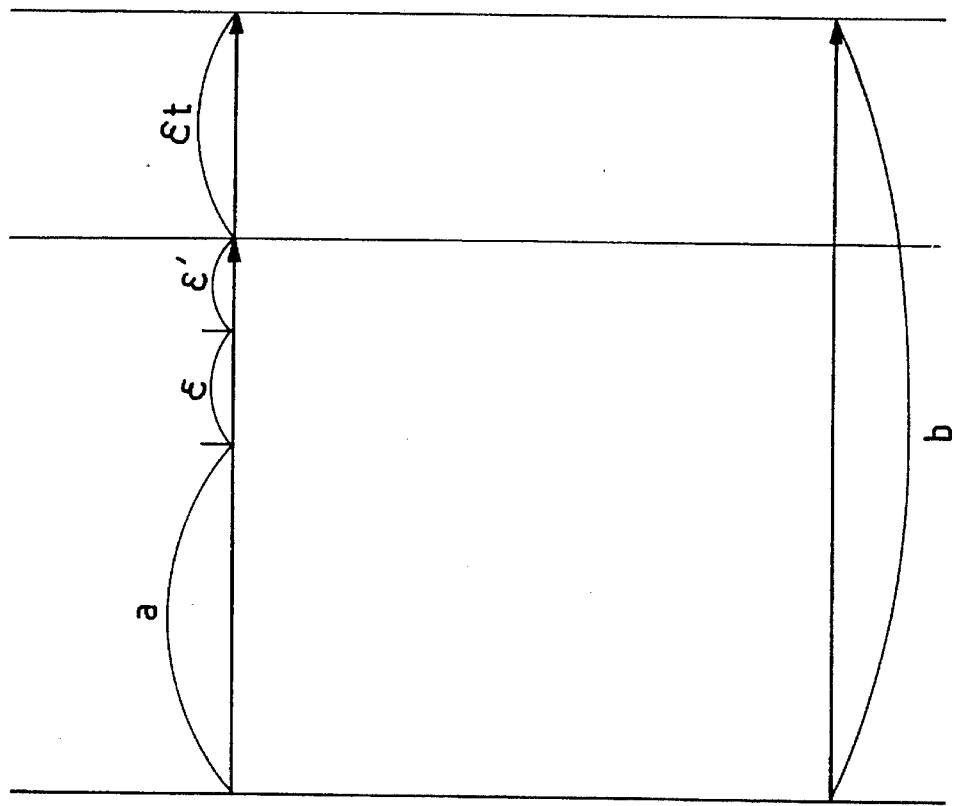
FIG. 27 is a diagram illustrating the concept of temperature compensation values, etc. for a ballscrew pitch error in Embodiment 4 of the present invention.
Figure 28:
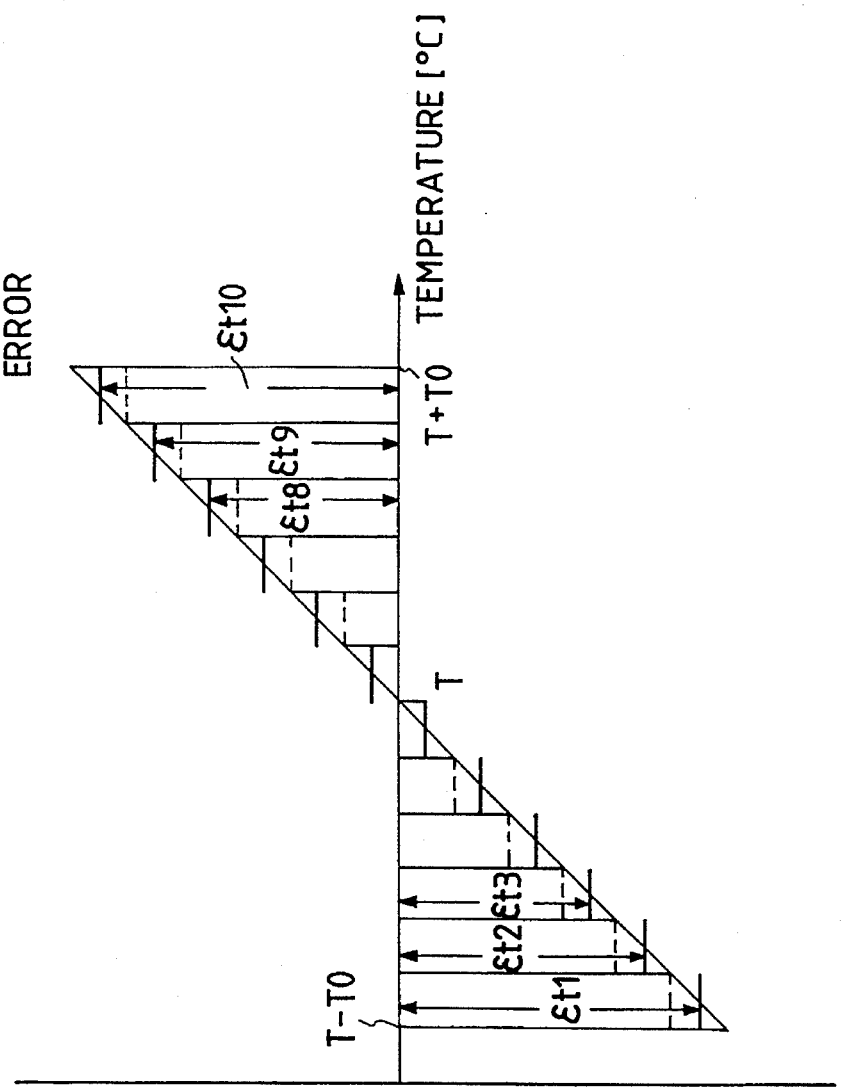
FIG. 28 is a diagram illustrating an accumulative ballscrew pitch error due to temperature changes according to Embodiment 4 of the present invention.

FIG. 27 is a conception diagram of a temperature compensation value, etc., for a ballscrew pitch error, and FIG. 28 is a diagram of an accumulative ballscrew pitch error due to temperature changes.

In FIG. 23, 24g indicates an input section where temperature data is entered from the revolution detector 602, and 24f denotes a temperature compensation difference operation circuit.

In FIG. 25, 27 designates temperature detecting means, e.g., a temperature sensor. 28 represents an interface, and 29 indicates temperature compensation storage means, e.g., temperature compensating ROM.

Also, in FIG. 25, an unused signal path is indicated by a dotted line.

It is assumed that the composite compensation values (composite compensation values of the within-one-revolution division angle error compensation values and the ballscrew pitch error compensation values) have already been written to the compensating ROM 23.

In this Embodiment 4, the operation of the ballscrew pitch error compensation described in Embodiment 1 is complete, and further temperature compensation is made for the ballscrew pitch error.

Operation will now be described. A machine operation panel (not shown) is operated to move the moving table 5 in an overall stroke as described below, with the measuring instrument 7 fitted to the moving table 5 as shown in FIG. 23.

First, when the power is switched on, the NC apparatus 1, the servo amplifier 2 and the servo motor 3 are ready to be driven, the first light-emitting device 15 and the second light-emitting device 16 of the revolution detector 602 are lit, and further the measuring instrument 7 and the controller 24 are ready for measurement and operation.

Then, environment temperature is set to a predetermined value, an NC command causes the control section 1a to give the servo amplifier 2 a drive instruction based on travel data operated on by the operation section 1b to drive the servo motor 3 relative to the origin 5b.

Every time a request instruction is entered from the servo amplifier 2, the revolution detector 602 outputs the rotation position data to the controller 24 via the servo amplifier 2.

Inside the controller 24, this rotation position data is entered into the control section 24c via the input section 24b and is output to the temperature compensation difference operation circuit 24h under the control of the control section 24c. It is to be understood that the within-one-revolution division angle error compensation and ballscrew pitch error compensation have already been made for the rotation position data.

The temperature data detected by the temperature sensor 27 is entered into the control section 22a via the interface 28 and is output to the input section 24g of the controller 24 via the servo amplifier 2 under the control of the control section 22a. Further, this temperature data is output to the temperature compensation difference operation circuit 24h under the control of the control section 24c.

The ballscrew 4 is rotated by the rotation of the servo motor 3 via the coupling 4a to move the moving table 5, and the measuring instrument 7 provides A- and B-phase detection outputs based on the graduation 7b of the scale 7a using the detection device 7c. The signal processing circuit 7d converts this output into a rectangular-wave signal and outputs it to the controller 24 as current position data.

This current position data is output to the temperature compensation difference operation circuit 24h via the input section 24a under the control of the control section 24c.

The input section 24a judges the travel direction of the moving table 5 according to the leading direction of phases A and B, and differential of the leading edge and trailing edge of phases A and B, and creates a pulse based on this differential output to quadruple the number of divisions. Meanwhile, because of the expansion, contraction, etc., of the ballscrew pitch due to temperature changes, if the ballscrew pitch error compensation is made as described in the Embodiment 1, etc., the specified position under the NC command does not match the actual position of the moving table detected by the measuring instrument 7 in the closed-loop control wherein the detection output of the revolution detector 602 is used as a feedback signal when the environment temperature is different from the temperature at a time when the compensation value of the ballscrew pitch error was found.

When a sampling instruction is given by the control section 24c, the temperature compensation difference operation circuit 24h calculates the compensation value of the ballscrew pitch error due to temperature in the current position, i.e., temperature compensation value, from the rotation position data and current position data. It is to be understood that the temperature is detected by the temperature sensor 27.

The temperature compensation difference operation circuit 24h outputs said temperature compensation value to the ROM writer 24e, together with the temperature data entered via the input section 24g. The ROM writer 24e writes the temperature data and temperature compensation value to the temperature compensating ROM 29 via the servo amplifier 2 and the control section 22a.

Next, the environment temperature is changed sequentially to repeat the above operation, thereby sampling the temperature compensation values in the whole range of the environment temperature desired to be compensated for.

It is to be noted that this pitch error compensation value due to temperature includes the temperature compensation values of the revolving system's revolving angle error (torsion error) and others, in addition to the temperature compensation value of the ballscrew pitch error.

After the above compensation is complete, the measuring instrument 7 and the controller 24 are removed as shown in FIG. 4 to enter ordinary operation.

Under an NC con, and, the control section 1a gives the servo amplifier 2 the drive instruction based on the travel data operated on by the operation section 1b to drive the servo motor 3. When the revolution detector 602 is rotated by the rotation of the servo motor 3, the control section 22a of the central processing circuit 22 reads the corresponding composite compensation value (composite compensation value of the within-one-revolution division angle error compensation value and the ballscrew pitch error compensation value) from the compensating ROM 23 according to the contents of the counter circuit 21, compensates for the output of the within-one-revolution signal processing circuit 19 according to the contents read, and calculates a compensated rotation position signal according to the result of the compensation and the contents of the counter circuit 21.

When the interface 28 judges that the temperature at which compensation should be made has been reached on the basis of the temperature data detected by the temperature sensor 27, the interface 28 transmits a temperature compensation request signal to the control section 22a. Receiving this temperature compensation request signal, the control section 22a reads the corresponding temperature compensation value indicated in the temperature data from the temperature compensating ROM 29 and the operation section 22b composes the read data and the compensated rotation position signal to create a composite signal.

Then, every time a request instruction is input from the servo amplifier 2, this composite signal is converted into a serial signal and the result of conversion is output to the servo amplifier 2 as rotation position data.

In the above procedure, the within-one-revolution division angle error compensation and ballscrew pitch error compensation are performed according to the storage contents of the compensating ROM 23, and the rotation position data for which temperature compensation has been made according to the storage contents of the temperature compensating ROM 29 is provided.

As described above, the closed-loop control wherein the rotation position data has been fed back to the servo amplifier 2 allows the moving table 5 to be positioned accurately if the environment temperature changes.

Also, when the system power is restored after it was switched off due to a power failure or the like, the revolution detector 602 is the absolute-value encoder, and if the system power is switched off, the counter circuit and other parts are battery-backed, whereby the apparatus can be restarted from where it had stopped at the occurrence of the system power off.

The process of calculating the temperature compensation value in the controller 24 will now be described with reference to FIG. 27.

In this figure, $a+\epsilon+\epsilon'$ indicates rotation position data from the revolution detector 602 which is the sum of an absolute-value rotation position signal a, or the output value of the within-one-revolution signal processing circuit 19, and the compensation value $\epsilon+\epsilon'$ (composite compensation value of the within-one-revolution division angle error compensation value $\epsilon$ and ballscrew pitch error compensation value $\epsilon'$) written to the compensating ROM 23. Namely, $\epsilon$ is equivalent to $\epsilon 1$ to $\epsilon 8$ described in the conventional example shown in FIG. 36, and $\epsilon'$ is equivalent to $\epsilon 1'$ to $\epsilon 8'$ in FIG. 6.

b indicates current position data based on the output value of the measuring instrument 7. It is to be understood that this current position data has been converted into the scale of the rotation position data.

Also, $\epsilon t$ indicated by $b-(a+\epsilon+\epsilon')$ is the ballscrew pitch error due to temperature, and this $\epsilon t$ is written to the temperature compensating ROM 29 together with the temperature data. It is to be understood that $\epsilon$, $\epsilon'$, and $\epsilon t$ are all positive values in the drawing.

It is to be noted that not only the compensating ROM 23 but also the temperature compensating ROM 29 must be accessed to read $\epsilon t$ from the temperature compensating ROM 29, resulting in longer feedback time. Since a temperature change does not occur suddenly, however, this will not be a big problem.

Because of the limitation on the storage capacity of the temperature compensating ROM 29, it is difficult to make the compensation in the respective subdivided environment temperature change ranges. Hence, the environment temperature change range may be divided into "n" regions and compensation made using typical values in the "n" division regions.

FIG. 28 shows the compensation made for an example of the accumulative ballscrew pitch error due to temperature, wherein it is assumed that the normal operating temperature of an NC machine tool or the like is T(°C.) and compensation is made at n=10, i.e., intervals of 2T0/10 (°C.), within the temperature change range of T±T0 (°C.).

In this drawing, the horizontal axis represents temperature and the vertical axis represents the accumulative ballscrew pitch error due to temperature.

As shown in the figure, the half value of the maximum value and minimum value of the accumulative ballscrew pitch error at intervals of 2T0/10 (°C.) is defined as a typical value, and after typical values $\epsilon t1$ to $\epsilon t10$ have been found, these typical values are written to the temperature compensating ROM 29 as the temperature compensation values. By setting the number of division regions "n" according to the capacity of the temperature compensating ROM 29 as described above, the temperature compensating ROM 29 may not always have a large storage capacity.

It is to be understood that if the temperature compensating ROM 29 is stored with the temperature in each division region, temperature compensation can be made at unequal intervals using temperature in each division region and each typical value.

It will be recognized that the measuring instrument 7 may be replaced by the revolution detector 6 to provide a temperature compensation of the ballscrew revolving amount error.

It will also be recognized that the moving table 5 may be replaced by the rotary table 501 and the measuring instrument 7 replaced by the revolution detector 6 to provide a temperature compensation of the table revolving amount error.

It will also be recognized that the temperature sensor 27 may be fitted into other than the revolution detector 602, e.g., the moving table.

It will also be recognized that the compensation values written to the temperature compensating ROM 29, which were actually measured, may be found using the temperature expansion coefficient of the ballscrew, without being actually measured.

Embodiment 5

A further alternative embodiment of the present invention will now be described with reference to FIGS. 29 and 30. It is to be understood that FIG. 29 is an entire arrangement diagram and FIG. 30 is a flowchart for a difference operation method.

Figure 29:
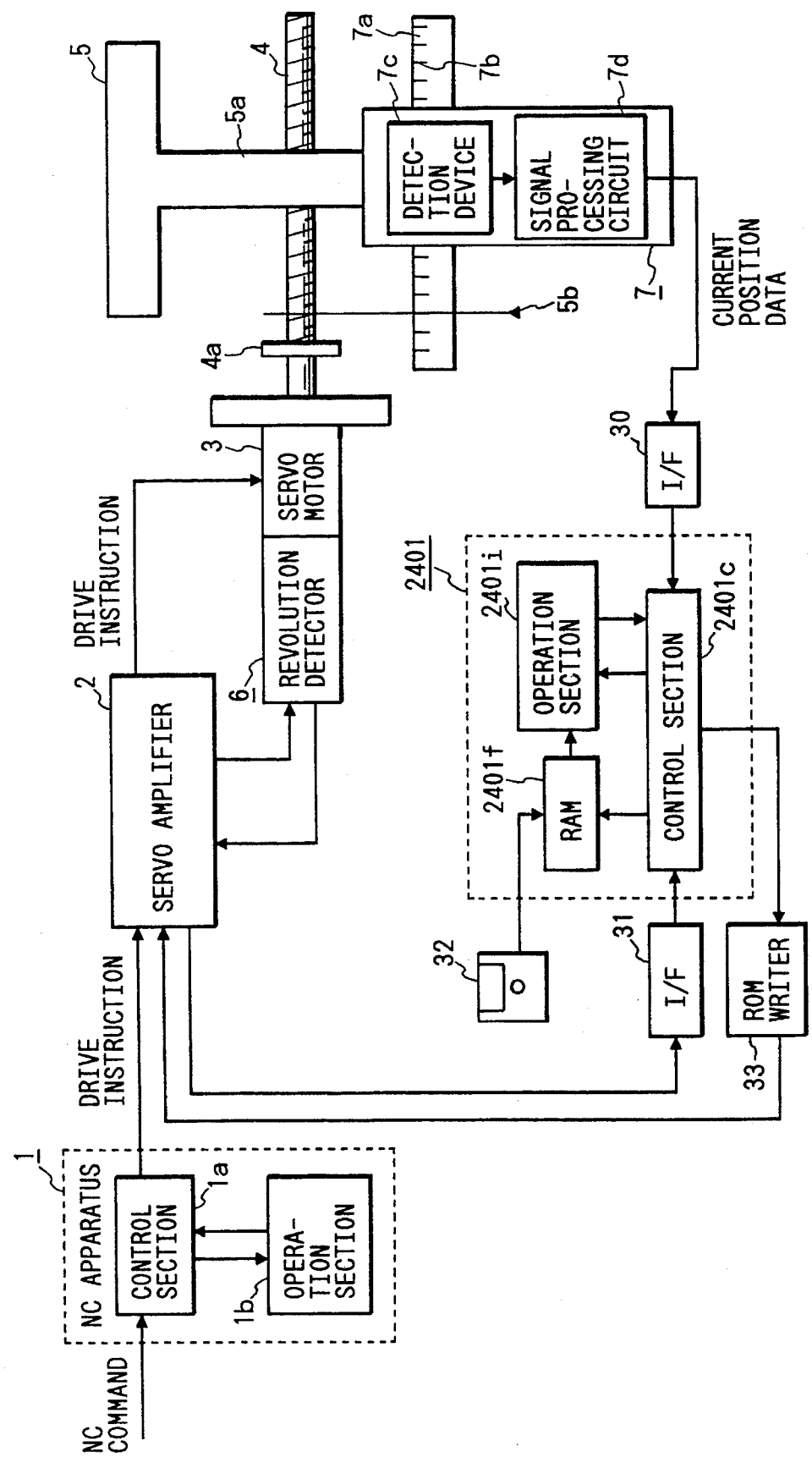
FIG. 29 is a block arrangement diagram of a machining apparatus having a rotation detection device and being arranged at the time of writing compensation values to compensating ROM, according to Embodiment 5 of the present invention.
Figure 30:
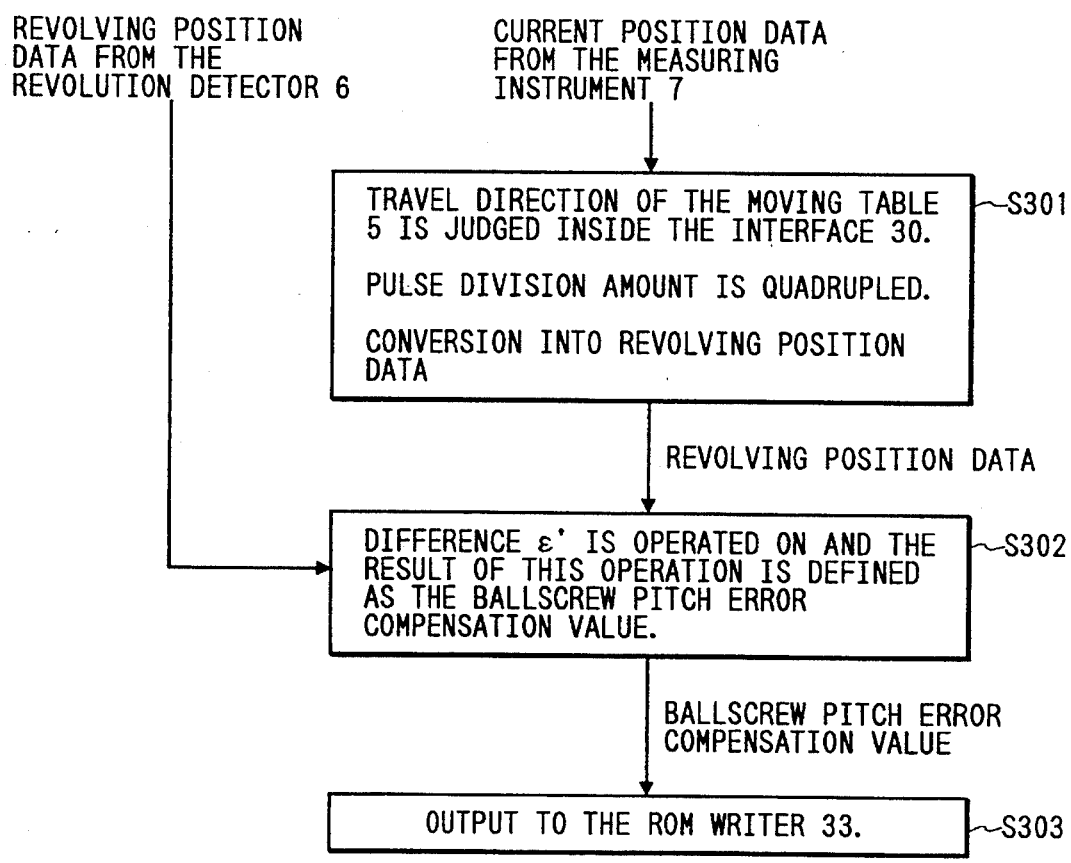
FIG. 30 is a flowchart showing a difference operation method according to Embodiment 5 of the present invention.

In FIG. 29, 2401 indicates a personal computer, 30 denotes an interface used to fetch current position data from the measuring instrument 7 to the personal computer 2401, and 31 designates an interface used to fetch rotation position data from the revolution detector 6 to the personal computer 2401. 30 represents a floppy disk stored with differential operation software. It is to be understood that the difference operation software is a program for difference operation.

Operation will now be described in accordance with FIG. 30 which shows a sequence of the difference operation method. It is to be understood that the operation of this embodiment is identical to that of Embodiment 1 with the exception that the functions of the controller 24 in FIG. 1 are executed by the personal computer 2401, the interface 30, the interface 31 and memory writing means, e.g., a ROM writer 33.

First, the difference operation software in the floppy disk 32 is transferred beforehand to RAM 2401$f$, or the internal storage device of the personal computer 2401.

In FIG. 30, the interface 30 judges the travel direction of the moving table 5 according to the phase leading direction of A- and B-phase output signals in the current position data from the measuring instrument 7, differentiates the leading edges and trailing edges of phases A and B, and creates a pulse based on this differential output, whereby the current position data four times larger than the number of divisions is provided (step S301).

Subsequently, an operation section 2401$i$, which operates under the control of a control section 2401$c$ based on the difference operation software stored in the RAM 2041$f$, calculates a difference $\epsilon'$ between said current position data and the rotation position data from the revolution detector 6. It is needless to mention that as in Embodiment 1, this difference must be calculated after the current position data from the measuring instrument 7 and the rotation position data from the revolution detector 6 have been matched in scale. Also this difference is indicated by the difference $\epsilon'$ in FIG. 5 (step S302).

Then, this difference $\epsilon'$ is output to the ROM writer 33 as the ballscrew pitch error compensation value to rewrite the contents of the compensating ROM 23 in the revolution detector 6 (step S303).

It will be appreciated that the measuring instrument 7 may be replaced by the revolution detector 6 to make the compensation of the ballscrew revolving amount error.

It will also be appreciated that the moving table 5 may be replaced by the rotary table 501 and the measuring instrument 7 replaced by the revolution detector 6 to perform the compensation of the table revolving amount error.

It will also be appreciated that temperature compensation difference operation software may be stored in the floppy disk 32 and the temperature sensor 27, the interface 28 and the temperature compensating ROM 29 in FIG. 25 provided in the revolution detector 6 to make the temperature compensation of the ballscrew pitch error. It is to be understood that said temperature compensation difference operation software means a program for performing the difference operation of temperature compensation.

It will also be appreciated that the temperature compensation difference operation software may be stored in the floppy disk 32, the temperature sensor 27, the interface 28 and the temperature compensating ROM 29 in FIG. 25 provided in the revolution detector 6, and further the measuring instrument 7 replaced by the revolution detector 6 to make the temperature compensation of the ballscrew revolving amount error.

It will also be appreciated that the temperature compensation difference operation software may be stored in the floppy disk 32, the temperature sensor 27, the interface 28 and the temperature compensating ROM 29 in FIG. 25 provided in the revolution detector 6, the table used be a rotary table, and the measuring instrument 7 replaced by the revolution detector 6 to make the temperature compensation of the table revolving amount error.

Embodiment 6

Because the capacity of the compensating ROM 23 or the temperature compensating ROM 29 is taken into consideration in the Embodiments 1 to 5, the half value of the maximum value and minimum value of an accumulative error in each of "n" division regions is found as the typical value of the compensation value as shown in FIGS. 6, 15, 22, 28 and 36, and is defined as an accumulative error in the corresponding division region.

Since this causes the compensation value in each division region to be uniform, the compensation made cannot always be sufficient.

A method which enables more accurate error compensation will now be described, with the limitation on the storage capacity of the compensating ROM 23 or the temperature compensating ROM 29 taken into consideration.

Figure 31:
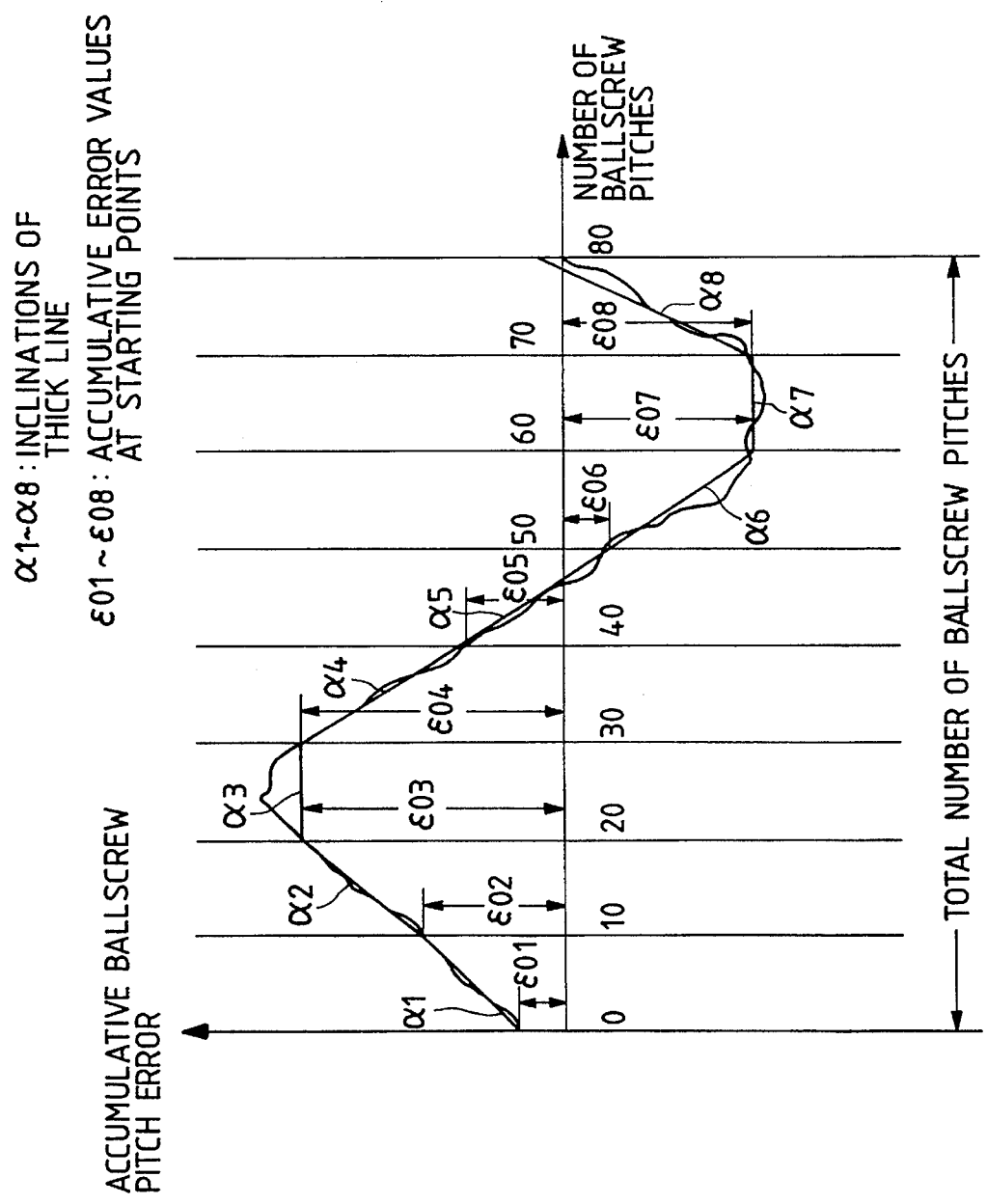
FIG. 31 is a diagram illustrating the method of compensating for an accumulative ballscrew pitch error shown in Embodiment 5 of the present invention.
Figure 32:
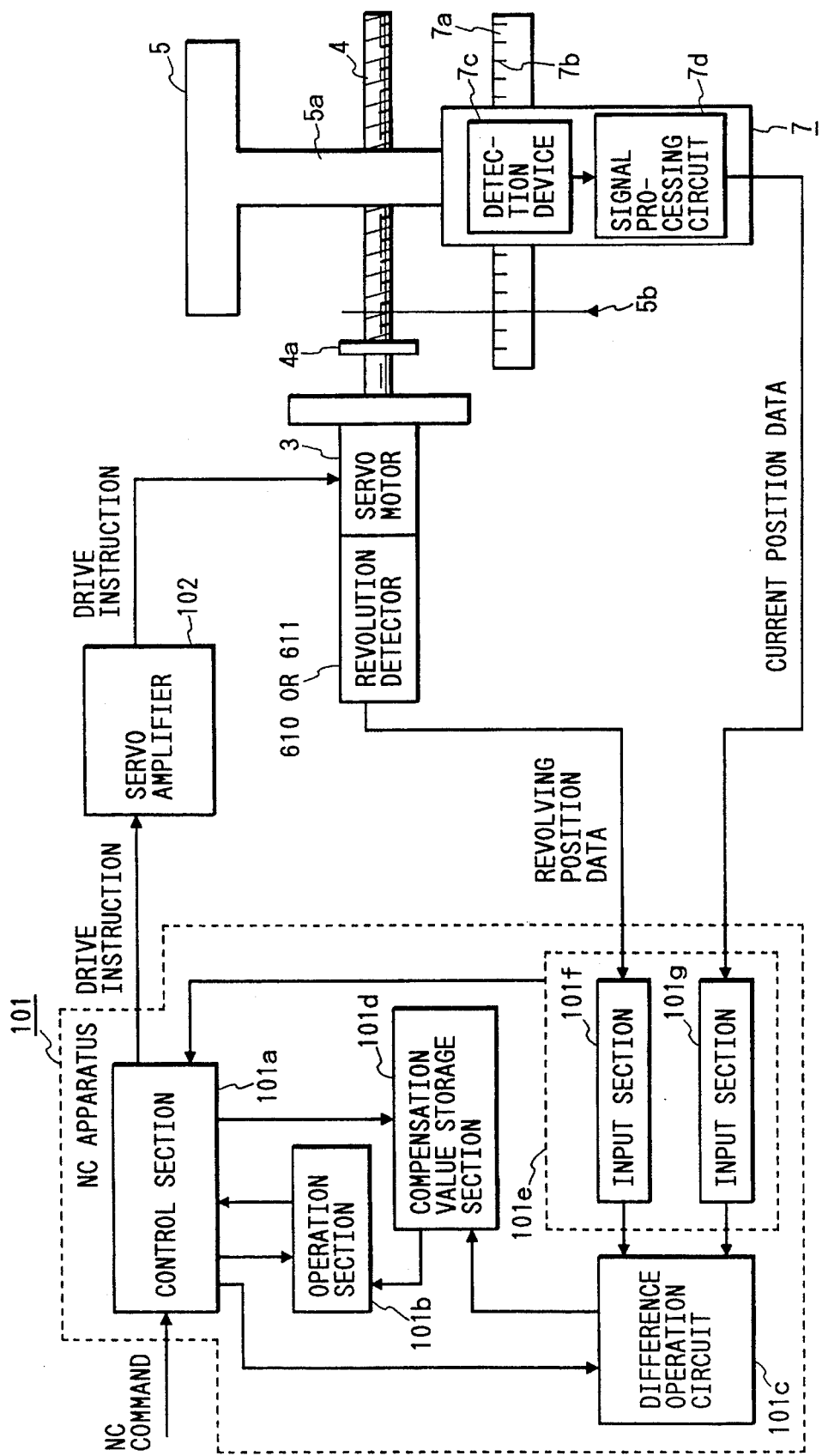
FIG. 32 is a block arrangement diagram showing the operation of a machining apparatus having a rotation detection device at the time of writing compensation values to a compensation storage section in a conventional apparatus.
Figure 33:
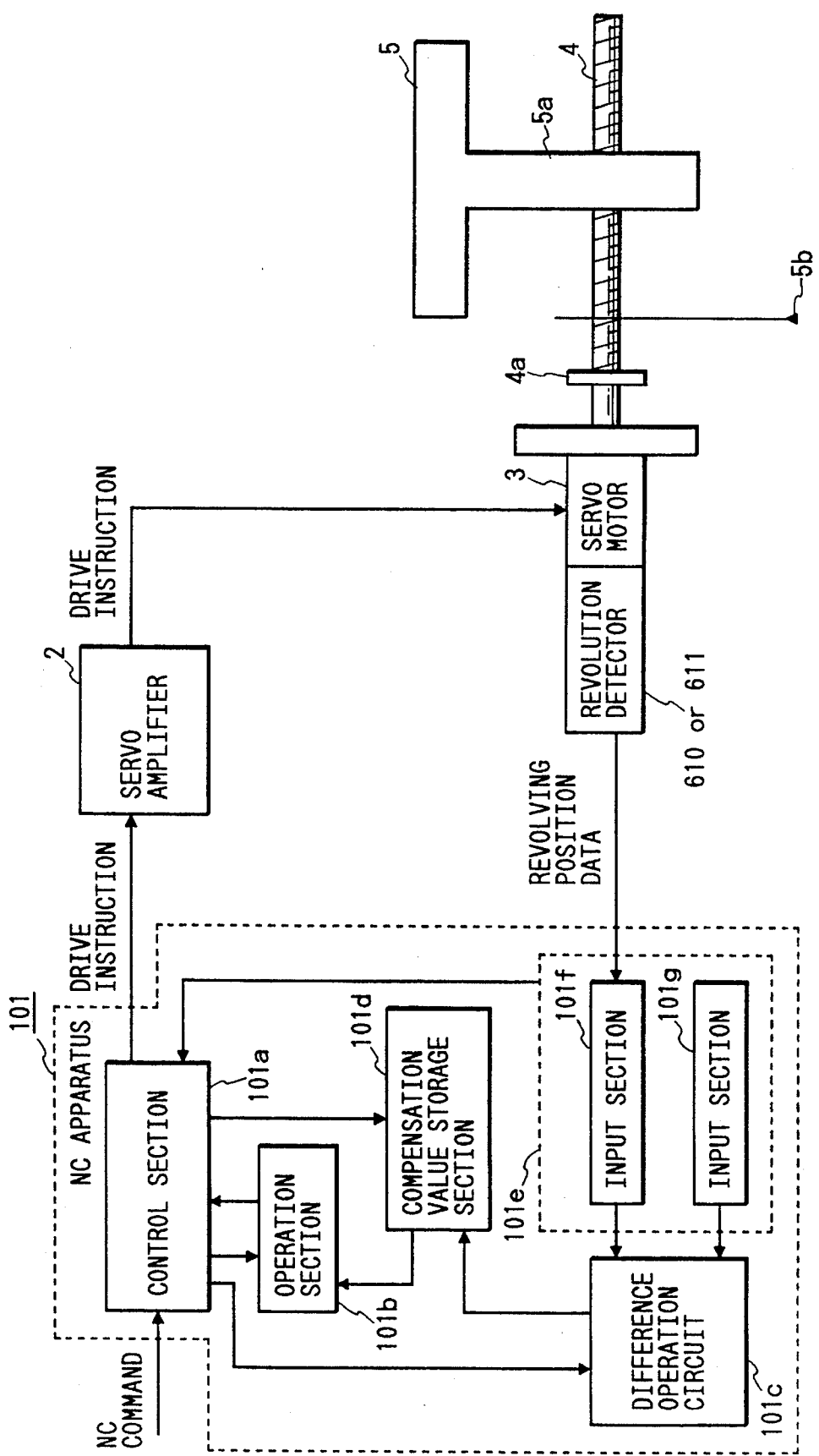
FIG. 33 is a block arrangement diagram showing the operation of the machining apparatus at the time of ordinary operation in the conventional apparatus.
Figure 34:
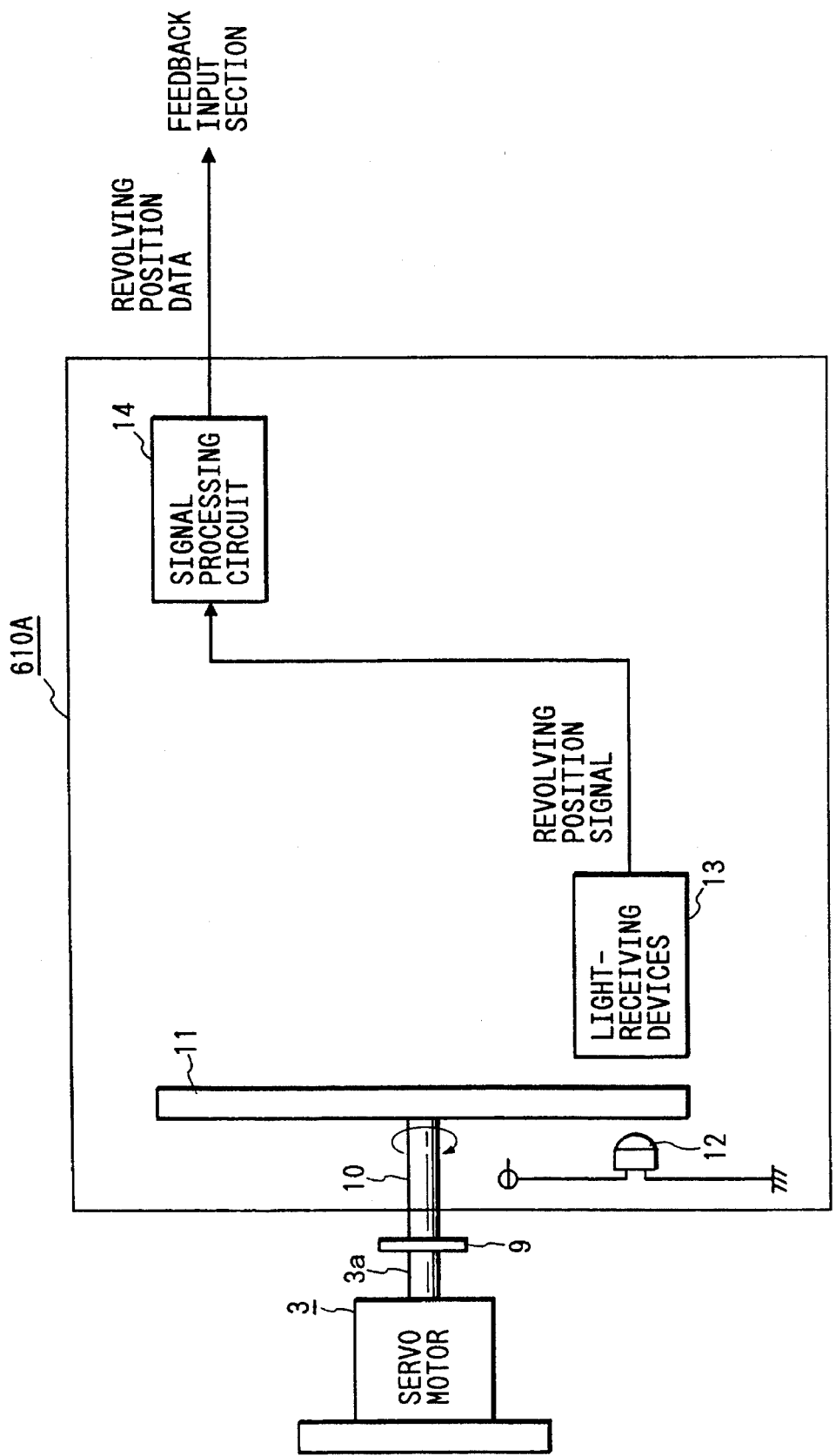
FIG. 34 is a block arrangement diagram of a conventional revolution detector.

FIG. 31 shows that compensation is made at intervals of 10 pitches for a ballscrew having the total number of 80 pitches, which has been divided into 8 regions (n=8). It is to be understood that the horizontal axis represents the number of ballscrew pitches and the vertical axis represents the accumulative ballscrew pitch error.

Accumulative error values $\epsilon 01$ to $\epsilon 08$ at the starting points of the respective division regions and inclinations $\alpha 1$ to $\alpha 8$ of a straight line, to which the accumulative ballscrew pitch errors in the respective division regions have been approximated, (the thick line in FIG. 31) are written to the compensating ROM 23 as the ballscrew pitch error compensation values.

As in Embodiment 1, the ballscrew pitch error compensation values (the accumulative error values $\epsilon 01$ to $\epsilon 08$ at the starting points of the regions and the inclinations $\alpha 1$ to $\alpha 8$) are read from the compensation ROM 23 during ordinary operation, and these read accumulative error values $\epsilon 01$ to $\epsilon 08$ at the starting points of the regions and the inclinations α1 to α8 are used to provide rotation position data for which linear approximation compensation has been performed, whereby more accurate accumulative error compensation is enabled.

It will also be recognized that high-accuracy compensation by linear approximation, which was described in the case of Embodiment 1 as an example, may be obtained for Embodiments 2 to 5.

Embodiment 7

It will be appreciated that the revolution detector 6, the revolution detector 601 and the revolution detector 602, which were the optical absolute-value encoders in Embodiments 1 to 6, may be magnetic absolute-value encoders.

It will also be appreciated that the moving table 5, which was driven by the ballscrew 4 in Embodiments 1, 2 and 4 to 6, may be driven by a rack and pinion system. In this case, accuracy is further increased by making compensation for the pitch errors of gears and backlash between gears.

It will also be appreciated that the controller 24, which was provided between the servo amplifier 2 and the measuring instrument 7 or the revolution detector 8 in Embodiments 1 to 6, may be provided between the measuring instrument 7 and the revolution detector 6 (or the revolution detector 601 or 602), for example.

It will be apparent that as described above, the revolution detecting apparatus in this invention includes storage means stored with compensation values for a plurality of revolving angle ranges within one revolution of a revolving shaft by rotation position ranges indicated according to the number of revolutions of the revolving shaft, and reads the corresponding storage data of the storage means depending on to which of the rotation position ranges the rotation position of the revolving shaft indicated on the basis of the detection output of revolution count detecting means belongs and to which of the revolving angle ranges the detection output of the revolving angle detecting means belongs, and the rotation position calculating means calculates the compensated rotation position of the revolving shaft according to said read data, the detection output of the revolving angle detecting means and the detection output of the revolution count detecting means, whereby the compensated rotation position can be calculated rapidly to increase the speed and accuracy of a servo control apparatus which uses this revolution detecting apparatus.

It will also be apparent that the revolution detecting apparatus has backlash storage means for storing backlash between a table driven via a rotator which rotates with the rotation of the revolving shaft and the rotator and judging means for judging the rotation direction of the revolving shaft, and the rotation position calculating means calculates the compensated rotation position of the revolving shaft which has been further compensated for according to the storage data of the backlash storage means and the judgment output of the judging means, whereby the speed and accuracy of a servo control apparatus using this revolution detecting apparatus can be increased and backlash can be compensated for.

It will also be apparent that the revolution detecting apparatus has temperature detecting means and the rotation position calculating means calculates the compensated rotation of the revolving shaft which has been further compensated for according to the detection output of the temperature detecting means, whereby the speed and accuracy of a servo control apparatus using this revolution detecting apparatus can be increased and errors caused by temperature can be compensated for.

It will also be apparent that the revolution detecting apparatus has temperature compensating storage means stored with temperature-related compensation values by predetermined temperature ranges and temperature detecting means, and the rotation position calculating means calculates the compensated rotation position of the revolving shaft which has been further compensated for according to the storage data of the temperature compensating storage means and the detection output of the temperature detecting means, whereby the speed and accuracy of a servo control apparatus using this revolution detecting apparatus can be increased and errors caused by temperature can be compensated for with higher accuracy.

It will also be apparent that the revolution detecting apparatus has the table position detecting means installed on the away-from-a-motor side of a ballscrew rotated and driven by the motor, whereby the torsion of the ballscrew can be compensated for easily and the whole apparatus at the time of writing compensation values can be made smaller in size and lower in price.

It will also be apparent that the main parts of the control apparatus are made up of a personal computer and memory writing means, whereby general-purpose components can be utilized temporarily to reduce the price of the whole apparatus at the time of writing compensation values.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A position detecting apparatus for a machine having a revolving shaft comprising:

revolution count detecting means for detecting a revolution of the revolving shaft and counting the number of revolutions of said revolving shaft;

revolution angle detecting means for detecting a revolution angle within one revolution of said revolving shaft and generating a corresponding detecting output;

storage means for storing compensation values for a plurality of revolution angle ranges within one revolution of said revolving shaft according to rotation position ranges defined on the basis of the number of revolutions of said revolving shaft; and rotation position calculating means for reading the corresponding compensation value data in said storage means, depending on (i) to which of said rotation position ranges the rotation position of said revolving shaft based on the detection output of revolution count detecting means belongs (ii) and to which of said revolution angle ranges the detection output of said revolution angle detecting means belongs, and for calculating a compensated rotation position of said revolving shaft according to said read data, the detection output of said revolution angle detecting means and the detection output of said revolution count detecting means.

2. The position detecting apparatus as defined in claim 1, further comprising:

backlash storage means for storing data representative of the backlash between a table driven via a rotator which rotates with the rotation of the revolving shaft and said rotator, and judging means for judging the rotation direction of said revolving shaft and providing a corresponding judgment output, wherein the rotation position calculating means further calculates the compensated rotation position of said revolving shaft according to the data stored in said backlash storage means and the judgment output of said judging means.

3. The position detecting apparatus as defined in claim 1, further comprising temperature detecting means for detecting an operating temperature and for providing a corresponding detection output, and wherein said rotation position calculating means further calculates the compensated rotation position of said revolving shaft according to the detection output of said temperature detecting means.

4. The position detecting apparatus as defined in claim 2, further comprising temperature detecting means for detecting for detecting an operating temperature and for providing a corresponding detection output, and wherein said rotation position calculating means further calculates the compensated rotation position of said revolving shaft according to the detection output of said temperature detecting means.

5. The position detecting apparatus as defined in claim 1, further comprising:

temperature compensating storage means for storing temperature-based compensation values by predetermined temperature ranges, and temperature detecting means for detecting temperature and providing a corresponding detection output, and wherein said rotation position calculating means further calculates the compensated rotation position of said revolving shaft according to the detection output of said temperature detecting means and the storage data of said temperature compensating storage means.

6. The position detecting apparatus as defined in claim 1 wherein the calculating means comprises a personal computer and memory writing means.

7. A position detecting method for a machine having a revolving shaft comprising:

detecting a revolution of the revolving shaft and counting the number of revolutions of said revolving shaft;

detecting a revolution angle within one revolution of said revolving shaft and generating a corresponding detecting output;

storing compensation values for a plurality of revolution angle ranges within one revolution of said revolving shaft according to rotation position ranges defined on the basis of the number of revolutions of said revolving shaft;

reading the corresponding stored compensation value data depending on (i) to which of said rotation position ranges the detected rotation position of said revolving shaft belongs based on the detected revolution count and (ii) to which of said revolution angle ranges the detected revolution angle detecting means belongs; and calculating a compensated rotation position of said revolving shaft according to said read data, the detected revolution angle and the detected revolution count.

8. The position detecting method as defined in claim 7, further comprising:

storing data representative of the backlash between a table driven via a rotator which rotates with the rotation of the revolving shaft and said rotator, and judging the rotation direction of said revolving shaft and providing a corresponding judgment output, and performing said calculating step according to the stored backlash data and the result of said judging step.

9. The position detecting method as defined in claim 7, further comprising detecting an operating temperature and providing a corresponding detection output, and performing said calculating step on the basis of the compensated rotation position of said revolving shaft according to the detected temperature.

10. The position detecting method as defined in claim 8, further comprising detecting an operating temperature and providing a corresponding detection output, and performing said calculating step on the basis of the compensated rotation position of said revolving shaft according to the detected temperature.

11. The position detecting method as defined in claim 7, further comprising:

storing temperature-based compensation values by predetermined operating temperature ranges, and detecting an operating temperature and providing a corresponding stored compensation value, and performing said calculating step on the basis of said detected operating temperature and the provided stored compensation value.

12. The position detecting method as set forth in claim 7 wherein said storing step comprises:

generating a sequence of predetermined motor drive commands, each for causing said motor to be driven a corresponding drive amount under servo control, in order to provide movement for an overall stroke;

detecting a rotation position of an object to be rotated by a shaft attached to the motor and rotatingly driven in response to each said predetermined drive commands and generating rotation position data according to rotation position ranges;

detecting the revolutions of said motor as it is rotated in response to each said predetermined drive commands and generating current position data;

calculating a difference between the detected position of said object and the detected revolutions of said motor and generating error compensation values according to said rotation position ranges, and calculating a composite error compensation value based on said generated error compensation values according to said rotation position ranges.

13. The position detecting method as set forth in claim 12 further comprising:

connecting an object position detecting device to said object to provide a measurement of object rotation position data; and disconnecting said object position detecting device from said object to provide ordinary operation.

14. The position detecting method as defined in claim 12, wherein said calculation steps are performed by a personal computer.

15. The position detecting method as defined in claim 12, further comprising:

prestoring within-one-revolution division angle error compensation values; and wherein said compensation values comprise a composite compensation value including at least a within-one-revolution division angle error compensation value.

16. The position detecting method as defined in claim 12, further comprising:

prestoring within-one-revolution division angle error compensation values, and wherein said compensation values comprise a composite compensation value including at least a within-one-revolution division angle error compensation value and a ball screw pitch error compensation value.

17. The position detecting method as defined in claim 12, further comprising writing said composite compensation values for said overall stroke.

* * * * *